United States Patent
Huang et al.

(10) Patent No.: US 12,107,687 B2
(45) Date of Patent: Oct. 1, 2024

(54) COMMUNICATION APPARATUS AND COMMUNICATION METHOD FOR HYBRID AUTOMATIC REPEAT REQUEST OPERATION

(71) Applicant: Panasonic Intellectual Property Corporation of America, Torrance, CA (US)

(72) Inventors: Lei Huang, Singapore (SG); Yoshio Urabe, Nara (JP); Rojan Chitrakar, Singapore (SG)

(73) Assignee: Panasonic Intellectual Property Corporation of America, Torrance, CA (US)

(*) Notice: Subject to any disclaimer, the term of this patent is extended or adjusted under 35 U.S.C. 154(b) by 367 days.

(21) Appl. No.: 17/619,218

(22) PCT Filed: May 28, 2020

(86) PCT No.: PCT/SG2020/050314
§ 371 (c)(1),
(2) Date: Dec. 14, 2021

(87) PCT Pub. No.: WO2021/006810
PCT Pub. Date: Jan. 14, 2021

(65) Prior Publication Data
US 2022/0255681 A1 Aug. 11, 2022

(30) Foreign Application Priority Data

| Jul. 5, 2019 | (SG) | 10201906306V |
| Jul. 6, 2019 | (SG) | 10201906307W |
| Jul. 25, 2019 | (SG) | 10201906902U |

(51) Int. Cl.
*H04L 1/1829* (2023.01)
*H04L 5/00* (2006.01)

(52) U.S. Cl.
CPC .......... *H04L 1/1861* (2013.01); *H04L 5/0055* (2013.01)

(58) Field of Classification Search
CPC ................ H04L 1/1861; H04L 5/0055; H04L 5/0044; H04L 1/0025; H04L 27/26;
(Continued)

(56) References Cited

U.S. PATENT DOCUMENTS

| 2014/0233551 | A1 | 8/2014 | Wentink et al. | |
| 2017/0048048 | A1* | 2/2017 | Seok | H04L 1/1607 |
| 2017/0230149 | A1* | 8/2017 | Wang | H04L 1/1819 |
| 2017/0302417 | A1* | 10/2017 | Chun | H04L 1/0025 |
| 2021/0099253 | A1 | 4/2021 | Kim et al. | |

FOREIGN PATENT DOCUMENTS

| WO | WO 2019124822 A1 | 6/2019 |
| WO | 2019/132981 A1 | 7/2019 |
| WO | 2020/033815 A1 | 2/2020 |

OTHER PUBLICATIONS

WO 2019/132981 A1 (Year: 2019).*
Extended European Search Report, dated Aug. 8, 2022, for European Patent Application No. 20837656.6-1213. (8 pages).

(Continued)

*Primary Examiner* — Rushil P. Sampat
(74) *Attorney, Agent, or Firm* — Seed IP Law Group LLP

(57) ABSTRACT

The present disclosure provides a communication apparatus including circuitry, which, in operation, generates a transmission signal that includes a signal field and a data field, the signal field indicating one or more user-specific allocations in the data field. An aggregate medium access control protocol data unit (A-MPDU) transmitted in each of the one or more user-specific allocations is segmented into one or more code blocks. The communication apparatus includes a transmitter, which, in operation, transmits the generated transmission signal and a receiver, which, in operation, receives a null data packet (NDP) or a medium access (Continued)

control (MAC) frame carrying hybrid automatic repeat request (HARQ) feedback information for the one or more code blocks.

16 Claims, 37 Drawing Sheets

(58) Field of Classification Search
CPC ........... H04L 27/26025; H04L 27/2613; H04L 27/2628; H04L 5/0007; H04L 5/0032; H04L 5/0037; H04L 1/0075; H04L 5/0048; H04L 5/005; H04L 5/0053; H04B 7/0452; H04W 84/12
See application file for complete search history.

(56) References Cited

OTHER PUBLICATIONS

Hart et al., "Recommended Direction for EHT," IEEE 802.11-18/1549r0, Sep. 9, 2018. (19 pages).
International Search Report, mailed Sep. 2, 2020, for International Application No. PCT/SG2020/050314. (4 pages).
Oteri, Kome, "Technology Features for 802.11 EHT," IEEE 802.11-18/1547r0, Sep. 7, 2018. (10 pages).
Shilo et al., "HARQ for EHT," IEEE 802.11-18/1587r1, Sep. 3, 2018. (15 pages).
Zhang et al., "HARQ Feasibility for EHT," IEEE 802.11-18/1992r1, Jan. 9, 2019. (31 pages).

* cited by examiner

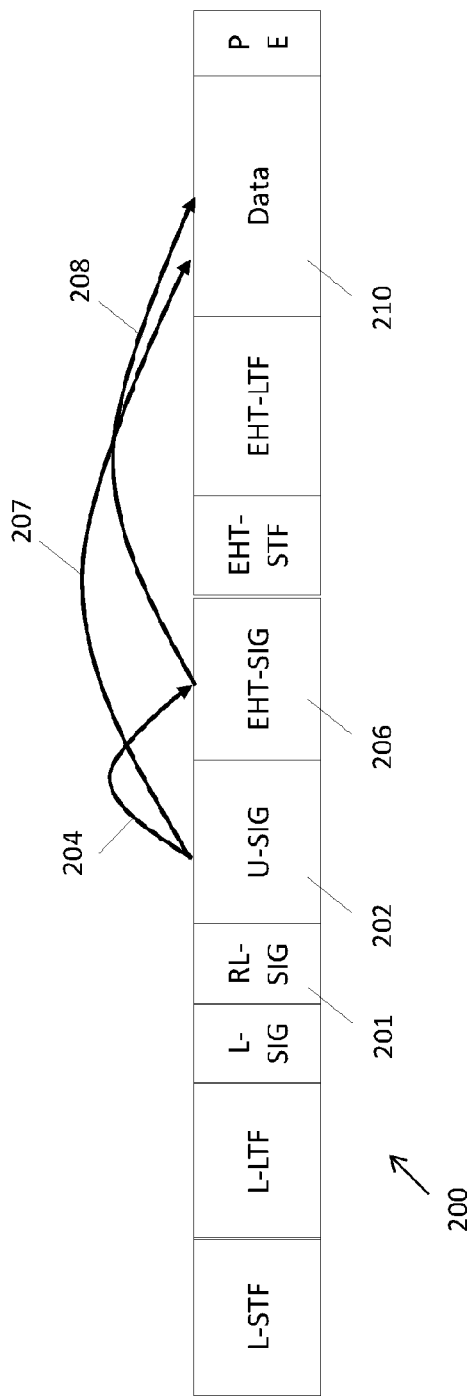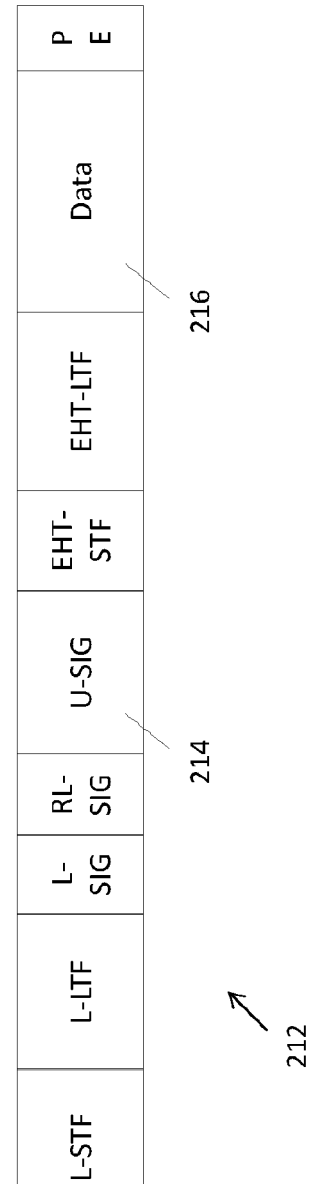
Fig. 2A
Fig. 2B

| Starting Code Block Number | HARQ Feedback Bitmap |
|---|---|
| 1922 / 1 octet | 1924 / 8 octets |

Octets:

| Starting Sequence Number | HARQ Feedback Bitmap |
|---|---|
| 1932 / 2 | 1934 / 8 |

Octets:

| Starting Code Block Number | HARQ Feedback Tuples |
|---|---|
| 1942 / 8 | 1944 / 2*64 |

Bits:

| Starting Sequence Number | HARQ Feedback Tuples |
|---|---|
| 1952 / 16 | 1954 / 2*64 |

Bits:

COMMUNICATION APPARATUS AND COMMUNICATION METHOD FOR HYBRID AUTOMATIC REPEAT REQUEST OPERATION

TECHNICAL FIELD

The present disclosure relates to communication apparatuses and methods for hybrid automatic repeat request (HARQ) operation, and more particularly to communication apparatuses and methods for HARQ operation in Extremely High Throughput (EHT) Wireless Local Area Network (WLAN).

BACKGROUND

In the standardization of next generation wireless local area network (WLAN), a new radio access technology having backward compatibilities with IEEE 802.11a/b/g/n/ac/ax technologies has been discussed in the IEEE 802.11 Working Group and is named 802.11 be Extremely High Throughput (EHT) WLAN.

In 802.11be EHT WLAN, in order to provide better link adaptation and higher throughput over 802.11ax high efficiency (HE) WLAN, it is desired to increase the maximum channel bandwidth from 160 MHz to 320 MHz, increase the maximum number of space-time streams from 8 to 16, support multi-link operation and hybrid automatic repeat request (HARQ) operation.

However, there has been little discussion on communication apparatuses and methods for HARQ operation in the context of 802.11 be EHT WLAN.

There is thus a need for communication apparatuses and methods that provide feasible technical solutions for HARQ operation in the context of 802.11 be EHT WLAN, in order to provide better link adaptation and higher throughput over 802.11ax HE WLAN. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for HARQ operation in context of 802.11 be EHT WLAN.

In a first aspect, the present disclosure provides a communication apparatus comprising: circuitry, which, in operation, generates a transmission signal that includes a signal field and a data field, the signal field indicating one or more user-specific allocations in the data field, wherein an aggregate medium access control protocol data unit (A-MPDU) transmitted in each of the one or more user-specific allocations is segmented into one or more code blocks; a transmitter, which, in operation, transmits the generated transmission signal; and a receiver, which, in operation, receives a null data packet (NDP) or a medium access control (MAC) frame carrying hybrid automatic repeat request (HARQ) feedback information for the one or more code blocks.

In a second aspect, the present disclosure provides a communication apparatus comprising: circuitry, which, in operation, generates a transmission signal that includes a signal field and a data field, the data field comprising an A-MPDU that is segmented into one or more code block; a transmitter, which, in operation, transmits the transmission signal; and a receiver, which, in operation, receives a NDP or a MAC frame carrying HARQ feedback information for the one or more code blocks; wherein the signal field comprises a signalling to indicate whether the NDP or the MAC frame is used to carry the HARQ feedback information.

In a third aspect, the present disclosure provides a communication apparatus comprising: a receiver, which, in operation, receives a transmission signal that includes a signal field and a data field, the signal field indicating one or more user-specific allocations in the data field, wherein an A-MPDU transmitted in each of the one or more user-specific allocations is segmented into one or more code blocks; circuitry, which, in operation, processes the received transmission signal; and a transmitter, which, in operation, transmits a NDP or a MAC frame carrying HARQ feedback information for the one or more code blocks.

In a fourth aspect, the present disclosure provides a communication method comprising: generating a transmission signal that includes a signal field and a data field, the signal field indicating one or more user-specific allocations in the data field, wherein an A-MPDU transmitted in each of the one or more user-specific allocations is segmented into one or more code block; transmitting the generated transmission signal; and receiving a NDP or a MAC frame carrying HARQ feedback information for the one or more code blocks.

It should be noted that general or specific embodiments may be implemented as an apparatus, a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIG. 2A depicts an example format of an EHT basic PPDU.

FIG. 2B depicts an example format of an EHT TB (trigger based) PPDU.

FIG. 10 illustrates generation of the EHT-LTF of a TB HARQ Feedback NDP.

FIG. 19B to 19E depict four example formats of the BA Information field of the third example of the HARQ BA frame corresponding to two different HARQ Feedback Type subfield values and two different HARQ Feedback Status subfield values.

DETAILED DESCRIPTION

Figure 1A:
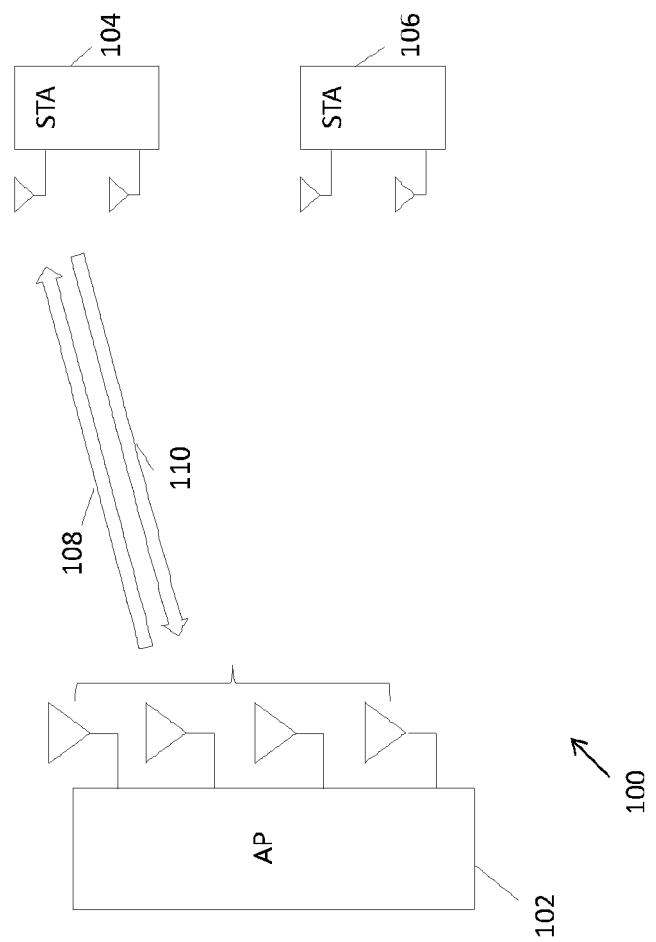
FIG. 1A depicts a schematic diagram of uplink and downlink single-user (SU) multiple input multiple output (MIMO) communications between an access point (AP) and a station (STA) in a MIMO wireless network.

Some embodiments of the present disclosure will be described, by way of example only, with reference to the drawings. Like reference numerals and characters in the drawings refer to like elements or equivalents.

In the following paragraphs, certain exemplifying embodiments are explained with reference to an access point (AP) and a station (STA) for hybrid automatic repeat request (HARQ) operation, especially in a multiple-input multiple-output (MIMO) wireless network.

In the context of IEEE 802.11 (Wi-Fi) technologies, a station, which is interchangeably referred to as a STA, is a communication apparatus that has the capability to use the 802.11 protocol. Based on the IEEE 802.11-2016 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be integrated with or employed in the router.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements.

In a MIMO wireless network, "multiple" refers to multiple antennas used simultaneously for transmission and multiple antennas used simultaneously for reception, over a radio channel. In this regard, "multiple-input" refers to multiple transmitter antennas, which input a radio signal into the channel, and "multiple-output" refers to multiple receiver antennas, which receive the radio signal from the channel and into the receiver. For example, in an N×M MIMO network system, N is the number of transmitter antennas, M is the number of receiver antennas, and N may or may not be equal to M. For the sake of simplicity, the respective numbers of transmitter antennas and receiver antennas are not discussed further in the present disclosure.

In a MIMO wireless network, single-user (SU) communications and multi-user (MU) communications can be deployed for communications between communication apparatuses such as APs and STAs. MIMO wireless network has benefits like spatial multiplexing and spatial diversity, which enable higher data rates and robustness through the use of multiple spatial streams. According to various embodiments, the term "spatial stream" may be used interchangeably with the term "space-time stream" (or STS).

FIG. 1A depicts a schematic diagram of SU-MIMO communications 100 between an AP 102 and a STA 104 in a MIMO wireless network. As shown, the MIMO wireless network may include one or more STAs (e.g. STA 104, STA 106, etc.). In the SU-MIMO communications 100, the AP 102 transmits multiple space-time streams using multiple antennas (e.g. four antennas as shown in FIG. 1A) with all the space-time streams directed to a single communication apparatus, i.e. the STA 104. For the sake of simplicity, the multiple space-time streams directed to the STA 104 are illustrated as a grouped data transmission arrow 108 directed to the STA 104.

The SU-MIMO communications 100 can be configured for bi-directional transmissions. As shown in FIG. 1A, in the SU-MIMO communications 100, the STA 104 may transmit multiple space-time streams using multiple antennas (e.g. two antennas as shown in FIG. 1A) with all the space-time streams directed to the AP 102. For the sake of simplicity, the multiple space-time streams directed to the AP 102 are illustrated as a grouped data transmission arrow 110 directed to the AP 102.

As such, the SU-MIMO communications 100 depicted in FIG. 1A enables both uplink and downlink SU transmissions in a MIMO wireless network.

Figure 1B:
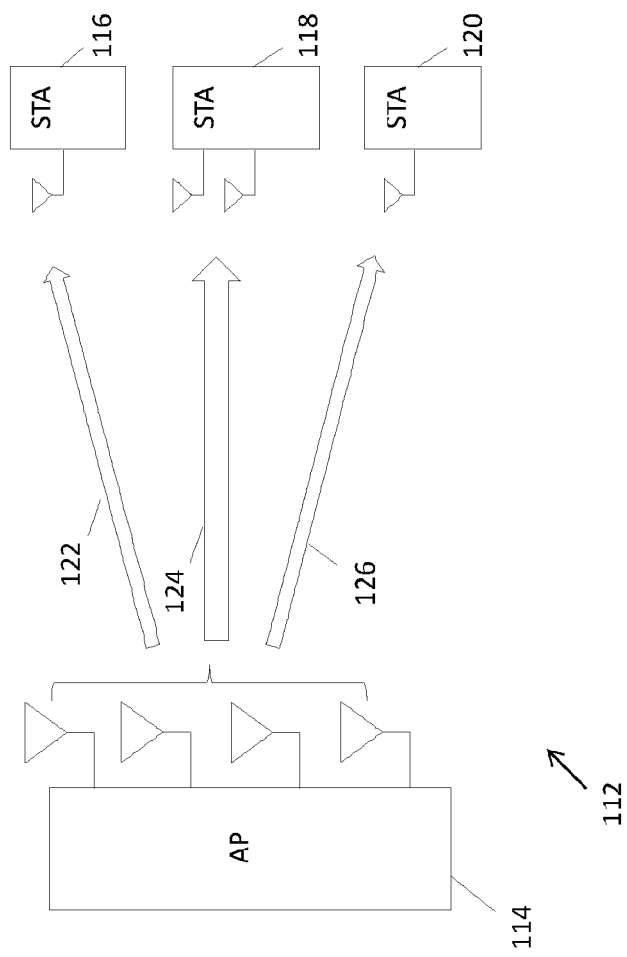
FIG. 1B depicts a schematic diagram of downlink multi-user MIMO (MU-MIMO) communications between an AP and multiple STAs in a MIMO wireless network.
Figure 1C:
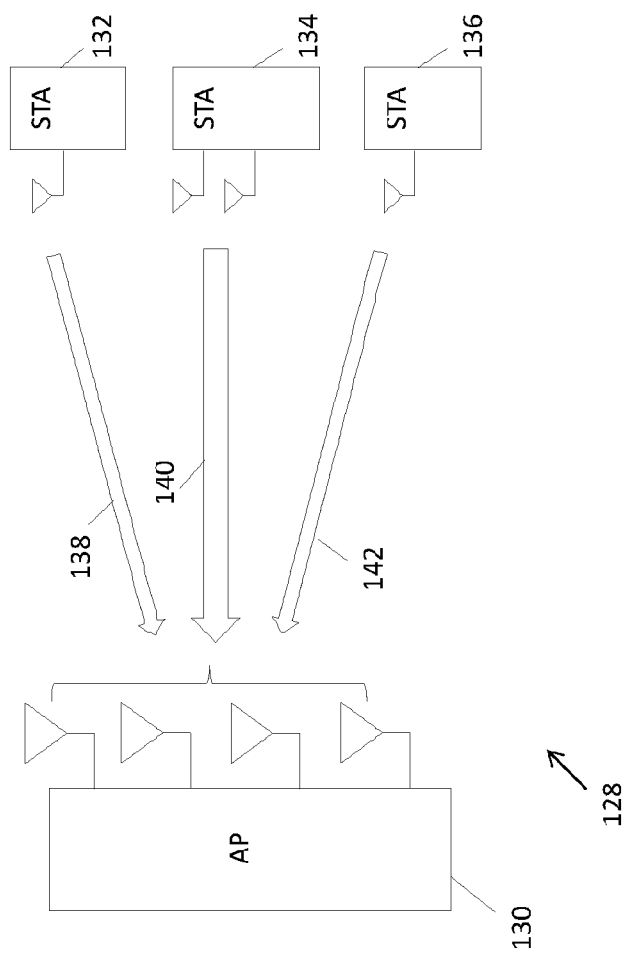
FIG. 1D shows a format of a PPDU (physical layer protocol data unit) used for downlink multi-user (MU) communications between an AP and multiple STAs in an HE WLAN.
FIG. 1E depicts the HE-SIG-B (HE Signal B) field in more detail.
FIG. 1F shows a format of a PPDU used for uplink MU communications between an AP and multiple STAs in an HE WLAN.
FIG. 1G shows a format of a PPDU used for uplink and downlink SU MIMO communications between an AP and a STA in an HE WLAN.

FIG. 1B depicts a schematic diagram of downlink MU-MIMO communications 112 between an AP 114 and multiple STAs 116, 118, 120 in a MIMO wireless network. The MIMO wireless network may include one or more STAs (e.g. STA 116, STA 118, STA 120, etc.). In the downlink MU-MIMO communications 112, the AP 114 transmits multiple streams simultaneously to the STAs 116, 118, 120 in the network using multiple antennas via spatial mapping or precoding techniques. For example, two space-time streams may be directed to the STA 118, another space-time stream may be directed to the STA 116, and yet another space-time stream may be directed to the STA 120. For the sake of simplicity, the two space-time streams directed to the STA 118 are illustrated as a grouped data transmission arrow 124, the space-time stream directed to the STA 116 is illustrated as a data transmission arrow 122, and the space-time stream directed to the STA 120 is illustrated as a data transmission arrow 126.

Figure 10:
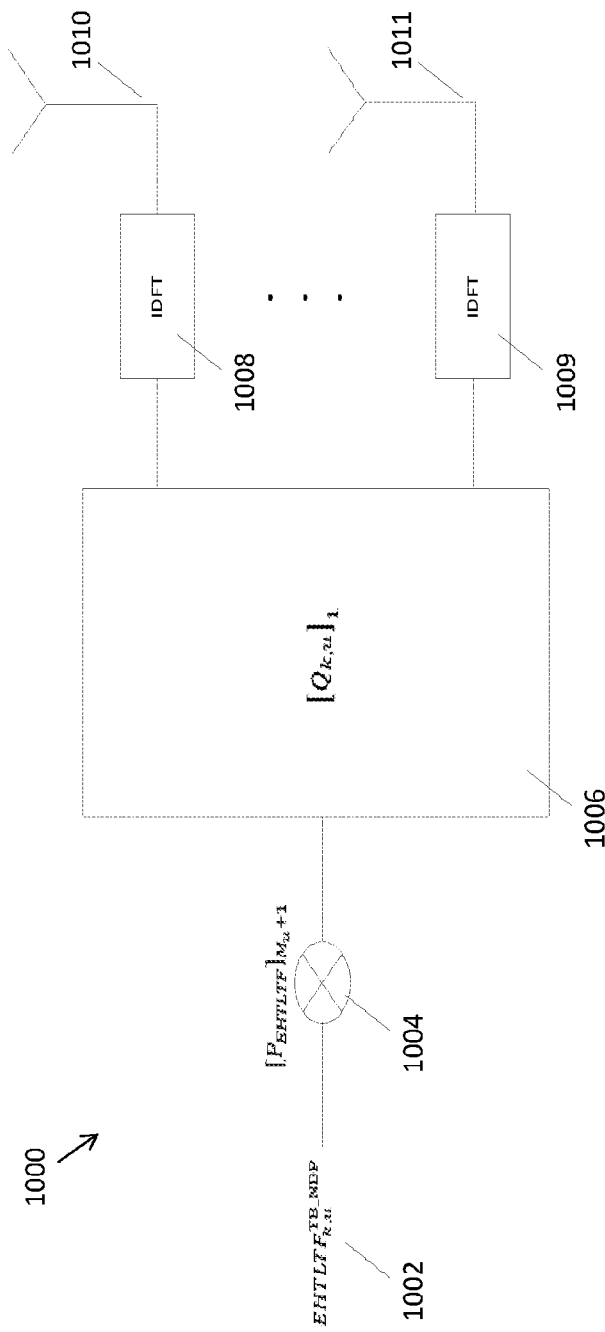
FIG. 10 depicts a schematic diagram of uplink MU-MIMO communications between an AP and multiple STAs in a MIMO wireless network

FIG. 10 depicts a schematic diagram of uplink MU-MIMO communications 128 between an AP 130 and multiple STAs 132, 134, 136 in a MIMO wireless network. The MIMO wireless network may include one or more STAs (e.g. STA 132, STA 134, STA 136, etc.). In the uplink MU-MIMO communications 128, the STAs 132, 134, 136 transmits respective streams simultaneously to the AP 130 in the network using respective antennas via spatial mapping or precoding techniques. For example, two space-time streams may be directed to the AP 130 from STA 134, another space-time stream may be directed to the AP 130 from STA 132, and yet another space-time stream may be directed to the AP 130 from STA 136. For the sake of simplicity, the two space-time streams directed to the AP 130 from STA 134 are illustrated as a grouped data transmission arrow 140, the space-time stream directed to the AP 130 from STA 132 is illustrated as a data transmission arrow 138, and the space-time stream directed to the AP 130 from STA 136 is illustrated as a data transmission arrow 142.

Due to packet/PPDU (physical layer protocol data unit) based transmission and distributed MAC scheme in 802.11 WLAN, time scheduling (e.g. TDMA (time division multiple access)-like periodic time slot assignment for data transmission) does not exist in 802.11 WLAN. Frequency and spatial resource scheduling is performed on a packet basis. In other words, resource allocation information is on a PPDU basis.

Figure 1D:
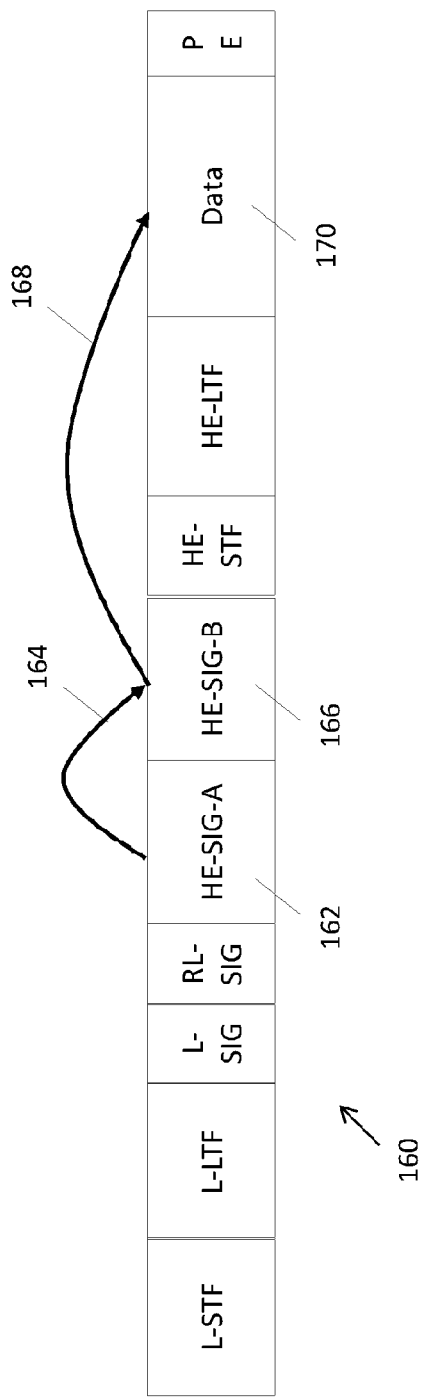

FIG. 1D shows a format of a PPDU 160 used for downlink MU communications between an AP and multiple STAs in a HE WLAN, e.g. OFDMA (Orthogonal Frequency Division Multiple Access) transmission including MU-MIMO transmission in a single RU (resource unit) and full-bandwidth MU-MIMO transmission. Such a PPDU 160 is referred to as an HE MU PPDU 160. The HE MU PPDU 160 may include a non-High Throughput Short Training Field (L-STF), a non-High Throughput Long Training Field (L-LTF), a non-High Throughput SIGNAL (L-SIG) field, a Repeated L-SIG (RL-SIG) field, a HE SIGNAL A (HE-SIG-A) field 162, a HE SIGNAL B (HE-SIG-B) field 166, a HE Short Training Field (HE-STF), a HE Long Training Field (HE-LTF), a Data field 170 and a Packet Extension (PE) field. In the HE MU PPDU 160, the HE-SIG-B field 166 provides the OFDMA and MU-MIMO resource allocation information to allow STAs to look up the corresponding resources to be used in the Data field 160, like indicated by an arrow 168. The HE-SIG-A field 162 contains the necessary information for decoding the HE-SIG-B field 166, e.g. modulation and coding scheme (MCS) for HE-SIG-B, number of HE-SIG-B symbols, like indicated by an arrow 164.

Figure 1E:
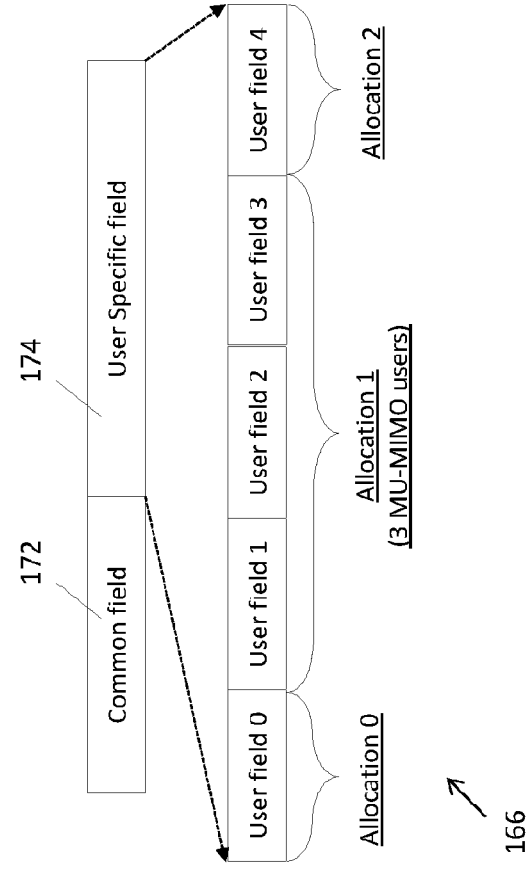

FIG. 1E depicts the HE-SIG-B field 166 in more detail. The HE-SIG-B field 166 includes (or consists of) a Common field 172, if present, followed by a User Specific field 174 which together are referred to as the HE-SIG-B content channel. The HE-SIG-B field 166 contains a RU Allocation subfield which indicates the RU information for each of the allocations. The RU information includes a RU position in the frequency domain, an indication of the RU allocated for a non-MU-MIMO or MU-MIMO allocation, and the number of users in the MU-MIMO allocation. The Common field 172 is not present in the case of a full-bandwidth MU-MIMO transmission. In this case, the RU information (e.g. the number of users in the MU-MIMO allocation) is signalled in the HE-SIG-A field 162.

The User Specific field 174 includes (or consists of) one or more User field(s) for non-MU-MIMO allocation(s) and/or MU-MIMO allocation(s). A User field contains user information indicating a user-specific allocation (i.e. user-specific allocation information). In the example shown in FIG. 1F, the User Specific field 174 includes five user fields (User field 0, . . . , User field 4), wherein user-specific allocation information for an allocation (Allocation 0) is provided by User field 0, user-specific allocation information for a further allocation (Allocation 1 with 3 MU-MIMO users) is provided by User field 1, User field 2, and User field 3, and user-specific allocation information for yet a further allocation (Allocation 2) is provided by User field 4.

Figure 1F:
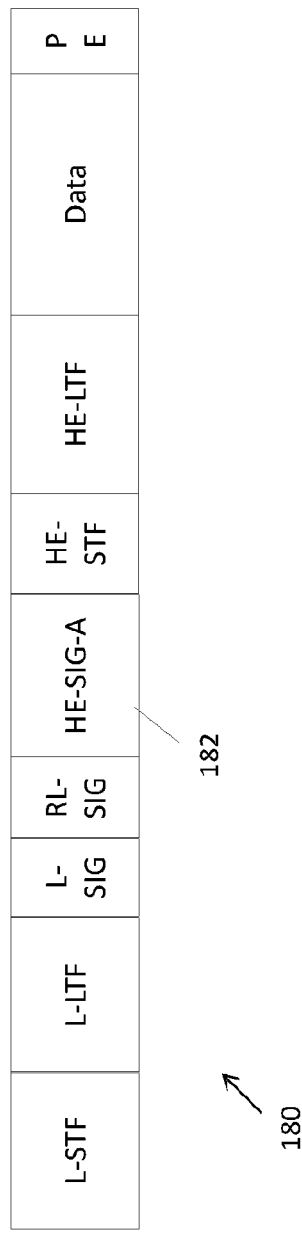

FIG. 1F shows a format of a PPDU 180 used for uplink MU communications between an AP and multiple STAs in a HE WLAN. Such a PPDU 180 is referred to as an HE TB (trigger based) PPDU 180. The HE TB PPDU 180 may include a L-STF, a L-LTF, a L-SIG field, a RL-SIG field, a HE-SIG-A field 182, a HE-STF, a HE-LTF, a Data field and a PE field. The HE-STF of HE TB PPDU 180 has a duration of 8 µs. The HE TB PPDU 180 is used for uplink MU transmission that is in response to a frame carrying trigger information. Instead of using the HE-SIG-B field, the information required for the uplink MU transmission from one or more STAs is carried by the frame that solicits this transmission. In a typical transmission of the HE TB PPDU 180, HE-SIG-A related information is copied from the previous frame carrying trigger information into the HE-SIG-A field 182 of the HE TB PPDU 180.

Figure 1G:
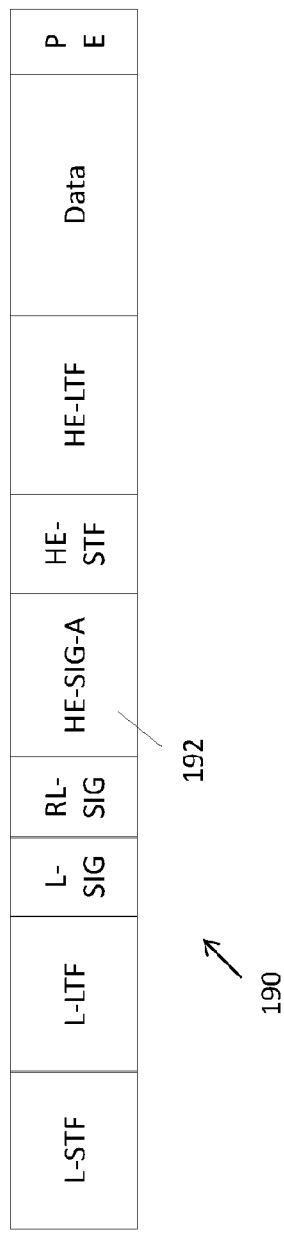

FIG. 1G shows a format of a PPDU 190 used for uplink and downlink SU communications between an AP and a STA like in FIG. 1A. The HE SU PPDU 190 may include a L-STF, a L-LTF, a L-SIG field, a RL-SIG field, a HE-SIG-A field 192, a HE-STF, a HE-LTF, a Data field and a PE field. The HE-STF of HE SU PPDU 190 has a duration of 4 µs. The HE-SIG-A field 192 contains necessary control information for decoding the Data field, such as uplink/downlink, MCS and bandwidth.

If the MIMO wireless network is with an extremely high throughput, such as an 802.11be EHT WLAN, the PPDU used for downlink MU transmission, downlink SU transmission or uplink SU transmission may be referred to as EHT basic PPDU 200 like illustrated in FIG. 2A; the PPDU used for uplink MU transmission may be referred to as EHT TB PPDU like illustrated in FIG. 2B.

FIG. 2A depicts an example format of an EHT basic PPDU 200. The EHT basic PPDU 200 may include a L-STF, a L-LTF, a L-SIG field, a RL-SIG field 201, a Universal SIGNAL (U-SIG) field 202, an EHT SIGNAL (EHT-SIG) field 206, an EHT-STF, an EHT-LTF, a Data field 210 and a PE field. Both U-SIG field 202 and EHT-SIG field 206 are present in the EHT basic PPDU 200 transmitted to a single STA or multiple STAs. It is appreciable that if the IEEE 802.11 Working Group may use a new name instead of "EHT WLAN" for the next generation WLAN with an extremely high throughput, the prefix "EHT" in the above fields may change accordingly. The RL-SIG field 201 is mainly used for identifying any PHY versions starting with 802.11be. The U-SIG field 202 contains the necessary information for decoding the EHT-SIG field 206, e.g. MCS for EHT-SIG, number of EHT-SIG symbols, like indicated by an arrow 204. The U-SIG field 202 and the EHT-SIG field 206 provide necessary information for decoding the Data field 210, like indicated by arrows 207, 208 respectively. When the EHT basic PPDU 200 is transmitted to multiple STAs, the EHT-SIG field 206 provides the OFDMA and MU-MIMO resource allocation information to allow STAs to look up the corresponding resources to be used in the Data field 210. Like FIG. 1E, the EHT-SIG field 206 includes (or consists of) a Common field, if present, followed by one or more User Specific field which together are referred to as the EHT-SIG content channel. When the EHT basic PPDU 200 is transmitted to a single STA, there is a single User Specific field.

According to various embodiments, the U-SIG field 202 has a duration of two orthogonal frequency-division multiplexing (OFDM) symbols. Data bits in the U-SIG field 202 are jointly encoded and modulated in the same manner as the HE-SIG-A field of 802.11ax. Modulated data bits in the U-SIG field 202 are mapped to 52 data tones of each of the two OFDM symbols and duplicated for each 20 MHz within each 80 MHz frequency segment in the same manner as the HE-SIG-A field of 802.11ax. The U-SIG field 202 may carry different information in different 80 MHz frequency segments.

In various embodiments, the U-SIG field 202 has a same format regardless of whether the EHT basic PPDU 200 is transmitted to a single STA or multiple STAs. The U-SIG field 202 comprises two parts: U-SIG1 and U-SIG2, each comprising 26 data bits. The U-SIG field 202 comprises all version independent bits and a part of version dependent bits. All version independent bits are included in U-SIG1 and have static location and bit definition across different physical layer (PHY) versions, the version independent bits comprising PHY version identifier (3 bits), bandwidth (BW) field (3 bits), uplink/downlink (UL/DL) flag (1 bit), basic service set (BSS) color (e.g. 6 bits) and transmission opportunity (TXOP) duration (e.g. 7 bits). The PHY version identifier of the version independent bits is used to identify the exact PHY version starting with 802.11 be, and the BW field is used to indicate PPDU bandwidth. The effect of including all version-independent bits into one part of the U-SIG field 202, i.e. U-SIG1, is that the legacy STAs only require to parse the U-SIG1 and thus their power efficiency can be improved. On the other hand, version dependent bits may have variable bit definition in each PHY version. The part of version dependent bits included in the U-SIG field 202 may comprise PPDU format, punctured channel information, pre-FEC padding factor, PE disambiguity and EHT-SIG related bits which are used for interpreting EHT-SIG field 206, and spatial reuse related bits which are used for coexisting with unintended STAs.

FIG. 2B shows an example format of an EHT TB PPDU 212. The EHT TB PPDU 212 may include a L-STF, a L-LTF, a L-SIG field, a RL-SIG field, a U-SIG field 214, an EHT-STF, an EHT-LTF, a Data field 216 and a PE field. The EHT-STF of EHT TB PPDU 212 has a duration of 8 µs. The EHT TB PPDU 212 is used in an EHT WLAN for uplink MU transmission that is in response to a frame carrying trigger information. Instead of using the EHT-SIG field, the information required for the uplink MU transmission from one or more STAs is carried by the frame that solicits this transmission. In a typical transmission of the EHT TB PPDU 212, U-SIG related information is copied from the previous frame carrying trigger information into the U-SIG field 214 of the EHT TB PPDU 212.

According to various embodiments, EHT WLAN supports hybrid automatic repeat request (HARQ) operation as well. HARQ operation provides a flexible mechanism for recovering from transmission errors, reduces the number of retransmission and provides a more efficient data flow result. In other words, HARQ operations in EHT WLAN can provide a better link adaptation and higher throughput.

Figure 3A:
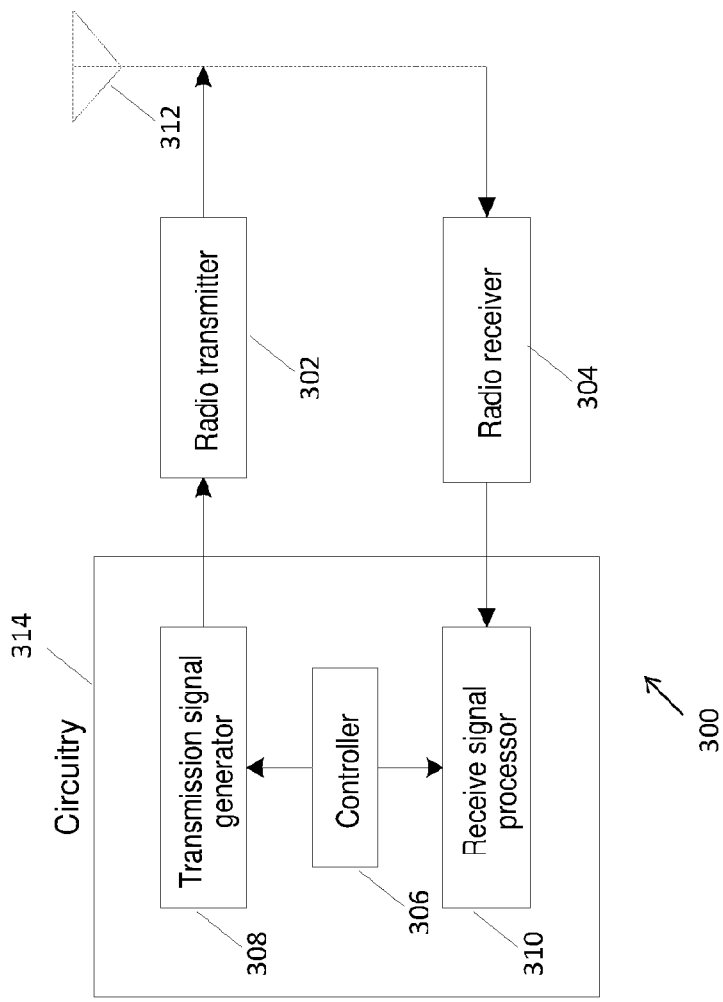
FIG. 3A shows a schematic example of communication apparatus in accordance with various embodiments. The communication apparatus may be implemented as an AP or a STA and configured for hybrid automatic repeat request (HARQ) operation in accordance with various embodiments of the present disclosure.

FIG. 3A shows a schematic, partially sectioned view of a communication apparatus 300 according to various embodiments. The communication apparatus 300 may be implemented as an AP or a STA according to various embodiments. As shown in FIG. 3A, the communication apparatus 300 may include circuitry comprising at least one transmission signal generator, at least one radio transmitter, at least one radio receiver and at least one antenna 312 (for the sake of simplicity, only one antenna is depicted in FIG. 3A for illustration purposes). The at least one transmission signal generator may generate a transmission signal that include a signal field and a data field. In a MIMO communication, the transmission signal may comprise one or more user-specific allocations in the data field. In an embodiment, an aggregate MAC protocol data unit (A-MPDU) transmitted in a user-specific allocation is segmented into one or more code blocks. The at least one radio transmitter transmits the generated transmission signal to one or more other communication apparatuses. The at least one radio receiver receives a transmission signal generated from one or more other communication apparatus. The circuitry 314 may furthermore include at least one receive signal processor 310. The circuitry 314 may also include at least one controller 306 for use in software and hardware aided execution of tasks that the at least one controller 306 is designed to perform, including control of communications with one or more other communication apparatuses in a MIMO wireless network. The at least one controller 306 may control the receive signal processor 310 and the transmission signal generator 308. The at least one controller 306 may control the at least one transmission signal generator 308 for generating PPDUs (for example, EHT basic PPDUs, SU HARQ Feedback NDPs (null data packets) if the communication apparatus 300 is an AP; and, for example, TB HARQ Feedback NDPs, EHT TB PPDUs, EHT basic PPDUs, SU HARQ Feedback NDPs if the communication apparatus 300 is a STA) sent through the at least one radio transmitter 302 to one or more other communication apparatuses and the at least one receive signal processor 310 for processing PPDUs (for example TB HARQ Feedback NDP, EHT TB PPDUs, EHT basic PPDUs, SU HARQ Feedback NDPs if the communication apparatus 300 is an AP; and, for example EHT basic PPDUs, SU HARQ Feedback NDPs if the communication apparatus 300 is a STA) received through the at least one radio receiver 304 from the one or more other communication apparatuses under the control of the at least one controller 306. The at least one transmission signal generator 308 and the at least one receive signal processor 310 may be stand-alone modules of the communication apparatus 300 that communicate with the at least one controller 306 for the above-mentioned functions, as shown in FIG. 3A. Alternatively, the at least one transmission signal generator 308 and the at least one receive signal processor 310 may be included in the at least one controller 306. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 302, at least one radio receiver 304, and at least one antenna 312 may be controlled by the at least one controller 306.

The communication apparatus 300, when in operation, provides functions required for HARQ operation in downlink MU communications. For example, the communication apparatus 300 may be an AP, and the at least one transmission signal generator 308 of the circuitry 314, may, in operation, generate a transmission signal that include a signal field and a data field, the signal field indicating one or more user-specific allocations in the data field, wherein an A-MPDU transmitted in a user-specific allocation is segmented into one or more code blocks; the at least one radio transmitter 302 may, in operation, transmit the generated transmission signal; and the at least one radio receiver 304 may, in operation, receive a NDP or a MAC frame carrying HARQ feedback information for the one or more code blocks.

For example, the communication apparatus 300 may be a STA, and the at least one radio receiver 304, may, in operation, receive a transmission signal that include a signal field and a data field, the signal field indicating one or more user-specific allocations in the data field, wherein an A-MPDU transmitted in a user-specific allocation is segmented into one or more code blocks; the at least one transmission signal generator 308 of the circuitry 314 may, in operation, generates a NDP or a MAC frame carrying HARQ feedback information for the one or more code blocks; and the at least one radio transmitter 302 may, in operation, transmit the generated NDP or the MAC frame.

The communication apparatus 300, when in operation, provides functions required for HARQ operation in downlink SU communications. For example, the communication apparatus 300 may be an AP, and the at least one transmission signal generator 308 of the circuitry 314, may, in operation, generate a transmission signal that include a signal field and a data field, the data field comprising an A-MPDU that is segmented into one or more code blocks; the at least one radio transmitter 302 may, in operation, transmit the generated transmission signal; and the at least one radio receiver 304 may, in operation, receive a NDP or a MAC frame carrying HARQ feedback information for the one or more code blocks; wherein the signal field comprises a signalling to indicate whether the NDP or the MAC frame is used to carry the HARQ feedback information.

For example, the communication apparatus 300 may be a STA, and the at least one radio receiver 304, may, in operation, receive a transmission signal that includes a signal field and a data field, the data field comprising an A-MPDU that is segmented into one or more code blocks; the at least one transmission signal generator 308 of the circuitry 314, may, in operation, generate a NDP or MAC frame carrying HARQ feedback information for the one or more code blocks; and the at least one radio transmitter 3002, may in operation, transmit the generated NDP or MAC frame; wherein the signal field comprises a signalling to indicate whether the NDP or the MAC frame is used to carry the HARQ feedback information.

The communication apparatus 300, when in operation, provides functions required for HARQ operation in uplink SU communications. For example, the communication apparatus 300 may be a STA, and the at least one transmission signal generator 308 of the circuitry 314, may, in operation, generate a transmission signal that include a signal field and a data field, the data field comprising an A-MPDU that is segmented into one or more code blocks; the at least one radio transmitter 302 may, in operation, transmit the generated transmission signal; and the at least one radio receiver 304 may, in operation, receive a NDP or a MAC frame carrying HARQ feedback information for the one or more code blocks; wherein the signal field comprises a signalling to indicate whether the NDP or the MAC frame is used to carry the HARQ feedback information.

For example, the communication apparatus 300 may be an AP, and the at least one radio receiver 304, may, in operation, receive a transmission signal that includes a signal field and a data field, the data field comprising an A-MPDU that is segmented into one or more code blocks; the at least one transmission signal generator 308 of the circuitry 314, may, in operation, generate a NDP or MAC frame carrying HARQ feedback information for the one or more code blocks; and the at least one radio transmitter 3002, may in operation, transmit the generated NDP or MAC frame; wherein the signal field comprises a signalling to indicate whether the NDP or the MAC frame is used to carry the HARQ feedback information.

Figure 3B:
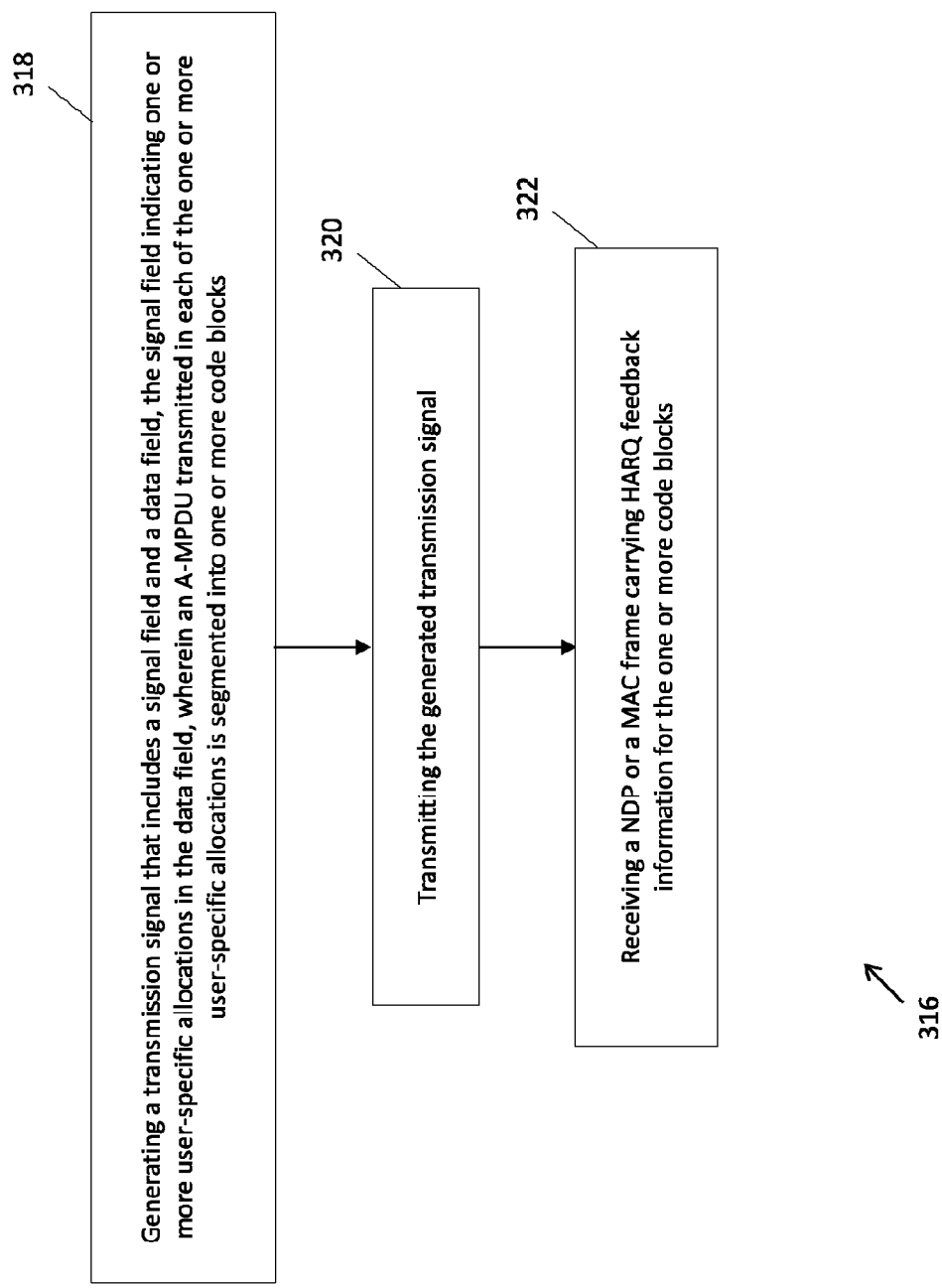
FIG. 3B shows a flow diagram illustrating a communication method for HARQ operation according to the present disclosure.

FIG. 3B depicts a flow diagram 316 illustrating a communication method for HARQ operation according to the present disclosure. In step 318, a step of generating a transmission signal that includes a signal field and a data field is carried out, the signal field indicating one or more user-specific allocations in the data field, wherein an A-MPDU transmitted in each of the one or more user-specific allocations is segmented into one or more code blocks. In step 320, a step of transmitting the generated transmission signal is carried out. In step 322, a step of receiving a NDP or a MAC frame carrying HARQ feedback information for the one or more code blocks is carried out.

According to the present disclosure, an A-MPDU carried in the data field of an EHT basic PPDU transmitted to a single STA or a user-specific allocation in the data field of an EHT basic PPDU transmitted to multiple STAs is segmented into one or more code blocks. Three different types of code block segmentation (type 1, 2, and 3) are discussed. For the sake of simplicity, only a user-specific allocation in the data field of an EHT basic PPDU transmitted to multiple STAs is illustrated in the three different types of code block segmentation (type 1, 2, and 3), and it is appreciable to those skilled in the art that the three different types of code block segmentation may also apply to an A-MPDU carried in the data field of an EHT basic PPDU transmitted to a single STA.

Figure 4A:
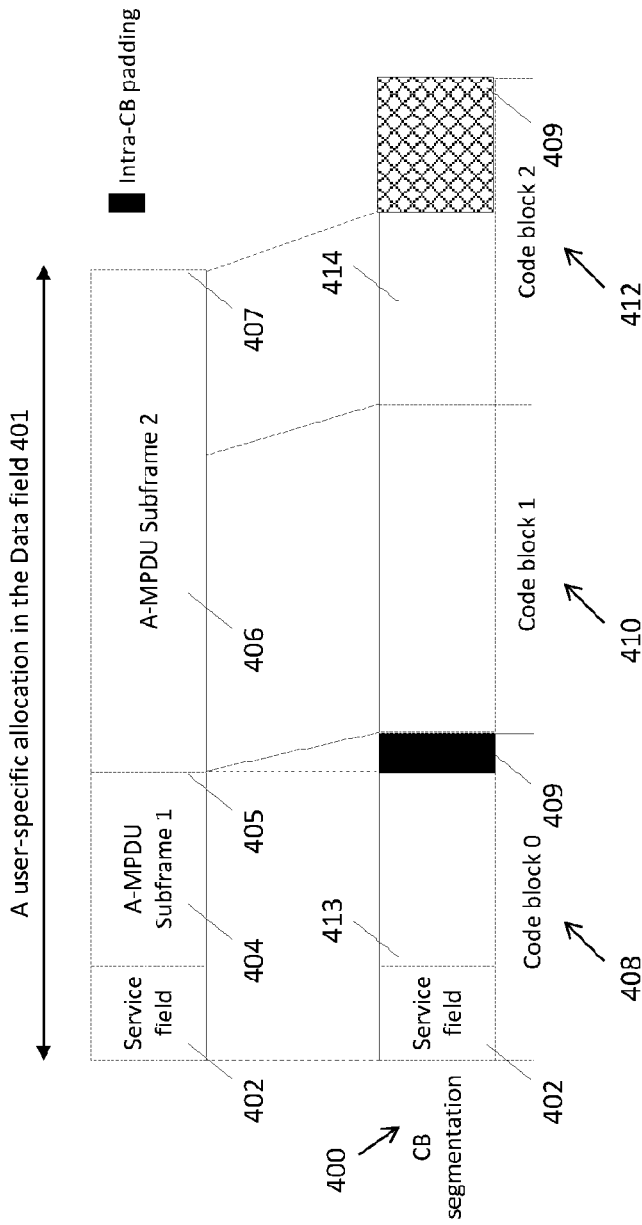
FIG. 4A shows an example type 1 code block segmentation of a data field.

Regarding type 1 code block segmentation, in an A-MPDU, an A-MPDU subframe may be segmented and correspond to one or more code blocks but no more than one A-MPDU subframes correspond to a single code block. FIG. 4A shows an example type 1 code block segmentation 400. A user-specific allocation in the data field of an EHT basic PPDU 401 transmitted to multiple STAs may include a Service field 402 and an A-MPDU comprising one or more A-MPDU subframes 404, 406. An A-MPDU subframe includes at most one MPDU. The A-MPDU subframes 404, 406 are segmented into one or more code blocks 408, 410, 412. Each code block 408, 410, 412 has a same code block size, and may contain whole or part of a single A-MPDU subframe. The first code block 408 may further contain the Service field 402. The code block 410 may contain only part of the A-MPDU subframe 406. The code blocks 408, 412 align with A-MPDU subframe boundaries 405, 407, respectively. Intra code block (CB) padding bits 409 may be appended to blocks of segmented A-MPDU subframe 413, 414 in the code blocks 408, 412 to fill up the code blocks 408, 412 to the code block size. For the type 1 code block segmentation 400, the existing MPDU based acknowledge mechanism can be reused for HARQ feedback. However, the type 1 code block segmentation 400 is inefficient for transmission of large MPDU (a maximum size of 11454 octets) as the whole MPDU with negative acknowledgement (NACK) needs to be retransmitted.

Figure 4B:
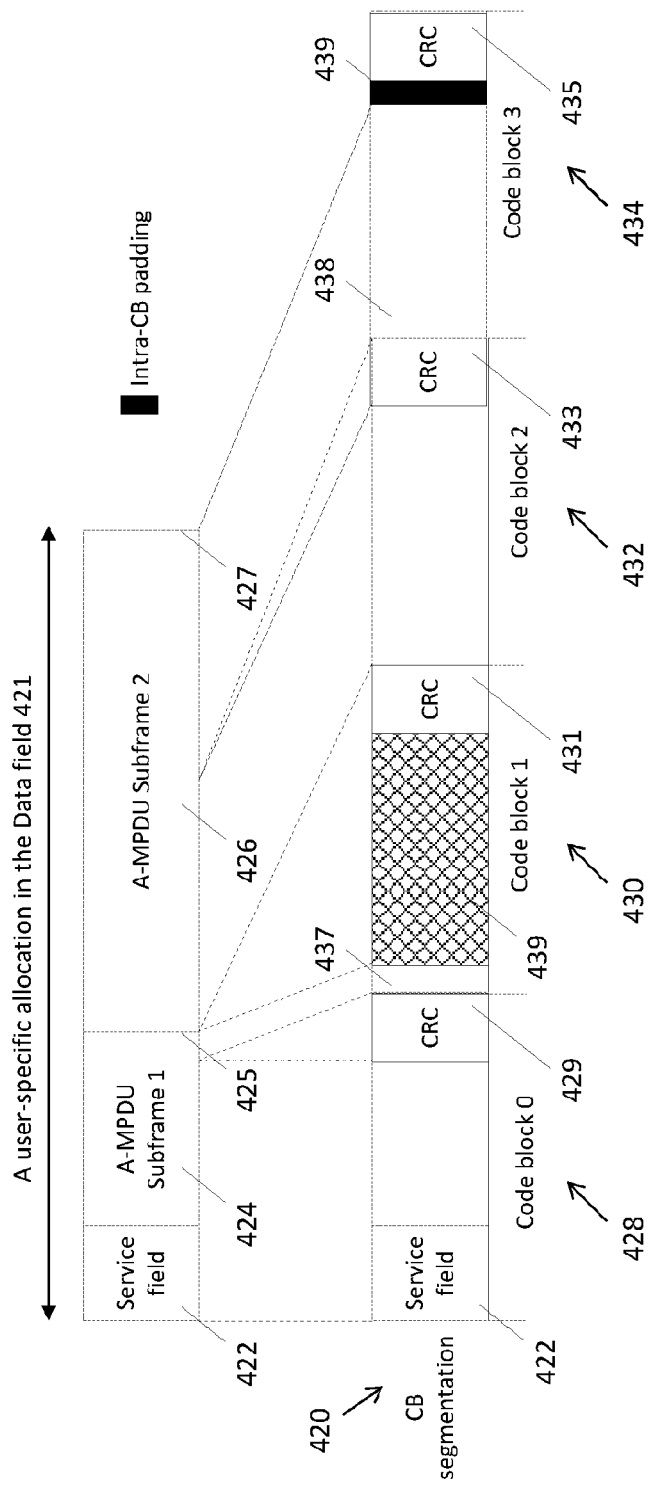
FIG. 4B shows an example type 2 code block segmentation of a data field.

Regarding type 2 code block segmentation, in an A-MPDU, an A-MPDU subframe may be segmented and correspond to one or more code blocks, but no more than one A-MPDU subframes correspond to a single code block, and each code block is attached a CRC (cyclic redundancy check). FIG. 4B shows an example type 2 code block segmentation 420. A user-specific allocation in the data field of an EHT basic PPDU 421 transmitted to multiple STAs may include a Service field 422 and an A-MPDU comprising one or more A-MPDU subframes 424, 426. The A-MPDU subframes 424, 426 is segmented into one or more code blocks 428, 430, 432, 434. Each code block 428, 430, 432, 434 has a same code block size and is attached with a CRC 429, 431, 433, 435 at the end of each code block that can be used for error detecting the corresponding code blocks 428, 430, 432, 434. Each code block may contain whole or part of a single A-MPDU subframe. The first code block 428 may further contain the Service field 422. The code block 430 aligns with A-MPDU subframe boundaries 425. Intra code block padding bits 439 may be filled between a block of segmented A-MPDU subframes 437, 438 and the CRCs 431, 435 in the code blocks 430, 434 to fill up the code blocks 430, 434 to the code block size. The type 2 code block segmentation 420 is efficient for transmission of large MPDU because only part of the code blocks with NACK corresponding to the MPDU needs to be retransmitted. However, a code block based HARQ feedback mechanism may be required.

Figure 4C:
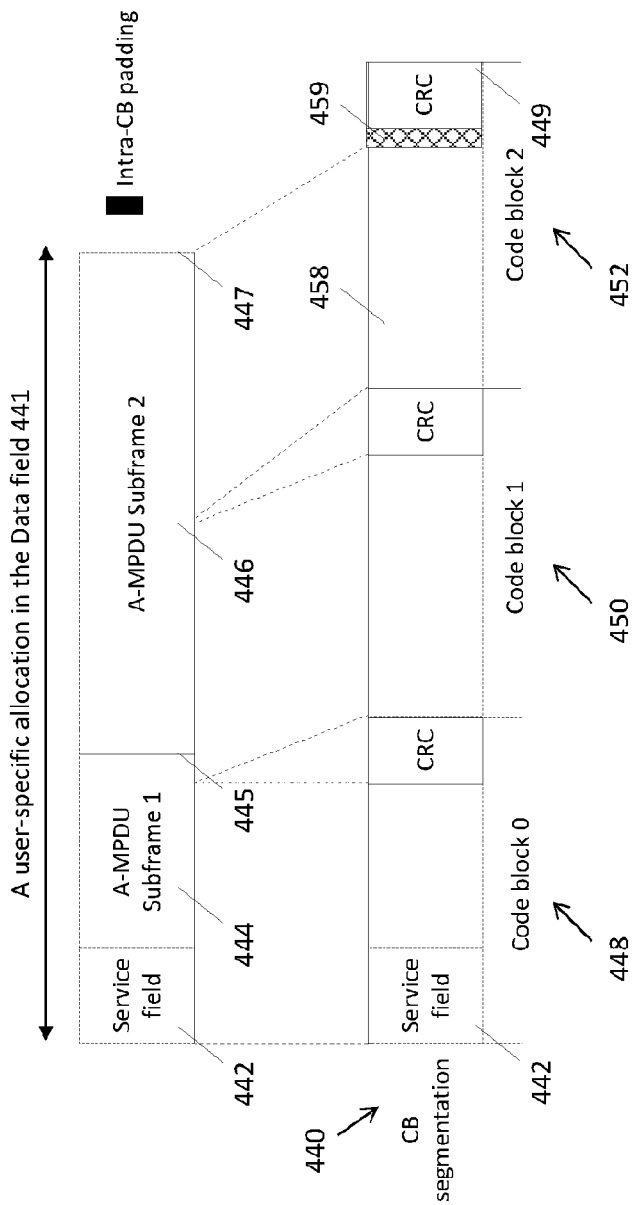
FIG. 4C shows an example type 3 code block segmentation of a data field.

Regarding type 3 code block segmentation, in an A-MPDU, an A-MPDU subframe may be segmented and correspond to one or more code blocks, more than one A-MPDU subframes may correspond to a single code block, and each code block is attached a CRC. FIG. 4C shows an example type 3 code block segmentation 440. A user-specific allocation in the data field of an EHT basic PPDU 441 transmitted to multiple STAs may include a Service field 442 and an A-MPDU comprising one or more A-MPDU subframes 444, 446. The A-MPDU subframes 444, 446 is segmented into one or more code blocks 448, 450, 452. Each code block 448, 450, 452 has a same code block size and may contain whole or part of a single A-MPDU subframe. The first code block 448 may further contain the Service field 442. The code blocks 448, 450, 452 do not align with A-MPDU subframe boundaries 445, 447, respectively. Intra code block padding bits 459 may be added to the last segmented block of the last A-MPDU subframe 446 in the code block 452 before appending CRC 449 to fill up the code block 452 to the code block size, as depicted in FIG. 4C. The type 3 code block segmentation 440 uses less intra code block padding bits and generates a reduced number of code blocks, therefore is more efficient than the type 2 code block segmentation 420. Similarly, a code block based HARQ feedback mechanism may be required.

Different types of code block segmentation have their respective advantages and disadvantages. Generally, AP or STA can determine the code block segmentation type at its discretion depending on A-MPDU size and MCS.

Figure 5A:
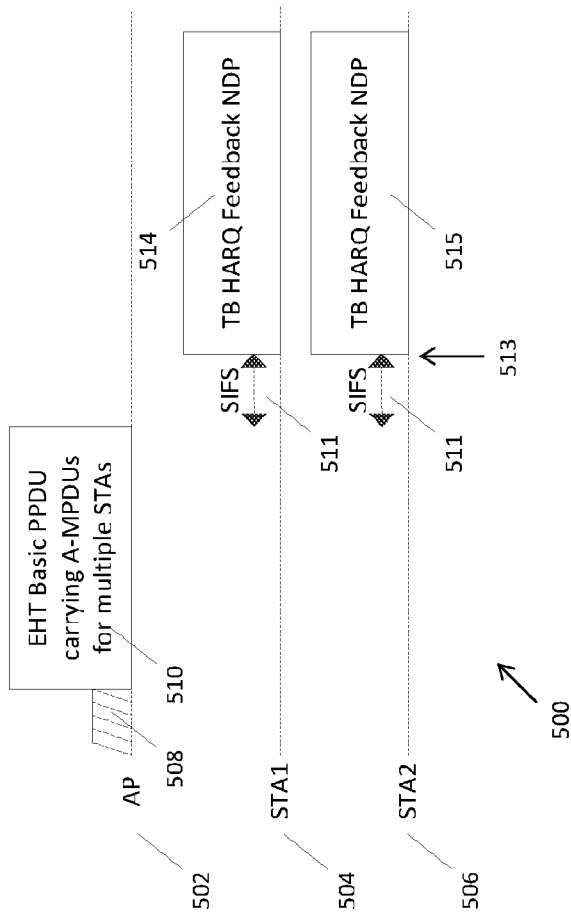
FIG. 5A depicts a flow chart illustrating downlink MU communications between an AP and multiple STAs where type 1 HARQ feedback is enabled.
Figure 7A:
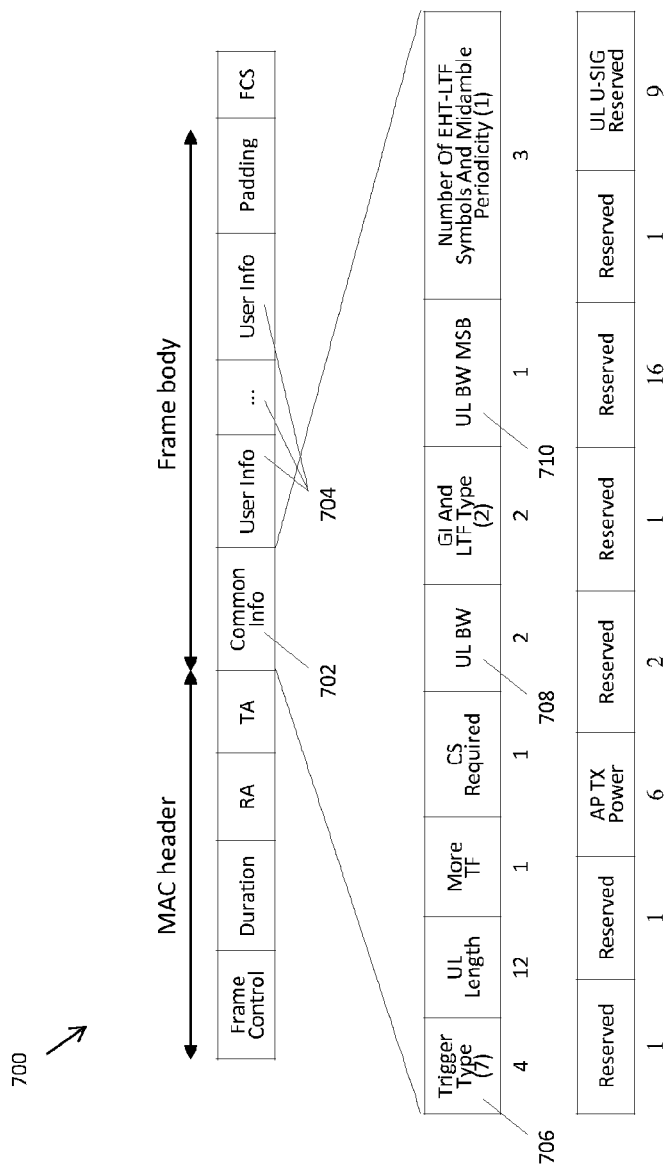
FIG. 7A shows the example Common Info field in a NDP Feedback Report Poll (NFRP) trigger frame with the Feedback Type subfield referring to HARQ feedback.
Figure 7B:
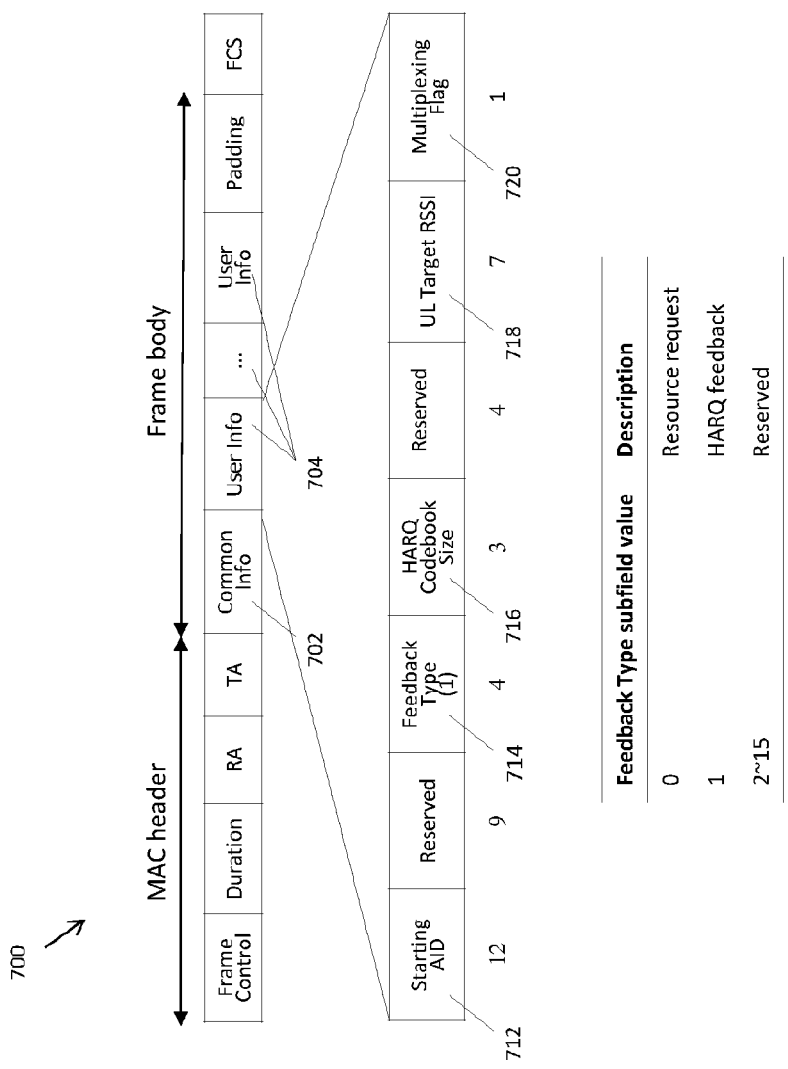
FIG. 7B shows the one or more example User Info field in a NFRP trigger frame with the Feedback Type subfield referring to HARQ feedback.
Figure 8:
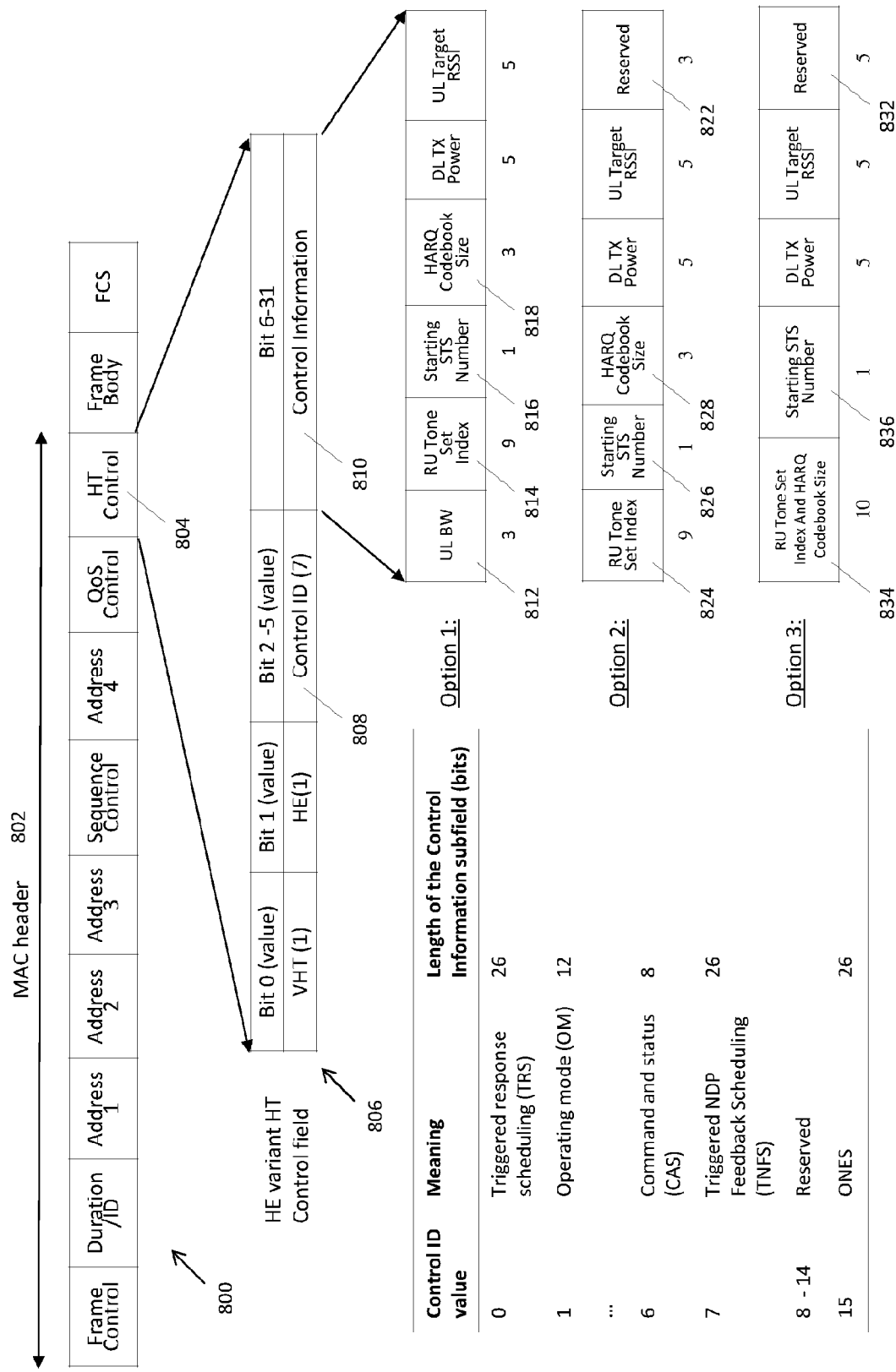
FIG. 8 shows an example of a frame carrying Triggered NDP Feedback Scheduling (TNFS) control subfield.
Figure 9:
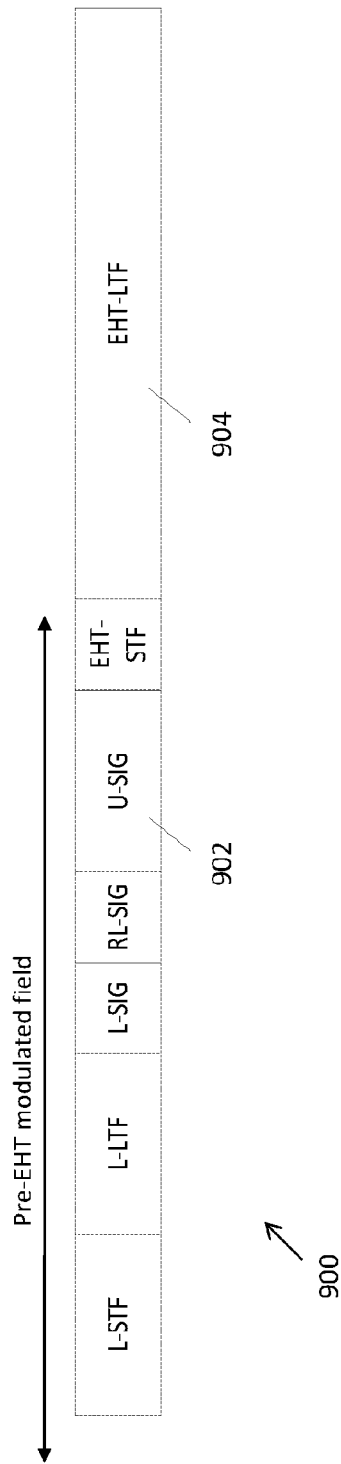
FIG. 9 depicts an example format of a TB HARQ Feedback NDP.
Figure 13:
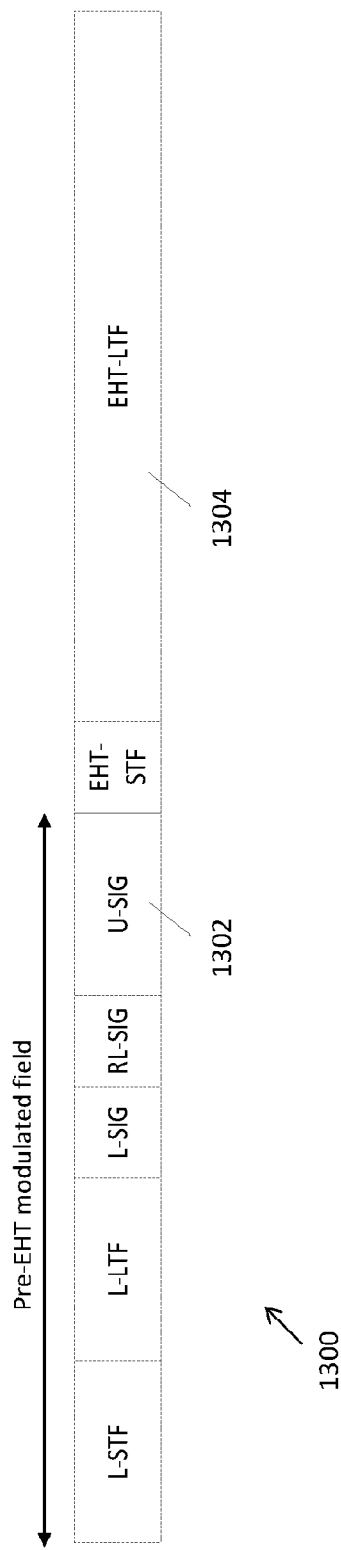
FIG. 13 depicts a first example format of a SU HARQ Feedback NDP.

According to the present disclosure, there are two different types of HARQ feedback. In terms of type 1 HARQ feedback, code block based HARQ feedback information is carried in a NDP, for example TB HARQ Feedback NDP as illustrated in FIG. 9 and SU HARQ Feedback NDP as illustrated in FIG. 13. Type 1 HARQ feedback can support a small number of code blocks per STA, but it may advantageously require smaller channel overhead. FIG. 5A depicts a flow chart 500 illustrating a downlink MU communication between an AP 502 and multiple STAs 504, 506, where type 1 HARQ feedback is enabled. Contention based channel access procedure, e.g. Enhanced Distributed Channel Access (EDCA) procedure, is illustrated by block 508, and Short Interframe Spacing (SIFS) 511 is illustrated. The AP 502 may generate a transmission signal (e.g. EHT basic PPDU) 510 carrying an A-MPDU in each user-specific allocation of the data field. The A-MPDU carried in a user-specific allocation of the data field is segmented into one or more code blocks. The A-MPDU carried in a user-specific allocation addressed to STA 504 contains trigger information to indicate type 1 HARQ feedback for STA 504. Similarly, the A-MPDU carried in a user-specific allocation addressed to STA 506 contains trigger information to indicate type 1 HARQ feedback for STA 506. In an embodiment, the trigger information is included in one or more trigger frame and the type of the one or more trigger frame indicates type 1 HARQ feedback. In an embodiment, the trigger frame is a NDP Feedback Report Poll (NFRP) trigger frame with the Feedback Type subfield indicating HARQ feedback as illustrated in FIG. 7A and FIG. 7B. In another embodiment, the trigger information is included in one or more control subfield of the A-MPDU and the type of the one or more control subfield indicates type 1 HARQ feedback. In an embodiment, the control subfield is a Triggered NDP Feedback Scheduling (TNFS) control subfield as illustrated in FIG. 8. In an embodiment, the trigger information comprises a HARQ codebook size, which indicates the maximum number of code blocks for which HARQ feedback information can be provided. The HARQ codebook size included in the trigger information for different STAs scheduled in a TB HARQ Feedback NDP shall be the same. In an embodiment, the trigger information comprises a RU tone set index, which indicates one or more RU tone set carrying HARQ feedback information in the EHT-LTF of a TB HARQ Feedback NDP. In an embodiment, the trigger information comprises a starting STS number, which indicates the starting space-time stream number among STAs multiplexed under the same set of tones in the same RU. The radio transmitter of AP 502 may transmit the generated transmission signal 510 to STAs 504, 506.

In IEEE 802.11 networks, a SIFS is the time spacing prior to transmission of an acknowledgement by a STA. After the last symbol of the transmission signal 510 is transmitted, a SIFS 511 may take effect, and at 513, the radio transmitters of STAs 504, 506 may simultaneously transmit their respective NDPs for example TB HARQ Feedback NDPs 514, 515, which are generated based on their respective trigger information included in the received transmission signal 510. In the TB HARQ Feedback NDPs 514, 515, HARQ feedback information for one or more code blocks for STAs 504, 506 are multiplexed in different RU tone sets and/or different space-time streams of the EHT-LTF. In an embodiment, the TB HARQ Feedback NDPs 514, 515 are generated based on the common HARQ codebook size obtained from the trigger information. In an embodiment, the TB HARQ Feedback NDPs 514, 515 are generated based on their respective RU tone set indices obtained from their respective trigger information. In an embodiment, the TB HARQ Feedback NDPs 514, 515 are generated based on their respective starting STS numbers obtained from their respective trigger information. The HARQ feedback information for each of the one or more code blocks of the TB HARQ Feedback NDPs 514, 515 may be either "ACK" or "NACK". In another embodiment, the HARQ feedback information for each of the one or more code blocks in the TB HARQ Feedback NDPs 514, 515 may be one of "ACK", "Type 1 NACK" and "Type 2 NACK".

Figure 5B:
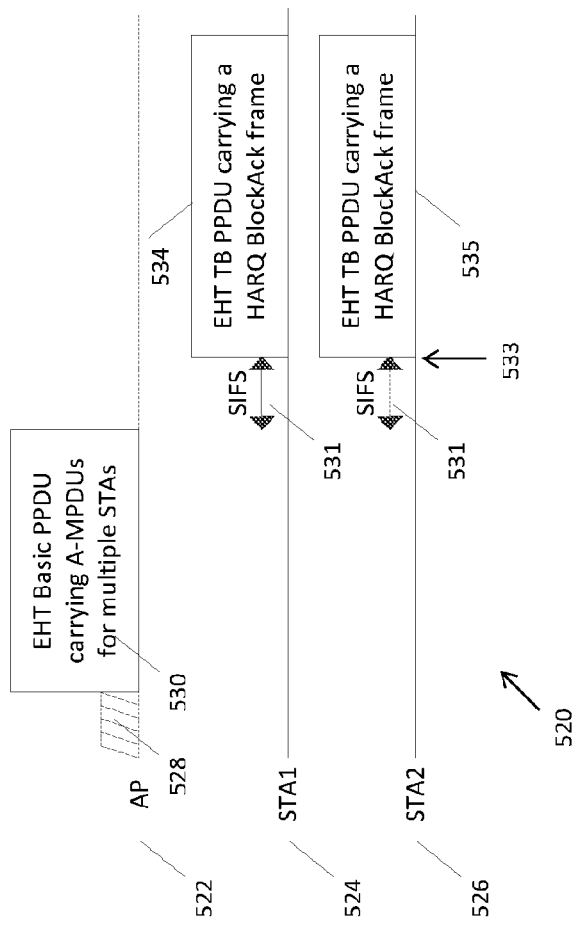
FIG. 5B depicts a flow chart illustrating downlink MU communications between an AP and multiple STAs where code block based type 2 HARQ feedback is enabled.
Figure 18A:
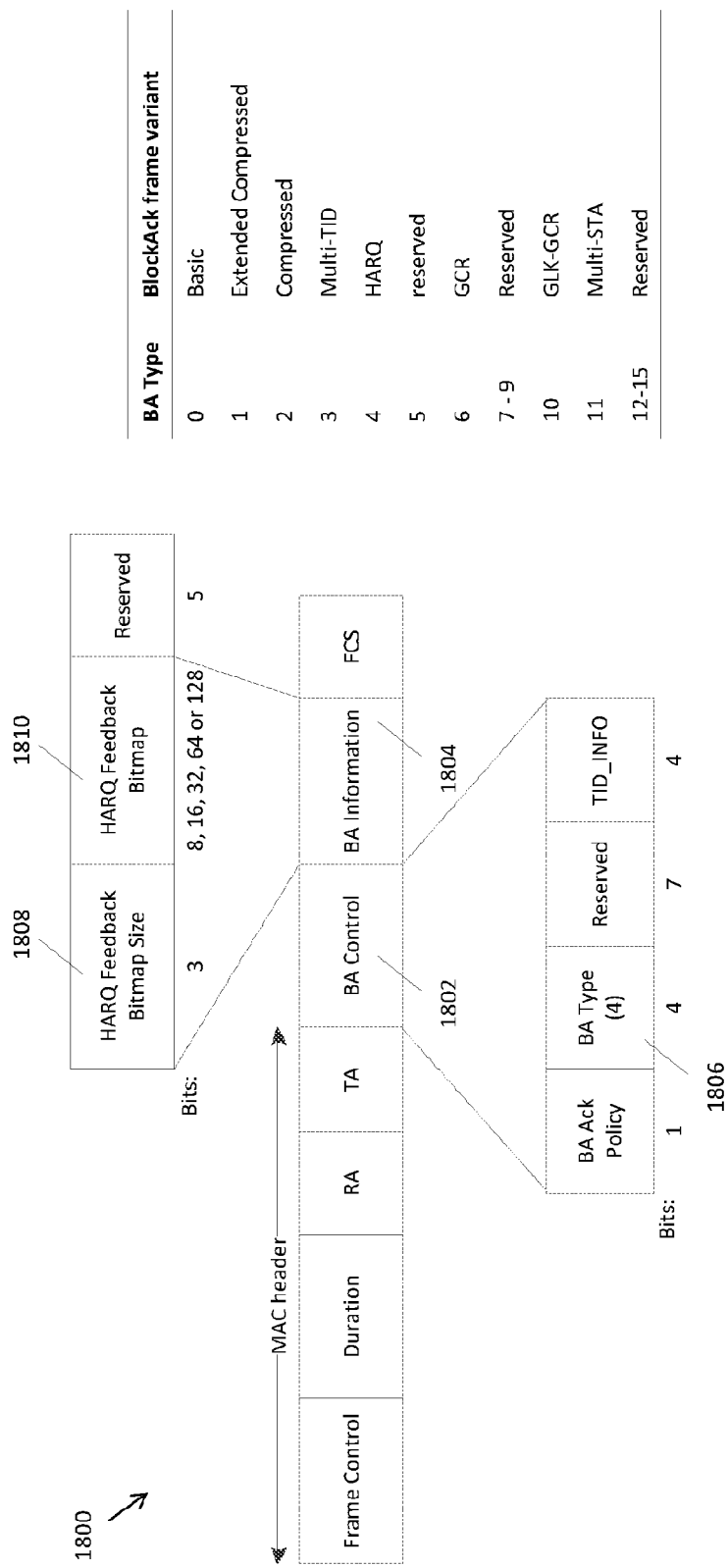
FIG. 18A depicts a first example format of a HARQ BlockcAck (BA) frame which can indicate two HARQ feedback statuses per code block.
Figure 18B:
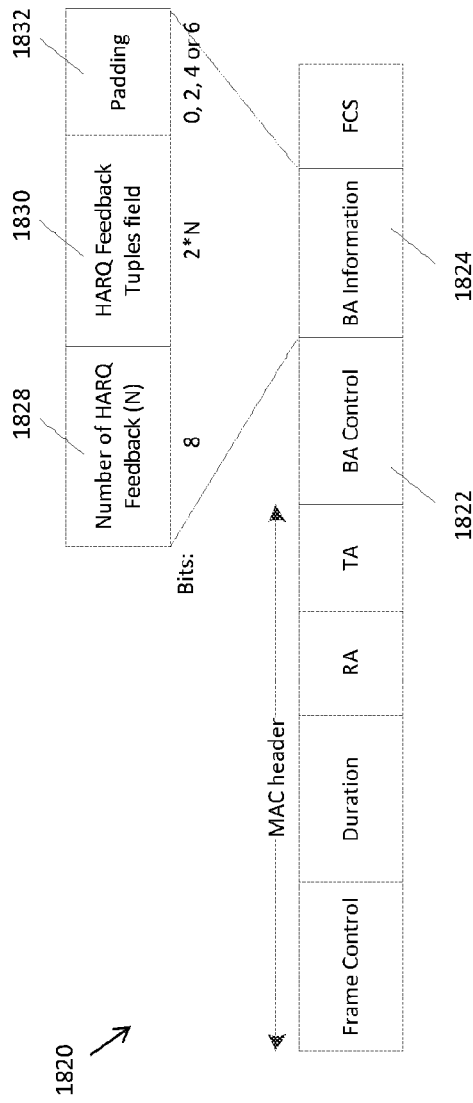
FIG. 18B depicts a second example format of a HARQ BA frame which can indicate three HARQ feedback statuses per code block.
Figure 19A:
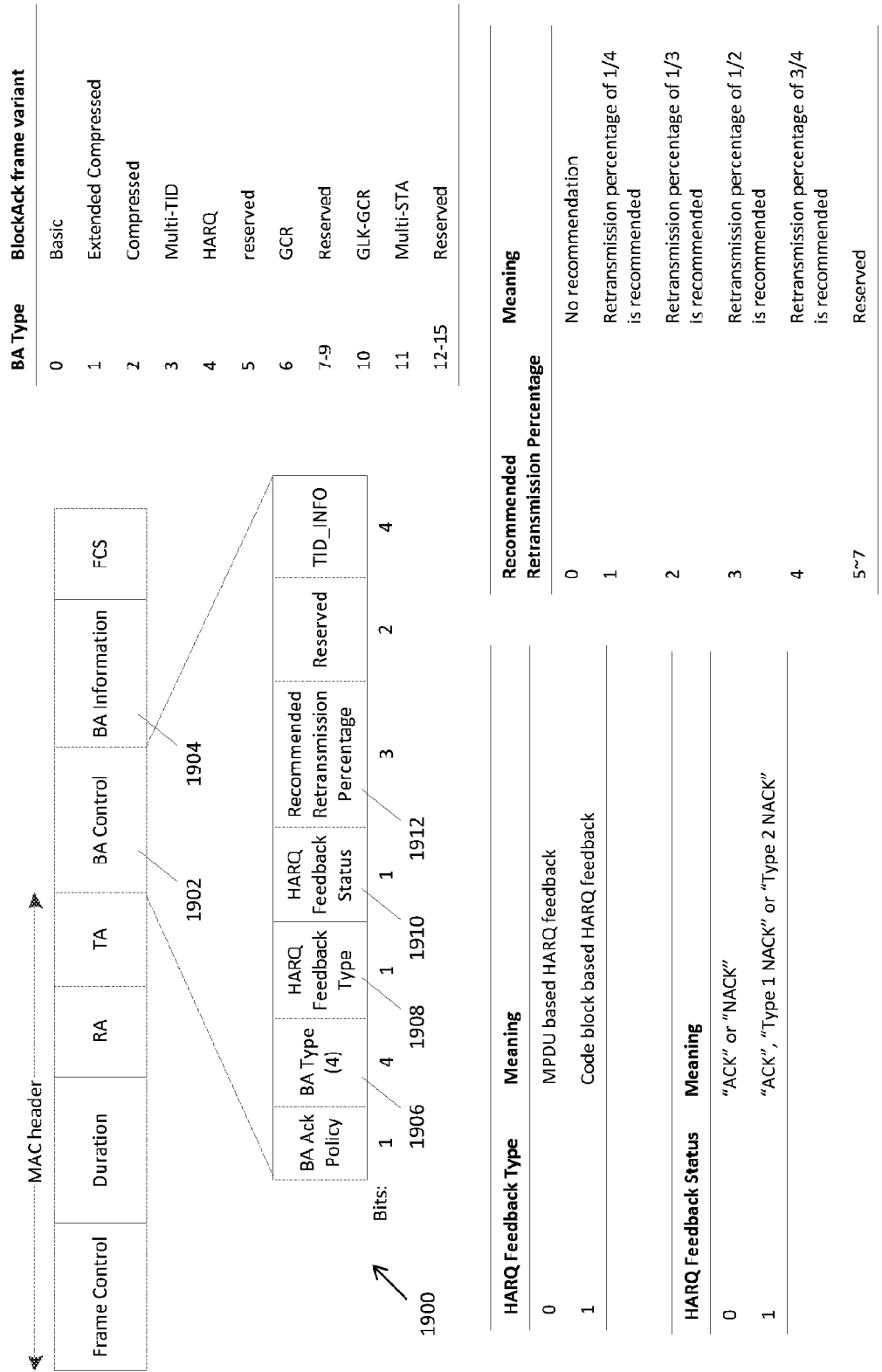
FIG. 19A depicts a third example of a HARQ BA frame.
Figure 20:
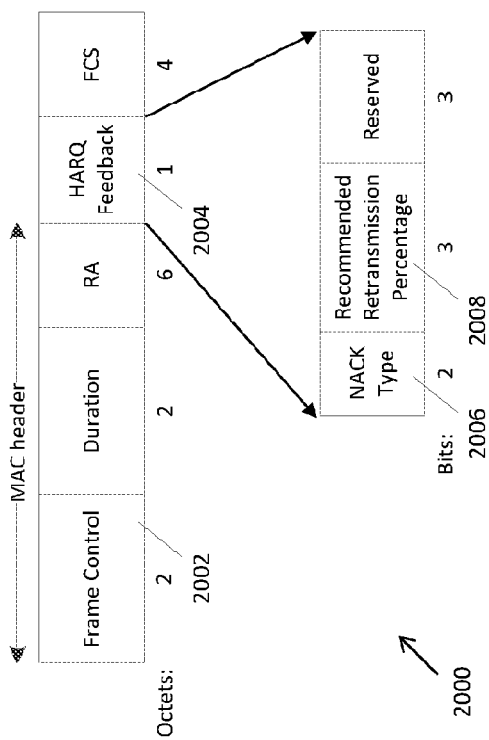
FIG. 20 depicts an example of a Nack (negative acknowledgment) frame.

In terms of type 2 HARQ feedback, code block or MPDU based HARQ feedback information is carried in a MAC frame, for example HARQ BlockAck frame as illustrated in FIGS. 18A, 18B and 19A to 19E, Ack frame and Nack frame as illustrated in FIG. 20. Type 2 HARQ feedback can support a large number of code blocks per STA but may result in a larger channel overhead. FIG. 5B depicts a flow chart 520 illustrating a downlink MU communication between an AP 522 and multiple STAs 524, 526, where code block based type 2 HARQ feedback is enabled. Contention based channel access procedure, e.g. EDCA procedure, is illustrated by block 528, and SIFS 531 is illustrated. The AP 522 may generate a transmission signal (e.g. EHT basic PPDU) 530 carrying an A-MPDU in each user-specific allocation of the data field. The A-MPDU carried in a user-specific allocation of the data field is segmented into one or more code block attached with CRC (i.e. type 2 or type 3 code block segmentation) and the code block segmentation type is indicated in the corresponding user-specific allocation information included in the transmission signal (e.g. in the HARQ-SIG field of an EHT basic PPDU). The A-MPDU carried in a user-specific allocation addressed to STA 524 contains trigger information to indicate type 2 HARQ feedback for STA 524. Similarly, the A-MPDU carried in a user-specific allocation addressed to STA 526 contains trigger information to indicate type 2 HARQ feedback for STA 526. In an embodiment, the trigger information is included in one or more trigger frame and the type of the one or more trigger frame indicates type 2 HARQ feedback. In an embodiment, the trigger frame is a basic trigger frame. In another embodiment, the trigger information is included in one or more control subfield of the A-MPDU and the type of the one or more control subfield indicates type 2 HARQ feedback. In an embodiment, the control subfield is a Triggered Response Scheduling (TRS) control subfield. The radio transmitter of AP 522 may transmit the generated transmission signal 530 to multiple STAs 524, 526.

After the last symbol of the transmission signal 530 is transmitted, a SIFS 531 may take effect, and at 533, the radio transmitters of STAs 524, 526 may simultaneously transmit their respective EHT TB PPDUs 534, 535, which are generated based on their respective trigger information included in the received transmission signal 530. The EHT TB PPDU 534 contains a HARQ BlockAck frame carrying HARQ feedback information for one or more code blocks for STA 524 while the EHT TB PPDU 535 contains a HARQ BlockAck frame carrying HARQ feedback information for one or more code blocks for STA 526. The HARQ feedback information for each of the one or more code blocks may be either "ACK" or "NACK". In another embodiment, the HARQ feedback information for each of the one or more code blocks may be one of "ACK", "Type 1 NACK" and "Type 2 NACK". In an embodiment, when a user-specific allocation addressed to a STA contains a single code block that requires HARQ feedback or a single MPDU that solicits immediate acknowledgement, a Ack frame or a Nack frame as illustrated in FIG. 20 may advantageously be used instead of a HARQ BlockAck frame by the STA to reduce signalling overhead. In this case, the EHT TB PPDU 534 may contain a Ack frame or a Nack frame, carrying HARQ feedback information for the single code block or the single MPDU for STA 524 or STA 526.

Figure 5C:
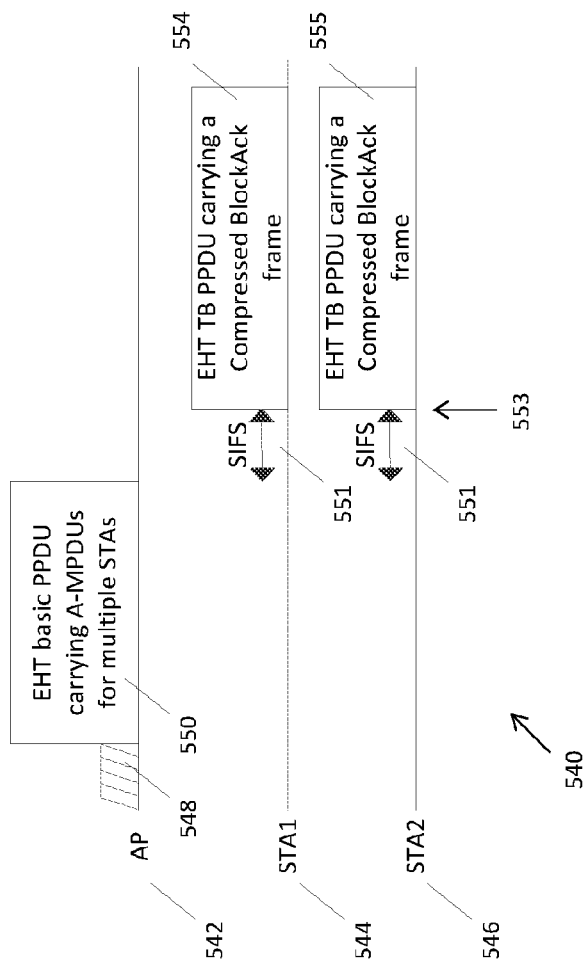
FIG. 5C depict a flow chart illustrating downlink MU communications between an AP and multiple STAs where MPDU based type 2 HARD feedback is enabled.

FIG. 5C depicts a flow chart 540 illustrating a communication between an AP 542 and multiple STAs 544, 546, where MPDU based type 2 HARQ feedback is enabled. Contention based channel access procedure, e.g. EDCA procedure, is illustrated by blocks 548, and SIFS 551 is illustrated. The AP 542 may generate a transmission signal (e.g. EHT basic PPDU) 550 carrying an A-MPDU in a user-specific allocation of the data field. The A-MPDU carried in a user-specific allocation of the data field is segmented into one or more code block not attached with CRC (i.e. type 1 code block segmentation) and the code block segmentation type is indicated in the corresponding user-specific allocation information included in the transmission signal (e.g. in the HARQ-SIG field of an EHT basic PPDU). The A-MPDU carried in a user-specific allocation addressed to STA 544 contains trigger information to indicate type 2 HARQ feedback for STA 544. Similarly, the A-MPDU carried in a user-specific allocation addressed to STA 546 contains trigger information to indicate type 2 HARQ feedback for STA 546. Due to type 1 code block segmentation is used for the A-MPDU carried in the user-specific allocation addressed to STA 544 or STA 546, MPDU based type 2 HARQ feedback mechanism is enabled for STA 544 and STA 546 where Compressed BlockAck frames are used to carry MPDU based HARQ feedback information. In an embodiment, the trigger information is included in one or more trigger frame and the type of the one or more trigger frame indicates Type 2 HARQ feedback. In an embodiment, the trigger frame is a basic trigger frame. In another embodiment, the trigger information is included in one or more control subfield of the A-MPDU and the type of the one or more control subfield indicates type 2 HARQ feedback. In an embodiment, the control subfield is a TRS control subfield. The radio transmitter of AP 542 may transmit the generated transmission signal 550 to multiple STAs 544, 546.

After the last symbol of the transmission signal 550 is transmitted, a SIFS 551 may take effect, and at 553, the radio transmitters of STAs 544, 546 may simultaneously transmit their respective EHT TB PPDUs 534, 535, which are generated based on their respective trigger information included in the received transmission signal 550. The EHT TB PPDU 554 contains a Compressed BlockAck frame carrying HARQ feedback information for one or more MPDU for STA 544 while the EHT TB PPDU 555 contains a Compressed BlockAck frame carrying HARQ feedback information for one or more MPDU for STA 546.

Figure 5D:
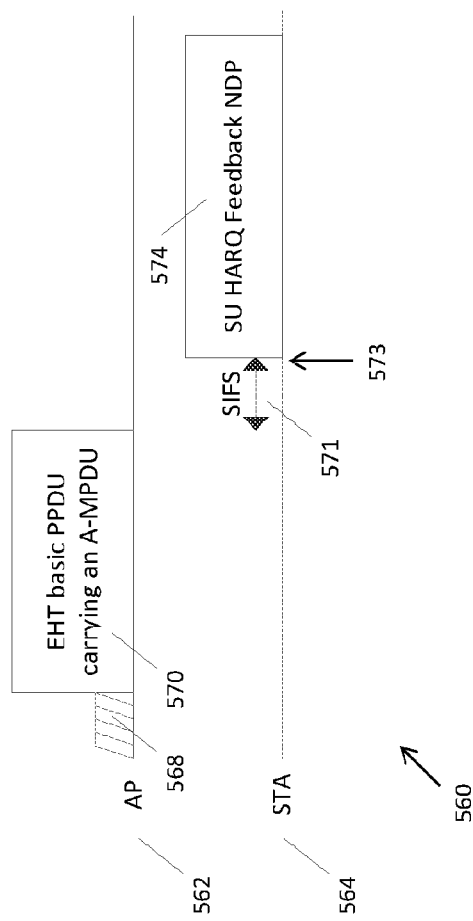
FIG. 5D depicts a flow chart illustrating downlink SU communications between an AP and a STA where type 1 HARQ feedback is enabled.

FIG. 5D depicts a flow chart 560 illustrating a downlink SU communication between an AP 562 and a STA 564, where type 1 HARQ feedback is enabled. Contention based channel access procedure, e.g. EDCA procedure, is illustrated by block 568, and SIFS 571 is illustrated. The AP 562 may generate a transmission signal (e.g. EHT basic PPDU) 570 carrying an A-MPDU in the data field. The A-MPDU carried in the data field is segmented into one or more code blocks. Unlike the HARQ operation in downlink MU communications, the solicited type 1 HARQ feedback is explicitly indicated in the transmission signal 570 (e.g. in the HARQ-SIG field of an EHT basic PPDU). The radio transmitter of AP 562 may transmit the generated transmission signal 570 to STA 564.

After the last symbol of the transmission signal 570 is transmitted, a SIFS 571 may take effect, and at 573, the radio transmitter of STA 562 may transmit a NDP, for example SU HARQ Feedback NDP 574, which is generated based on the HARQ feedback type indicated in the received transmission signal 570. The SU HARQ Feedback NDP 574 may include a signal field and a LTF that comprises a plurality of tone sets. The signal field may comprise a signalling to indicate a HARQ codebook size based on the number of code blocks in the received transmission signal 570. The signal field may further comprise a signalling to indicate one of the plurality of tone sets carrying HARQ feedback information, wherein a tone set in each of 20 MHz subchannels carries the same HARQ feedback information if a bandwidth of the transmission signal 570 is 40 MHz or above. In an embodiment, the HARQ feedback information for each of the one or more code blocks may be either "ACK" or "NACK". In another embodiment, the HARQ feedback information for each of the one or more code blocks may be one of "ACK", "Type 1 NACK" and "Type 2 NACK".

Figure 5E:
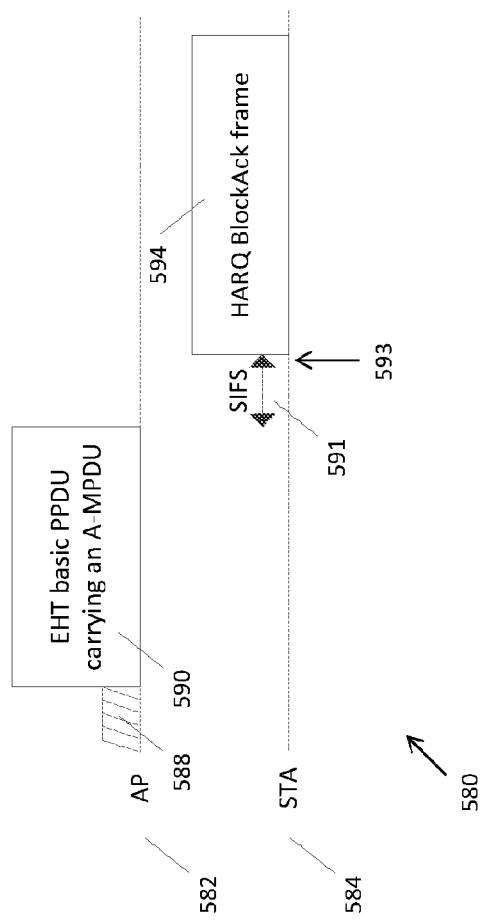
FIG. 5E depicts a flow chart illustrating downlink SU communications between an AP and a STA where type 2 HARQ feedback is enabled.

FIG. 5E depicts a flow chart 580 illustrating a downlink SU communication between an AP 582 and a STA 584, where type 2 HARQ feedback is enabled. Contention based channel access procedure, e.g. EDCA procedure, is illustrated by block 588, and SIFS 593 is illustrated. The AP 582 may generate a transmission signal (e.g. EHT basic PPDU) 590 carrying an A-MPDU in the data field. The A-MPDU in the data field may be segmented into one or more code block. Unlike the HARQ operation in downlink MU communications, the solicited type 2 HARQ feedback is explicitly indicated in the transmission signal 590 (e.g. in the HARQ-SIG field of an EHT basic PPDU). The radio transmitter of AP 584 may transmit the generated transmission signal 590 to STA 584.

After the last symbol of the transmission signal 590 is transmitted, a SIFS 591 may take effect, and at 593, the radio transmitter of STA 584 may transmit an EHT basic PPDU 594, which is generated based on the HARQ feedback type included in the received transmission signal 590. The EHT basic PPDU 594 may contain a HARQ BlockAck frame carrying HARQ feedback information for the one or more code blocks or MPDUs. The HARQ feedback information for each of the one or more code blocks or MPDUs may be either "ACK" or "NACK". In another embodiment, the HARQ feedback information for each of the one or more code blocks or MPDUs may be one of "ACK", "Type 1 NACK" and "Type 2 NACK". According to the present disclosure, when HARQ CC is applied to the data field of an EHT basic PPDU, for an initial transmission, all encoded bits in each code block are transmitted. For a code block with NACK, only a portion of the encoded bits may be retransmitted. The EHT basic PPDU 1234 may further include additional HARQ feedback information such as recommended retransmission percentage (e.g. ¼, ⅓, ½ or ¾) to help the AP 1222 appropriately determine the retransmitted bits for a code block with NACK. The retransmission percentage is the ratio of the number of retransmitted bits to the total number of encoded bits per code block.

In one embodiment, when the data field of the transmission signal 590 contains a single code block that requires HARQ feedback or a single MPDU that solicits immediate acknowledgement, the EHT basic PPDU 594 may contain a Ack frame or a Nack frame carrying HARQ feedback information for the single code block or the single MPDU as the Ack or Nack frame may advantageously reduce signalling overhead.

In one embodiment, when the data field of the transmission signal 590 contains a single code block that requires HARQ feedback or a single MPDU that solicits immediate acknowledgement, the AP 582 transmits the EHT basic PPDU 594 containing a Ack frame if the single code block or the single MPDU is successfully received. Otherwise the AP 582 does not transmit the EHT basic PPDU 594. By doing so, signalling overhead may be advantageously reduced.

In one embodiment, when the data field of the transmission signal 590 contains a single code block that requires HARQ feedback or a single MPDU that solicits immediate acknowledgement, the AP 582 transmits the EHT basic PPDU 594 containing a Nack frame if the single code block or the single MPDU is incorrectly received. Otherwise the AP 582 does not transmit the EHT basic PPDU 594. By doing so, signalling overhead may be advantageously reduced.

According to the present disclosure, the same type of HARQ feedback shall be solicited for different STAs addressed by a transmission signal (e.g. EHT basic PPDU 510 or 530). For example, the transmission signal 510 shall not solicit type 1 HARQ feedback for STA 504 and type 2 HARQ feedback for STA 506. The transmission signal 530 shall not solicit type 1 HARQ feedback for STA 524 and type 2 HARQ feedback for STA 526.

In the following paragraphs, certain exemplifying embodiments are explained with reference to an AP and a STA for HARQ operation in downlink MU communications.

Figure 6A:
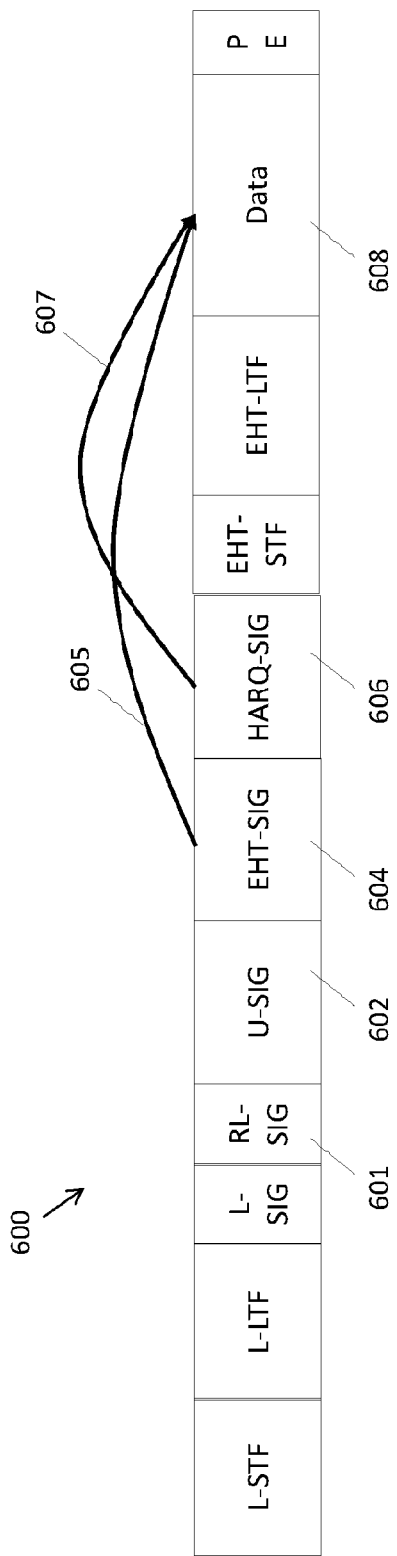
FIG. 6A depicts an example format of an EHT basic PPDU for HARQ operation.

FIG. 6A depicts an example format of an EHT basic PPDU 600 for HARQ operation in downlink MU communications. The EHT basic PPDU 600 may include a L-STF, a L-LTF, L-SIG field, a RL-SIG 601, a U-SIG field 602, an EHT-SIG field 604, a HARQ Signal (HARQ-SIG) field 606, an EHT-STF, an EHT-LTF, a Data field 608, and a PE field. Like FIG. 2A, the RL-SIG 601 is mainly used for identifying any PHY versions starting with 802.11be. The U-SIG 602 field contains the necessary information for decoding EHT-SIG field 604 (e.g. MCS for EHT-SIG field and number of EHT-SIG symbols), and indicates if HARQ operation is enabled for the EHT basic PPDU 600, and if it is enabled, a HARQ-SIG field 606 appending the EHT-SIG field 604. The U-SIG 602 and the EHT-SIG field 604 contain the necessary information for decoding the Data field 608. When the EHT basic PPDU 600 is transmitted to multiple STAs, the EHT-SIG field 604 provides OFDMA and MU-MIMO resource allocation information to allow STAs to look up the corresponding resources to be used in the Data field 608, like indicated by an arrow 605.

Figure 6B:
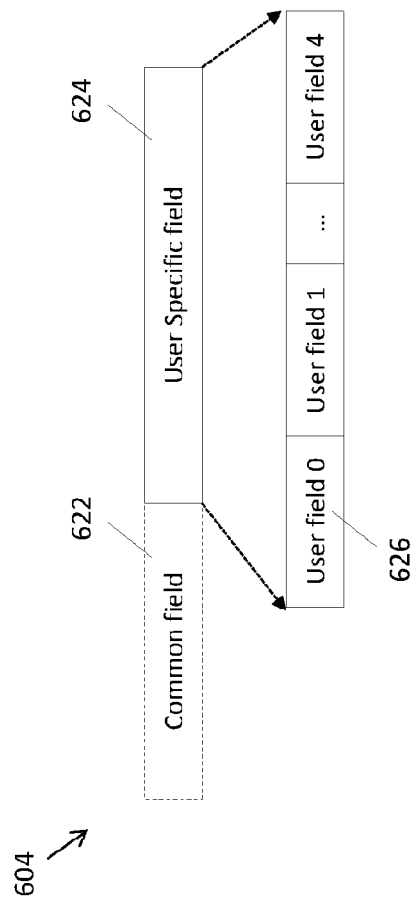
FIG. 6B depicts the EHT-SIG (EHT Signal) field in more detail.

FIG. 6B depicts the EHT-SIG field 604 in more detail. The EHT-SIG field 604 includes (or consists of) a Common field 622, if present, followed by a User Specific field 624 which together are referred to as EHT-SIG content channel. A user field like User field 0 626 may indicate whether HARQ operation is enabled for a corresponding user-specific allocation. For the user-specific allocation with HARQ operation enabled, the HARQ-SIG field 606 provides HARQ operation related control information to allow STAs to look up the information to be used in the Data field 608, like indicated by an arrow 607. The HARQ operation related control information may comprise: code blocks to be transmitted (for example using code block bitmap); new data indication (i.e. whether HARQ transmission is an initial transmission or a retransmission); code blocks which require HARQ feedback if HARQ transmission is an initial transmission; code block segmentation type; code block size; HARQ type (i.e. HARQ chase combining (CC) or incremental redundancy (IR)); puncturing pattern for HARQ CC; and redundancy version for HARQ IR.

HARQ operation shall be disabled for a user-specific allocation of an EHT basic PPDU when the intended STA does not support HARQ operation. Further, HARQ operation may be disabled for a user-specific allocation of an EHT basic PPDU when an A-MPDU carried in the user-specific allocation does not include any MPDU that solicits immediate acknowledgement. For example, HARQ operation may be disabled for a user-specific allocation of an EHT basic PPDU when an A-MPDU carried in the user-specific allocation is transmitted in the context of Data Enabled No Immediate Response or in the context of Control Response. A code block may not require HARQ feedback if the one or more MPDU corresponding to the code block does not solicit immediate acknowledgement. Therefore, A-MPDU subframes including MPDUs that solicit immediate acknowledgement, together with any A-MPDU pre-end-of-frame (pre-EOF) padding necessary for the A-MPDU subframes to meet minimum MPDU start spacing requirement, may be consecutively placed in an A-MPDU so that the corresponding code blocks requiring HARQ feedback are numbered consecutively.

According to one example, in HARQ-SIG field, code blocks which require HARQ feedback can be indicated by a starting code block number and the number of code blocks requiring HARQ feedback. This may advantageously reduce HARQ signalling overhead and HARQ feedback overhead.

FIGS. 7A and 7B show an example of an NDP Feedback Report Poll (NFRP) trigger frame 700 used for soliciting type 1 HARQ feedback between an AP and multiple STAs in an EHT WLAN. The NFRP trigger frame 700 is a variant of the existing trigger frame and may be carried in the EHT basic PPDU 510 in FIG. 5A. The NFRP trigger frame 700 may include a Frame Control field, a Duration field, a RA (recipient STA address) field, a TA (transmitting STA address) field, a Common Info field, one or more User Info fields such as User Info field 704, a padding field and a FCS (frame check sequence) field. The Frame Control field, Duration field, RA field and TA field may be grouped in a MAC header of the NFRP trigger frame 700. The Common Info field 702, one or more User Info fields 704 and padding field may be grouped in a frame body of the NFRP trigger frame 700.

TABLE 1

UL bandwidth and β value based on the values of UL BW subfield 708 and UL BW MSB subfield 710 in Common Info field 702 of NFRP Trigger frame 700.

| UL BW MSB subfield value | UL BW subfield value | Description |
| --- | --- | --- |
| 0 | 00 | 20 MHz, β = 1 |
| 0 | 01 | 40 MHz, β = 2 |
| 0 | 10 | 80 MHz, β = 4 |
| 0 | 11 | 80 + 80 or 160 MHz, β = 8 |
| 1 | 00 | 160 + 80 or 240 MHz, β= 12 |
| 1 | 01 | 160 + 160 or 320 MHz, β = 16 |
| 1 | 10-11 | Reserved |

FIG. 7A shows the example Common Info field 702 in more detail. The Common Info field 702 contains common parameters for all STAs that are engaged in TB HARQ Feedback NDP transmission solicited by the NFRP trigger frame 700. The Common Info field 702 includes (or consists of) a Trigger Type subfield 706, a UL (uplink) Length subfield, a More TF (trigger frame) subfield, a CS (carrier sense) subfield, an UL BW (bandwidth) subfield 708, a GI (guard interval) And LTF Type subfield, an UL BW MSB subfield 710, a Number of EHT-LTF Symbols And Midamble Periodicity subfield, an AP TX (transmission) Power subfield and an UL U-SIG Reserved subfield. The Trigger type subfield 706 of the Common Info field 702 has a value of 7, referring to the NPRP Trigger frame 700. The value of UL BW subfield 708, together with the value of UL BW MSB subfield 710 may indicate the UL bandwidth and a β value, according to table 1.

TABLE 2

Value of HARQ_CODEBOOK_SIZE based the value of HARQ Codebook Size subfield 716 in User Info field 704 of NFRP Trigger frame 700.

| HARQ Codebook Size subfield value | Description |
| --- | --- |
| 0 | HARQ_CODEBOOK_SIZE = 1 |
| 1 | HARQ_CODEBOOK_SIZE = 2 |
| 2 | HARQ_CODEBOOK_SIZE = 3 |
| 3 | HARQ_CODEBOOK_SIZE = 4 |
| 4 | HARQ_CODEBOOK_SIZE = 6 |
| 5 | HARQ_CODEBOOK_SIZE = 9 |
| 6 | Reserved |
| 7 | Reserved |

FIG. 7B depicts the one or more example User Info field 704 in more detail. Each User Info field 704 includes (or consists of) a Starting AID (association identifier) subfield 712, a Feedback Type subfield 714, a HARQ Codebook size subfield 716, a UL Target RSSI (received signal strength indicator) subfield, and a Multiplex Flag subfield. The scheduled STAs are identified by a range of AIDs; and the Starting AID field defines the first AID of the range of AIDs that are scheduled to respond to the NFRP trigger frame. The Feedback Type subfield 714 has a value of 1, indicating an operation for soliciting HARQ feedback. The UL Target RSSI subfield 718 indicates the target received signal power of the NDP feedback report response for all scheduled STAs. The Multiplexing Flag subfield 720 indicates the number of STAs that are multiplexed on the same set of tones in the same RU and is encoded as the number of STAs minus 1. The HARQ Codebook Size subfield indicates the maximum number of code blocks for which HARQ feedback information can be provided, i.e. HARQ_CODEBOOK_SIZE, according to Table 2. The total number of STAs, $N_{STA}$, that are scheduled to respond to the NFRP trigger frame is calculated using Equation 1, presented as follow:

$$N_{STA} = \lfloor 18/\text{HARQ\_Codebook\_Size} \rfloor \times \beta \times (\text{Multiplexing\_Flag} + 1) \quad \text{(Equation 1)}$$

Where the number 18 is the number of tone sets per 20 MHz subchannel, β is dependent on the values of the UL BW subfield 708 and UL BW MSB subfield 710 in the Common Info field 702 according to Table 1, and Multiplexing Flag is the value of the Multiplexing Flag subfield 720.

FIG. 8 depicts show an example of a frame carrying Triggered NDP Feedback Scheduling (TNFS) control subfield 800 used for soliciting type 1 HARQ feedback between an AP and a STA in an EHT WLAN. A frame carrying TNFS control subfield 800 may be included in the EHT basic PPDU 510 in FIG. 5A. A frame carrying TNFS control subfield 800 includes a MAC header 802, a frame body and a FCS, wherein the MAC header 802 consists of a Frame Control subfield, a Duration/ID subfield, four Address subfields, a Sequence Control subfield, a QoS (Quality of Service) Control subfield and a HT (high throughput) Control 804 subfield. The HE variant HT Control field 806 is a variant of the HT Control subfield 804 and comprises a VHT (Very High Throughput) field, a HE field, a Control ID field 808 and a 26-bit Control Information field 810. The Control ID 808 has a value of 7, referring to TNFS control subfield. In first embodiment (option 1), the 26-bit Control Information field 810 may include HARQ feedback trigger information, such as a UL BW subfield 812, a RU Tone Set Index subfield 814, a Starting STS Number subfield 816, a HARQ Codebook Size subfield 818. The Control Information field 810 may further comprise a DL TX (downlink transmission) Power subfield and a UL Target RSSI subfield. In a second embodiment (option 2) of the 26-bit Control Information field 810, the UL BW subfield 812 is set to the bandwidth of the EHT basic PPDU soliciting TB HARQ Feedback NDP transmission, therefore the 3-bit subfield may be released as Reserved subfield 822 in the Control Information field 810. In a third embodiment (option 3) of the 26-bit Control Information field 810, the 9-bit RU Tone Set Index 814, 824 and 3-bit HARQ Codebook Size 818, 828 can be jointly signalled through a 10-bit RU Tone Set Index And HARQ Codebook Size subfield 834, that is, the RU tone set index and HARQ codebook size are correlated in a same subfield thus freeing an additional 2 bit to Reserved subfield 832 in the Control Information field 810. A value of the 10-bit subfield 834 (up to 1024 different values, from 0 to 1023) can be converted to a RU tone set index and a HARQ codebook size according to Table 3. The correlation in the table can be demonstrated as follow: there are 288 RU tone sets in 320 MHz channel (18 in each 20 MHz subchannel); a RU tone set index ranged from 1 to the maximum value 288 when HARQ codebook size is 1 (a maximum of 1 code block for which HARQ feedback information can be provided); The number of RU tone sets reduces with increased HARQ codebook size, determined by dividing the number 288 with the HARQ codebook size, which corresponds to 144

$$\left(\text{or } \frac{288}{2}\right), 96\left(\text{or } \frac{288}{3}\right), 64\left(\text{or } \frac{288}{4}\right), 48\left(\text{or } \frac{288}{6}\right) \text{ and } 32\left(\text{or } \frac{288}{9}\right),$$

when HARQ codebook size is 2, 3, 4, 6, and 9, respectively. Collectively, the HARQ feedback trigger information such as UL BW, RU tone set index, starting STS number, and HARQ codebook size derived from the TNFS control subfield, in any of the Control Information subfield layout options, may be used for intended STA to determine one or more RU tone set for carrying HARQ feedback information.

TABLE 3

Reference table for RU_TONE_SET_INDEX subfield value and HARQ_CODEBOOK_SIZE value from the RU Tone Set Index And HARQ Codebook Size subfield 834 value.

| RU Tone Set Index And HARQ Codebook Size subfield value | RU_TONE_SET_INDEX | HARQ_CODEBOOK_SIZE |
|---|---|---|
| 0-287 | 1-288 | 1 |
| 288-431 | 1-144 | 2 |
| 432-527 | 1-96 | 3 |
| 528-591 | 1-64 | 4 |
| 592-639 | 1-48 | 6 |
| 640-671 | 1-32 | 9 |
| 672-1023 | Reserved | Reserved |

FIG. 9 depicts an example format of a TB HARQ Feedback NDP 900, which may be used in FIG. 5A. The TB HARQ Feedback NDP 900 is a variant of EHT TB PPDU 212 in FIG. 2B without a Data field and a PE field. The TB HARQ Feedback NDP 900 includes (or consists of) a L-STF, a L-LTF, a L-SIG, a RL-SIG, a U-SIG field 902, an EHT-STF and an EHT-LTF 904. The L-STF, L-LTF, L-SIG, RL-SIG, and U-SIG 902 may be grouped as pre-EHT modulated fields, having durations of 8 µs, 8 µs, 4 µs, 4 µs, and 8 µs, respectively. The EHT-STF has a duration of 8 µs. The EHT-LTF 904 may contain two EHT-LTF symbols with a duration of 32 µs (16 µs per symbol). The EHT-STF and the pre-EHT modulated field are only transmitted on the 20 MHz subchannel where the STA is assigned. For example, EHT TB PPDUs can be used for transmitting the TB HARQ Feedback NPD 900 by STAs 524, 526 when EHT basic PPDU 530 is transmitted to STAs 524, 526, as illustrated in FIG. 5A

In an embodiment, a scheduled STA is assigned a tone set for each code block number CODE_BLOCK_NUMBER, which comprises two tone subsets corresponding to two feedback statuses (FEEDBACK_STATUS "0" or "1"), respectively. The tone set for a scheduled STA can be determined from RU_TONE_SET_INDEX, HARQ_CODEBOOK_SIZE, CODE_BLOCK_NUMBER and UL bandwidth according to Tables 5 to 20. In an embodiment, for each code block, FEEDBACK_STATUS is set to "0" or "1" corresponding to two HARQ feedback statuses, positive acknowledgement (ACK) or negative acknowledgement (NACK), respectively. FEEDBACK_STATUS "0", or "ACK", may indicate a successful receipt of the code block by the STA, whereas FEEDBACK_STATUS "1", or "NACK" may indicate incorrectly receiving the code block by the STA. Subsequently, for each CODE_BLOCK_NUMBER, the scheduled STA transmits at the tone subset corresponding to the FEEDBACK_STATUS. If "NACK" for a code block is transmitted to the AP, the AP may retransmit the code block. In an embodiment, the retransmitted code block may combine with previously transmitted code block in the STA, and the combination may expect a HARQ combining gain suffice for correcting the transmission error.

In another embodiment, a scheduled STA is assigned a tone set for each code block number CODE_BLOCK_NUMBER, which comprises two feedback statuses, FEEDBACK_STATUS "0", "1" or "2". For each code block, FEEDBACK_STATUS is set to "0", "1" or "2" corresponding to HARQ feedback statuses of "ACK", "Type 1 NACK" or "Type 2 NACK", respectively. FEEDBACK_STATUS "0", or "ACK", may indicate a successful receipt of the code block by the STA; FEEDBACK_STATUS "1", or "Type 1 NACK", may indicate "NACK" for the code block but HARQ combining gain may be expected; FEEDBACK_STATUS "2", or "Type 2 NACK" may indicate "NACK" for the code block but HARQ combining gain may not be expected. HARQ combining gain may not be expected when a performance of decoding the code block in a current transmission is determined to be bad, for instance, according to the total LLR (likelihood ratio) of the code block. Subsequently, for each CODE_BLOCK_NUMBER, under FEEDBACK_STATUS is "0" or "1" (ACK or Type 1 NACK), the scheduled STA transmits at the tone subset corresponding to the FEEDBACK_STATUS, or else under FEEDBACK_STATUS is "2" (Type 2 NACK), the scheduled STA does not transmit at both the tone subsets. If "Type 1 NACK" for the code block is transmitted to the AP, the AP may retransmit the code block. In an embodiment, the retransmitted code block may combine with previously transmitted code block in the STA, and the combination may expect HARQ combining gain suffice for correcting the transmission error. If "Type 2 NACK" for the code block is transmitted to the AP, the AP may retransmit one or more MPDUs corresponding to the code block to recover the transmission.

As presented in Tables 5 to 20, a set of EHT-LTF subcarrier indices which are used to carry HARQ feedback information for a code book of a STA, $K_{tone\_NDP_u}$, may depend on the RU_TONE_SET_INDEX of the STA, the FEEDBACK_STATUS of the code block, the CODE_BLOCK_NUMBER of the code block, the HARQ_CODEBOOK_SIZE, and the UL bandwidth. The CODE_BLOCK_NUMBER of a code block may be determined by subtracting the actual code block number with the starting code block number that is indicated in the HARQ-SIG field in the EHT basic PPDU. In an embodiment under a NFRP trigger frame 700 with the Feedback Type subfield referring to HARQ feedback, the RU_TONE_SET_INDEX correlates to HARQ_CODEBOOK_SIZE and is calculated based on Equation 2, presented as follow:

$$RU\_TONE\_SET\_INDEX = 1 + [(AID - Starting\ AID) \quad \text{(Equation 2)}$$
$$\mod(18/HARQ\_CODEBOOK\_SIZE) \times \beta]$$

Alternatively, in an embodiment under a frame carrying TNFS control subfield 800, RU_TONE_SET_INDEX is determined from the RU Tone Set Index subfield 814, 824 or the RU Tone Set Index And HARQ Codebook Size subfield 834 according to FIG. 8 or Table 3.

FIG. 10 illustrates generation of the EHT-LTF of a TB HARQ Feedback NDP. Firstly, for each subcarrier k belonging to $K_{tone\_NDP_u}$ for each of code blocks of a user u, the corresponding subcarrier value 1002, $EHTLTF_{k,u}^{TB\_NDP}$, is taken from a common EHT-LTF sequence according to Equation 3.

$$EHTLTF_{k,u}^{TB\_NDP} = \begin{cases} EHTLTF_k, & \text{if } k \in K_{tone\_NDP_u} \\ 0, & \text{otherwise} \end{cases} \quad \text{(Equation 3)}$$

where $EHTLTF_k$ is the value of the common EHT-LTF sequence on subcarrier k, which depends on the UL bandwidth.

Secondly, the subcarrier values for all the subcarriers belonging to $K_{tone\_NDP_u}$ for each of code blocks of a user u are mapped to two EHT-LTF symbols using the $(M_u+1)$-th row of $P_{EHTLTF}$ 1004 which is defined in Equation 4.

$$P_{ETHLTF} = \begin{bmatrix} 1 & -1 \\ 1 & 1 \end{bmatrix} \quad \text{(Equation 4)}$$

where $M_u$ is the starting STS number (i.e. STARTING_STS_NUM) of user u. For instance, a STARTING_STS_NUM value of 0, corresponds to the $1^{st}$ row of $P_{EHTLTF}$, which is [1 −1], whereas a STARTING_STS_NUM value of 1, corresponds to the $2^{nd}$ row of $P_{EHTLTF}$, which is [1 1]. In an embodiment under a NFRP trigger frame 700 with the Feedback Type subfield referring to HARQ feedback, the STARTING_STS_NUM of a user is calculated using Equation 5:

$$STARTING\_STS\_NUM = \quad \text{(Equation 5)}$$
$$\lfloor (AID - Starting\ AID) / \lfloor 18/HARQ\_CODEBOOK\_SIZE \rfloor /$$
$$\beta \rfloor$$

Alternatively, in an embodiment under a frame carrying TNFS control subfield, STARTING_STS_NUM is determined from the Starting STS Number field 816, 826, 836 carried within Control Information subfield 810 according to FIG. 8.

Further, the two EHT-LTF symbols for a user may adopt a user-specific spatial multiplexing matrix Q 1006 to provide multiple transmission streams to the corresponding transmitters 1010, 1011. Each transmission stream may then adopt an inverse discrete Fourier transform (IDFT) 1008, 1009 and convert from a signal from discrete frequency domain to discrete time domain for transmission.

Figure 11:
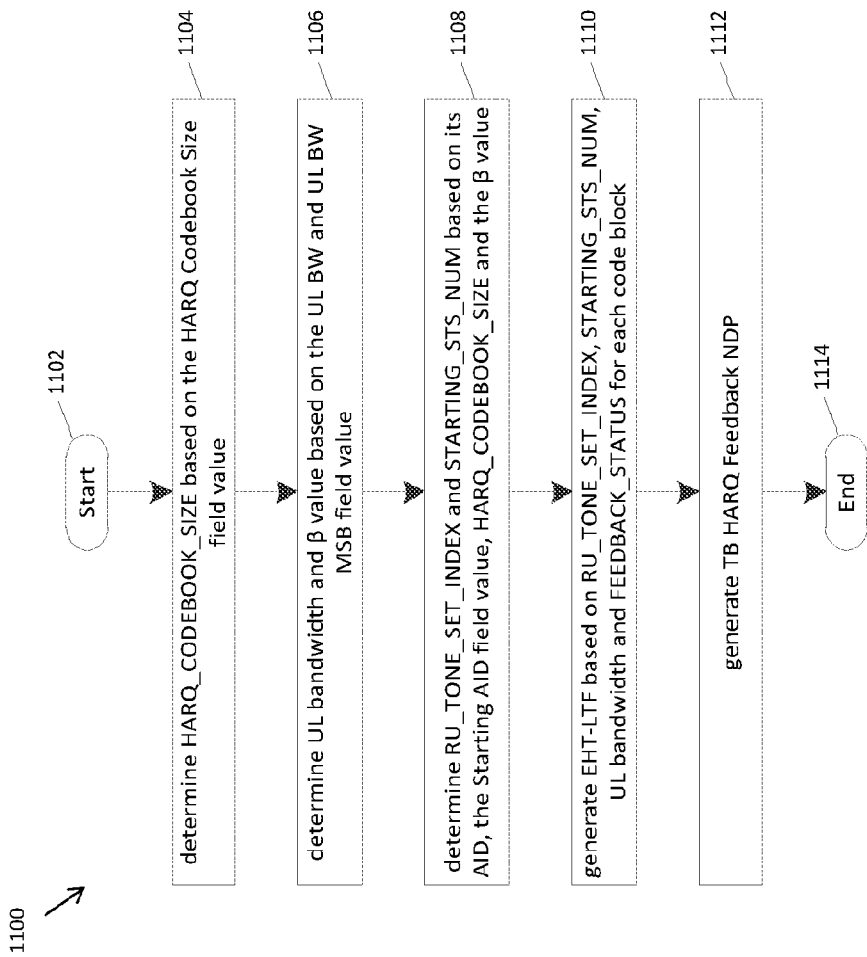
FIG. 11 depicts a flow chart illustrating processing of a received NFRP trigger frame with the Feedback Type subfield referring to HARQ feedback at a STA.

FIG. 11 depicts a flow chart 1100 illustrating processing of a received NFRP trigger frame with the Feedback Type subfield referring to HARQ feedback at a STA. Processing may start when a STA receives a NFRP trigger frame with the Feedback Type subfield referring to HARQ feedback at 1102. At 1104, HARQ_CODEBOOK_SIZE is determined based on the HARQ Codebook Size field value, in reference with Table 2. At 1106, UL bandwidth and β value is determined based on the UL BW and UL BW MSB field value, according to Table 1. At 1108, RU_TONE_SET_INDEX and STARTING_STS_NUM are determined based on AID, the Starting AID field value, HARQ_CODEBOOK_SIZE and the β value, according to Equations 2 and 5, respectively. At 1110, the EHT-LTF is generated based on the calculated RU_TONE_SET_INDEX, STARTING_STS_NUM, UL bandwidth and FEEDBACK_STATUS for each code block. At 1012, TB HARQ Feedback NDP is generated, and the generated TB HARQ Feedback NDP may be transmitted from the STA at 1114.

Figure 12:
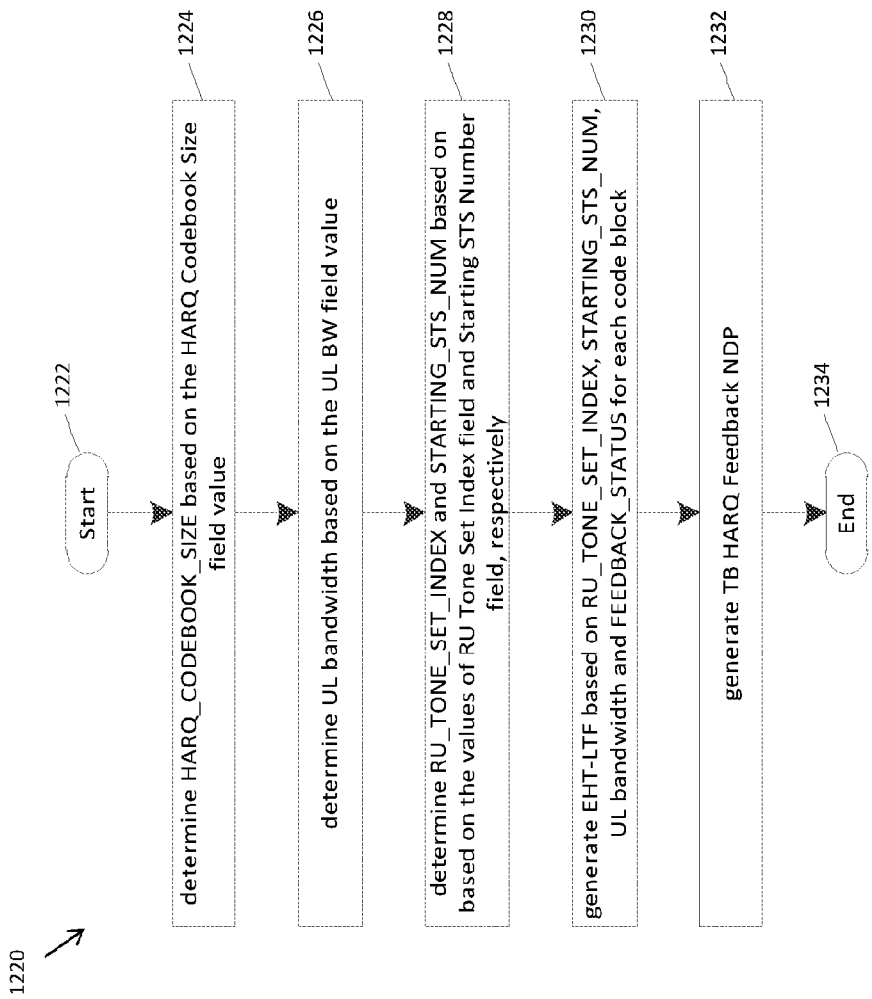
FIG. 12 depicts a flow chart illustrating processing of a received MAC frame with the TNFS control subfield at a STA.

FIG. 12 depicts a flow chart 1220 illustrating processing of a received frame carrying TNFS control subfield at a STA. Processing may start when a STA receives a frame carrying TNFS control subfield at 1222. At 1224, HARQ_CODEBOOK_SIZE is determined based on the HARQ Codebook Size field value or the RU Tone Set Index And HARQ Codebook Size field value, in reference with FIG. 8. At 1226, UL bandwidth is determined, e.g. based on the UL BW field value. At 1228, RU_TONE_SET_INDEX and STARTING_STS_NUM are determined based RU Tone Set Index field and Starting STS Number field value, respectively. Alternatively RU_TONE_SET_INDEX may be determined based RU Tone Set Index And HARQ Codebook Size field value. At 1230, the EHT-LTF is generated based on the calculated RU_TONE_SET_INDEX, STARTING_STS_NUM, UL bandwidth and FEEDBACK_STATUS for each code block. At 1232, TB HARQ Feedback NDP is generated, and the generated TB HARQ Feedback NDP may be transmitted from the STA at 1234.

In the following paragraphs, certain exemplifying embodiments are explained with reference to an AP and a STA for HARQ operation in downlink SU communications; wherein the AP is the transmitter and the STA is the recipient. For uplink SU communications, the STA is the transmitter and the AP is the recipient. It is appreciable to those skilled in the art that the embodiments for downlink SU communications can be easily adapted for uplink SU communications.

FIG. 13 depicts a first example format of a SU HARQ Feedback NDP 1300, which may be used in FIG. 5D. The SU HARQ Feedback NDP 1300 is a variant of EHT basic PPDU 200 in FIG. 2A without an EHT-SIG field, a Data field and a PE field. The SU HARQ Feedback NDP 1300 includes (or consists of) a L-STF, a L-LTF, a L-SIG field, a RL-SIG, a U-SIG field 1302, an EHT-STF and an EHT-LTF 1304. The L-STF, L-LTF, L-SIG field, RL-SIG, and U-SIG field 1302 may be grouped as pre-EHT modulated fields, having durations of 8 μs, 8 μs, 4 μs, 4 μs, and 8 μs, respectively. The EHT-STF has a duration of 4 μs. The EHT-STF and the pre-EHT modulated field may transmit in all the 20 MHz subchannels. The EHT-LTF 1304 contains two EHT-LTF symbols with a duration of 32 μs (16 μs per symbol). The U-SIG field 1302 may indicate information on the format of the SU HARQ Feedback NDP 1300. The U-SIG field 1302 may also indicate information such as RU tone set index (RU_TONE_SET_INDEX$_{SIG-A}$), HARQ codebook size (HARQ_CODEBOOK_SIZE), multiplexing flag (MULTIPLEXING_FLAG), bandwidth and starting code block number (STARTING_CODE_BLOCK_NUMBER). The U-SIG field 1302 may further comprise additional HARQ feedback information (e.g. recommended retransmission percentage). In an embodiment, the HARQ codebook size may depend on the number of code block in the received EHT basic PPDU. In an embodiment, when the value is MULTIPLEXING_FLAG is 0, the HARQ codebook size indicates the maximum number of code blocks for which HARQ feedback information can be provided.

In an embodiment, in downlink SU communications, an AP transmits an EHT basic PPDU to solicit HARQ feedback from an intended STA, the STA assigns a tone set in each of 20 MHz subchannels for each code block number CODE_BLOCK_NUMBER, which comprises two tone subsets corresponding to two FEEDBACK_STATUS "0" and "1", respectively. In an embodiment, when MULTIPLEX_FLAG is "1", the code block with CODE_BLOCK_NUMBER (CODE_BLOCK_NUMBER=0, 1, . . . , HARQ_CODEBOOK_SIZE−1) has the same tone sets as the code block (CODE_BLOCK_NUMBER+HARQ_CODEBOOK_SIZE). In an embodiment where HARQ_CODEBOOK_SIZE is 9, code blocks with CODE_BLOCK_NUMBER 0 and 9 (0+9=9) have the same tone sets. The indices of the tone sets in all the 20 MHz subchannels which carry the same HARQ feedback information per code block can be derived using Equation 6:

$$\text{RU\_TONE\_SET\_INDEX} = \text{RU\_TONE\_SET\_INDEX}_{SIG-A} + (18/\text{HARQ\_CODEBOOK\_SIZE}) \times n \quad \text{(Equation 6)}$$

where RU_TONE_SET_INDEX$_{SIG-A}$ is the tone set index in the lowest 20 MHz subchannel used for HARQ feedback indicated in the U-SIG field, HARQ_CODEBOOK_SIZE is indicated in the U-SIG field which may depend on the number of code block in the received EHT basic PPDU and relate to a maximum number of code block which HARQ feedback information can be provided, and the value n which depends on the bandwidth of the SU HARQ Feedback NDP 1300 according to Table 4.

According to the present disclosure, for each code block, the tone sets carrying HARQ feedback information can be determined from RU_TONE_SET_INDEX, HARQ_CODEBOOK_SIZE, CODE_BLOCK_NUMBER and bandwidth according to Tables 5 to 20.

In an embodiment, for each code block, FEEDBACK_STATUS is set to "0" or "1" corresponding to two HARQ feedback statuses, "ACK" or "NACK", respectively. Subsequently, for each CODE_BLOCK_NUMBER, the STA transmits at the tone subset in each of the 20 MHz subchannels corresponding to the FEEDBACK_STATUS and RU_TONE_SET_INDEX.

TABLE 4

Value of n based on bandwidth.

| Bandwidth (MHz) | n |
|---|---|
| 20 | 0 |
| 40 | 0, 1 |
| 80 | 0~3 |
| 80 + 80, 160 | 0~7 |
| 80 + 160, 240 | 0~11 |
| 160 + 160, 320 | 0~15 |

In an embodiment, for each code block, FEEDBACK_STATUS is set to "0", "1" or "2" corresponding to three HARQ feedback statuses, "ACK", "Type 1 NACK" or "Type 2 NACK", respectively. Subsequently, for each CODE_BLOCK_NUMBER, under FEEDBACK_STATUS is "0" or "1" ("ACK" or "Type 1 NACK"), the STA transmits at the tone subset in each of the 20 MHZ subchannels corresponding to FEEDBACK_STATUS and RU_TONE_SET_INDEX, or else under FEEDBACK_STATUS is "2" ("Type 2 NACK"), the STA does not transmit at both the tone subsets in each of the 20 MHZ subchannels corresponding to RU_TONE_SET_INDEX.

As presented in Tables 5 to 20, a set of EHT-LTF subcarrier indices which are used to carry HARQ feedback information for a code book, $K_{tone\_NDP_u}$, may depend on the RU_TONE_SET_INDEX, the FEEDBACK_STATUS of the code block, the CODE_BLOCK_NUMBER of the code block, the HARQ_CODEBOOK_SIZE, and the bandwidth. The CODE_BLOCK_NUMBER of a code block may be determined by subtracting the actual code block number with the starting code block number that is indicated in the U-SIG field in the SU HARQ Feedback NDP.

Figure 14:
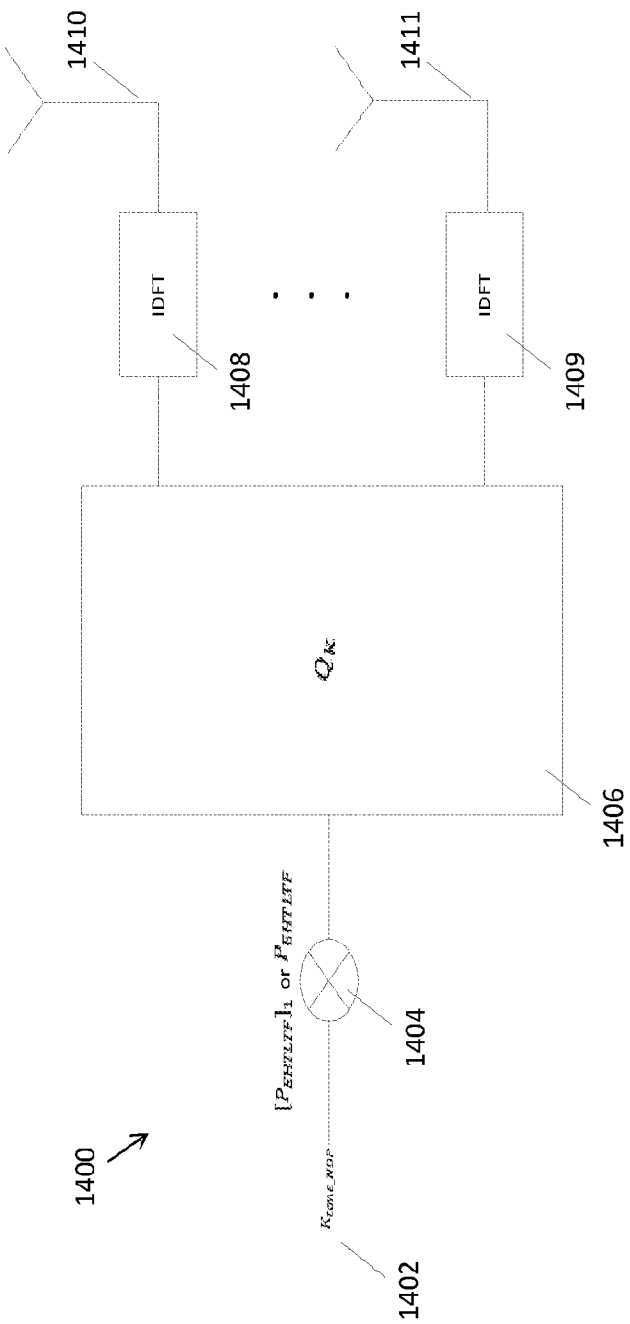
FIG. 14 illustrates generation of the EHT-LTF of the SU HARQ Feedback NDP.

FIG. 14 illustrates generation of the EHT-LTF of a SU HARQ Feedback NDP. Firstly, for each subcarrier k belonging to $K_{tone\_NDP}$ for each of code blocks, the corresponding subcarrier value 1402, $EHTLTF_k^{SU-NDP}$, is taken from a common EHT-LTF sequence according to Equation 7.

$$EHTLTF_{k,u}^{TB-NDP} = \begin{cases} EHTLTF_k, & \text{if } k \in K_{tone\_NDP_u} \\ 0, & \text{otherwise} \end{cases} \quad \text{(Equation 7)}$$

where $EHTLTF_k$ is the value of the common EHT-LTF sequence on subcarrier k, which depends on the bandwidth of the SU HARQ Feedback NDP.

Secondly, the subcarrier values for all the subcarriers belonging to $K_{tone\_NDP}$ for each of code blocks are mapped to two EHT-LTF symbols using $P_{EHTLTF}$ 1404 which is defined in Equation 8.

$$P_{ETHLTF} = \begin{bmatrix} 1 & -1 \\ 1 & 1 \end{bmatrix} \quad \text{(Equation 8)}$$

Depending the value of MULTUPLEXING_FLAG, different variations of the $P_{EHTLTF}$ 1404 are used for the mapping process. When MULTIPLEXING_FLAG is "1", $P_{EHTLTF}$ 1404 is used as presented in Equation 8; when MULTIPLEXING_FLAG is "0", only the first row of the $P_{EHTLTF}$ 1404, which is $[P_{EHTLTF}]_1$ or [1−1] is used. In case of MULTIPLEXING_FLAG is "1", subcarriers belonging to $K_{tone\_NDP}$ for code blocks with CODE_BLOCK_NUMBER between 0 to HARQ_CODEBOOK_SIZE−1 are mapped to two EHT-LTF symbols of a first spatial stream using the first row of $P_{EHTLTF}$ 1404, or [1−1]; whereas subcarriers belonging to $K_{tone\_NDP}$ for code blocks with CODE_BLOCK_NUMBER between HARQ_CODEBOOK_SIZE to 2×HARQ_CODEBOOK_SIZE−1 are mapped to two EHT-LTF symbols of a second spatial stream using the second row of $P_{EHTLTF}$ 1404, or [1 1]. Specifically, according to the embodiment where the HARQ_CODEBOOK_SIZE is 9 and the code blocks with CODE_BLOCK_NUMBER 0 and 9 have the same tone set, but HARQ feedback information for the code blocks with CODE_BLOCK_NUMBER 0 and 9 are multiplexed to different spatial streams due to different rows of the $P_{EHTLTF}$ 1404 in use. In case of MULTIPLEXING_FLAG is "0", subcarriers belonging to $K_{tone\_NDP}$ for code blocks with CODE_BLOCK_NUMBER between 0 to HARQ_CODEBOOK_SIZE−1 are mapped to two EHT-LTF symbols using the first row, $[P_{EHTLTF}]_1$ or [1−1].

Further, the two EHT-LTF symbols may adopt a spatial multiplexing matrix Q 1406 to provide multiple transmission streams to the corresponding transmitters 1410, 1411. Each transmission stream may then adopt an IDFT 1408, 1409 and convert from a signal from discrete frequency domain to discrete time domain for transmission.

Figure 15:
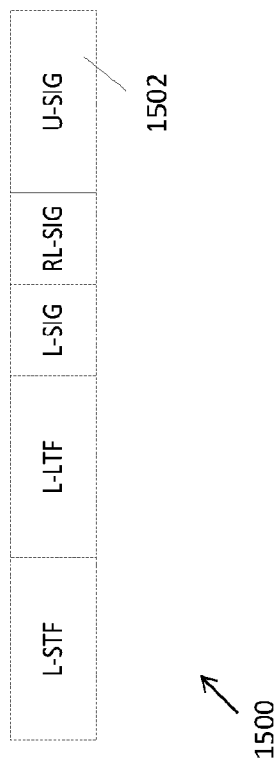
FIG. 15 depicts a second example format of a SU HARQ Feedback NDP.

FIG. 15 depicts a second example format of a SU HARQ Feedback NDP 1500, which may be used in FIG. 5D. The SU HARQ Feedback NDP 1500 is a variant of EHT basic PPDU 200 in FIG. 2A without an EHT-SIG field, an EHT-STF, an EHT-LTF, a Data field and a PE field. Due to the absence of the EHT-STF and EHT-LTF in the SU HARQ Feedback NDP 1500, channel overhead can be advantageously reduced. The SU HARQ Feedback NDP 1500 includes (or consists of) a L-STF, a L-LTF, a L-SIG field, a RL-SIG, a U-SIG field 1502, having durations of 8 μs, 8 μs, 4 μs, 4 μs, and 8 μs, respectively. The SU HARQ Feedback NDP 1500 may transmit in all the 20 MHz subchannels. The U-SIG field 1502 may carry HARQ feedback information for each of code blocks. For example, the U-SIG 1502 may comprise an 8-bit Starting Code Block Number subfield and a 16-bit HARQ Feedback Bitmap subfield. The HARQ Feedback Bitmap subfield is used to indicate the HARQ feedback status of up to 16 entries, where each entry represents a code block. Each bit in the HARQ Feedback Bitmap subfield that is equal to 0 or 1 respectively indicates "ACK" or "NACK" for a single code block in the order of code block number, with the first bit corresponding to the code block with the code block number that matches the Starting Code Block Number subfield. The U-SIG field 1502 may further comprise additional HARQ feedback information, e.g. recommended retransmission percentage.

Figure 16:
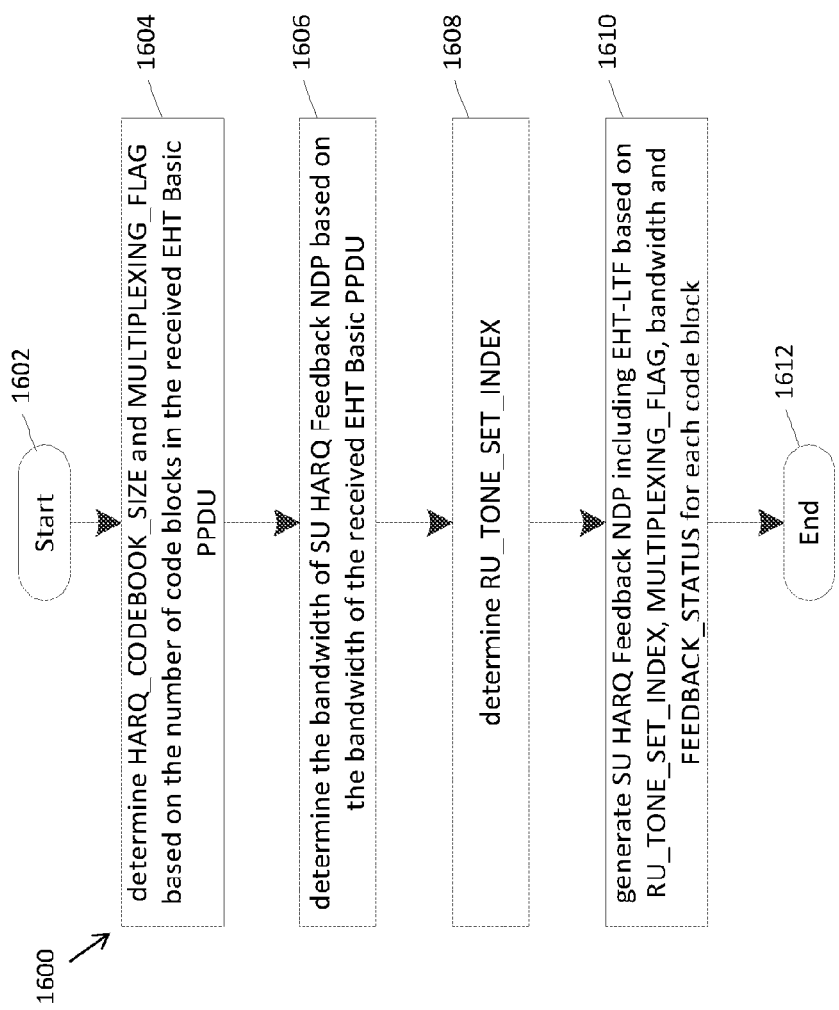
FIG. 16 depicts a flow chart illustrating generation of a SU HARQ Feedback NDP at a STA.

FIG. 16 depicts a flow chart 1600 illustrating generation of a SU HARQ Feedback NDP 1300, 1500 at a STA. Processing may start when the STA, receives a HARQ feedback soliciting EHT basic PPDU from an AP at 1602. At 1604, HARQ_CODEBOOK_SIZE and MULTIPLEXING_FLAG are determined based on the number of code blocks in the received EHT basic PPDU. At 1606, the bandwidth of the SU HARQ Feedback NDP is determined based on the bandwidth of the received EHT basic PPDU. At 1608, RU_TONE_SET_INDEX for each of 20 MHz subchannels is determined based on Equation 6 and Table 4. At 1610, the SU HARQ Feedback NDP including the EHT-LTF is generated based on the RU_TONE_SET_INDEX, MULTIPLEXING_FLAG, bandwidth and FEEDBACK_STATUS for each code block, and the generated SU HARQ Feedback NDP may be transmitted from the STA at 1612.

Figure 17:
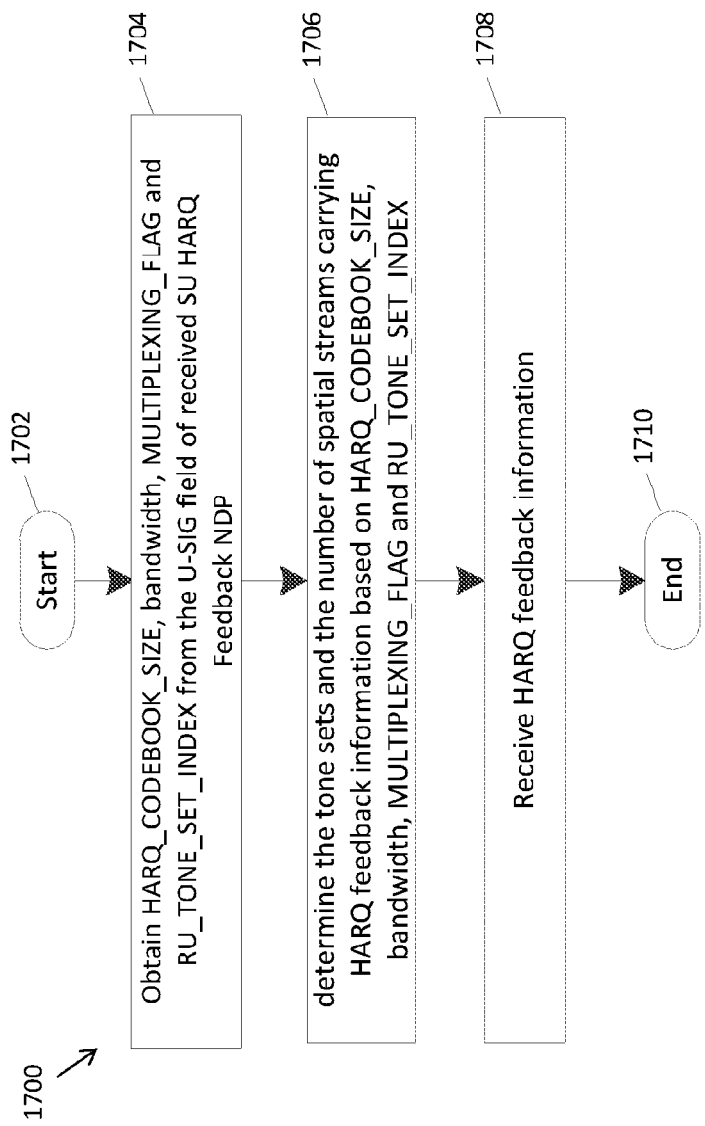
FIG. 17 depicts a flow chart illustrating processing of a received SU HARQ Feedback NDP at an AP.

FIG. 17 depicts a flow chart 1700 illustrating processing of a received SU HARQ Feedback NDP 1300, 1500 at an AP. Processing may start when the AP receives a SU HARQ Feedback NDP 1300, 1500 from an STA at 1702. At 1704, the HARQ_CODEBOOK_SIZE, MULTIPLEXING_FLAG, bandwidth and RU_TONE_SET_INDEX are obtained from the U-SIG field of the received SU HARQ Feedback NDP 1300, 1500. At 1706, the tone sets and the number of spatial streams carrying HARQ feedback information based on the HARQ_CODEBOOK_SIZE, MULTIPLEXING_FLAG, RU_TONE_SET_INDEX and bandwidth. At 1708, HARQ feedback information is received by the AP, and a subsequent action corresponding to the feedback statuses may be performed at 1710.

According to the present disclosure, type 2 HARQ feedback information may be carried in a HARQ BlockAck frame (MAC frame). Specifically, code block based type 2 HARQ feedback information is carried in a HARQ BlockAck (BA) frame (MAC frame). FIG. 18A depicts a first example format of a HARQ BA frame 1800 which can indicate two HARQ feedback statuses per code block, "ACK" or "NACK". The HARQ BlockAck frame 1800 is a variant of the existing BlockAck frame. The HARQ BlockAck frame 1800 includes (or consists of) a Frame Control field, a Duration field, a RA field, a TA field, a BA (BlockAck) field 1802, a BA Information field 1804 and a FCS field. The Frame Control field, Duration field, RA field and TA field may be grouped in a MAC header of the BlockAck frame. The BA Control field 1802 and BA Information field 1804 may be grouped in a frame body of the BlockAck frame 1800. The BA control field 1802 may further comprise a BA Ack Policy subfield, a BA Type subfield 1806 and a TID_INFO (traffic identifier information) subfield. The BA Type subfield 1806 has a value of 4, referring to a HARQ BlockAck frame variant. The BA Information field may further comprise a HARQ Feedback Bitmap Size field 1808 and a HARQ Feedback Bitmap field 1810. The HARQ Feedback Bitmap Size field 1808 indicates the number of bits in the HARQ Feedback Bitmap field 1810. The position of a bit in the HARQ Feedback Bitmap field 1208 may indicate the number of code block for which HARQ feedback status is provided. In an embodiment, a bit is set to "0" to indicate a HARQ feedback status of "ACK"; or a bit is set to "1" to indicate a HARQ feedback status of "NACK". For example, EHT TB PPDUs can be used for transmitting the HARQ BA frame 1800 by STAs 524, 526, 544, 546 when EHT basic PPDU 530, 550 is transmitted to STAs 524, 526, 544, 546, as illustrated in FIGS. 5B and 5C.

FIG. 18B depicts a second example format of a HARQ BA frame 1820 which can indicate three HARQ feedback statuses per code block, "ACK", "Type 1 NACK" or "Type 2 NACK". Similarly, the HARQ BlockAck frame 1820 includes (or consists of) a Frame Control field, a Duration field, a RA field, a TA field, a BA field 1822, a BA Information field 1824 and a FCS field. The Frame Control field, Duration field, RA field and TA field may be grouped in a MAC header of the BlockAck frame. The BA control field 1822 may further comprise a BA Ack Policy subfield, a BA Type subfield and a TID_INFO (traffic identifier information) subfield. The BA Type subfield has a value of 4, corresponds to a HARQ BlockAck frame variant. The BA Information field 1824 may comprise a Number of HARQ Feedback (N) field 1828, a HARQ Feedback Tuples Field 1830 with a total number of 2N bits, and a padding field 1832. The Number of HARQ Feedback field 1828 indicates the number of HARQ Feedback subfields (N) in the HARQ Feedback Tuples field 1830, where the position of a HARQ Feedback subfield in the HARQ Feedback Tuples field 1230 indicate the number of code block for which HARQ feedback status is provided. In an embodiment, a HARQ Feedback subfield is set to "0" to indicate HARQ feedback status of "ACK"; or is set to "1" to indicate a HARQ feedback status of "Type 1 NACK"; or is set to "2" to indicate a HARQ feedback status of "Type 2 NACK". For example, EHT TB PPDUs can be used for transmitting the HARQ BA frame 1820 by STAs 524, 526, 544, 546 when EHT basic PPDU 530, 550 is transmitted to STAs 524, 526, 544, 546, as illustrated in FIGS. 5B and 5C.

FIG. 19A depicts a third example format of a HARQ BA frame 1900. The HARQ BlockAck frame 1900 is a variant of the existing BlockAck frame. The HARQ BlockAck frame 1900 includes (or consists of) a Frame Control field, a Duration field, a RA field, a TA field, a BA Control field 1902, a BA Information field 1904 and a FCS field. The Frame Control field, Duration field, RA field and TA field may be grouped in a MAC header of the BlockAck frame. The BA Control field 1902 and BA Information field 1904 may be grouped in a frame body of the BlockAck Frame 1900. The BA Control field 1902 may further comprise a BA Ack Policy subfield, a BA Type subfield, a HARQ Feedback Type subfield, a HARQ Feedback Status subfield, a Recommended Retransmission Percentage subfield and a TID_INFO (traffic identifier information) subfield. The BA Type subfield 1906 has a value of 4, referring to a HARQ BlockAck frame variant. The HARQ Feedback Type subfield 1908 has a bit of either "0" or "1", which corresponds to MPDU based HARQ feedback type or code block based HARQ feedback type, respectively. The HARQ Feedback Status subfield 1910 has a bit of either "0" or "1" to indicate two or three HARQ feedback statuses per code block, respectively. In an embodiment where the HARQ Feedback Status subfield is "0", the HARQ BlockAck frame 1900 can indicate two HARQ feedback statuses per code block, "ACK" or "NACK". In another embodiment where the HARQ Feedback Status subfield is "1", the HARQ BlockAck frame 1900 can indicate three HARQ feedback statuses per code block, "ACK", "Type 1 NACK" or "Type 2 NACK". The 3-bit Recommended Retransmission Percentage subfield 1912 has a value between 0 and 7 with each value can be set to indicate the percentage of the retransmission is recommended per code block. In an embodiment, a value of Recommended Retransmission Percentage of 0 is set to indicate no retransmission percentage recommendation, while a value equal to 1, 2, 3 or 4 corresponds to a recommended retransmission percentage of $\frac{1}{4}$, $\frac{1}{3}$, $\frac{1}{2}$ or $\frac{3}{4}$, respectively. For example, an EHT basic PPDU can be used for transmitting the HARQ BA frame 1900 by STA 584 when EHT basic PPDU 570, 590 is transmitted to STA 584, as illustrated in FIG. 5E.

FIG. 19B to 19E depict four example formats of the BA Information field of the third example of the HARQ BA frame corresponding to two different HARQ Feedback Type subfield values and two different HARQ Feedback Status subfield values. In an embodiment where the HARQ Feedback Type subfield 1908 and the HARQ Feedback Status subfield 1910 in the BA Control field 1902 indicate bits of "1" and "0", respectively, corresponding to code block based HARQ feedback with two HARQ feedback statuses "ACK" or "NACK" for each code block, the BA Information field 1904 may comprise a 1-octet Starting Code Block Number subfield 1922 and a 8-octet HARQ Feedback Bitmap subfield 1924, as depicted in FIG. 19B. The HARQ Feedback Bitmap subfield 1924 is used to indicate the HARQ feedback status of up to 64 entries, where each entry represents a code block. Each bit in the HARQ Feedback Bitmap subfield 1924 that is equal to 0 or 1 respectively indicates "ACK" or "NACK" for a single code block in the order of code block number, with the first bit corresponding to the code block with the code block number that matches the Starting Code Block Number subfield 1922.

In an embodiment where the HARQ Feedback Type subfield 1908 and the HARQ Feedback Status subfield 1910 in the BA Control field 1902 indicate bits of "0" and "0", respectively, corresponding to MPDU based HARQ feedback with two HARQ feedback statuses "ACK" or "NACK" for each code block, the BA Information field 1904 may comprise a 2-octet Starting Sequence Number subfield 1932 and a 8-octet HARQ Feedback Bitmap subfield 1934, as depicted in FIG. 19C. The HARQ Feedback Bitmap subfield 1934 is used to indicate the HARQ feedback status of up to 64 entries, where each entry represents a MPDU. Each bit in the HARQ Feedback Bitmap subfield 1934 that is equal to 0 or 1 respectively indicates "ACK" or "NACK" for a single MPDU in the order of sequence number, with the first bit corresponding to the MPDU with the sequence number that matches the Starting Sequence Number subfield 1932.

In another embodiment when the HARQ Feedback Type subfield 1908 and the HARQ Feedback Status subfield 1910 in the BA Control field 1902 indicate bits of "1" and "1", respectively, corresponding to code block based HARQ feedback with three HARQ feedback statuses "ACK", "Type 1 NACK" or "Type 2 NACK", the BA Information field 1904 may comprise a 8-bit Starting Code Block Number subfield 1942 and a 2*64-bit HARQ Feedback Tuples subfield 1944, as depicted in FIG. 19D. The HARQ Feedback Tuples subfield 1944 is used to indicate the HARQ feedback status of up to 64 entries, where each entry represents a code block. Each 2-bit field in the HARQ Feedback Tuples subfield 1944 that is equal to 0, 1 or 2 respectively indicates "ACK", "Type 1 NACK" or "Type 2 NACK" for a single code block in the order of code block number, with the first 2-bit field corresponding to the code block with the code block number that matches the Starting Code Block Number subfield 1942.

In another embodiment when the HARQ Feedback Type subfield 1908 and the HARQ Feedback Status subfield 1910 in the BA Control field 1902 indicate bits of "0" and "1", respectively, corresponding to MPDU based HARQ feedback and three HARQ feedback statuses "ACK", Type 1 NACK" or "Type 2 NACK", the BA Information field 1804 may comprise a 16-bit Starting Sequence Number subfield 1952 and a 2*64-bit HARQ Feedback Tuples subfield 1954, as depicted in FIG. 19E. The HARQ Feedback Tuples subfield 1954 is used to indicate the HARQ feedback status of up to 64 entries, where each entry represents a MPDU. Each 2-bit field in the HARQ Feedback Bitmap subfield 1954 that is equal to 0, 1 or 2 respectively indicates "ACK", "Type 1 NACK" or "Type 2 NACK" for a single MPDU in the order of sequence number, with the first bit corresponding to the MPDU with the sequence number that matches the Starting Sequence Number subfield 1952.

According to the present disclosure, when an A-MPDU comprises a single MPDU that solicits immediate acknowledgement or an A-MPDU corresponds to a single code block that requires HARQ feedback, a Ack frame or a Nack frame may be used to carry type 2 HARQ feedback information as to advantageously reduce signalling overhead. FIG. 20 depicts an example format of a Nack frame 2000. The Nack frame 2000 is a control frame and may include (or consist of) a Frame Control field 2002 with a Type subfield value of "01" and Subtype subfield value "1111", a Duration field, a RA field a HARQ Feedback field 2004 and FCS. The Frame Control field 2002, Duration field and RA field may be grouped in a MAC header of the Nack frame 2000. The HARQ Feedback field 2004 may further comprise a NACK Type subfield 2006 and a Recommended Retransmission Percentage field 2008. In an embodiment, the NACK Type subfield value is "0", "1" or "2" to indicate "NACK", "Type 1 NACK" or "Type 2 NACK", respectively. Similar to the HARQ BlockAck frame 1900 in FIG. 19A, the 3-bit Recommended Retransmission Percentage subfield 2008 has a value between 0 and 7 with each value can be set to indicate the percentage of the retransmission is recommended. In an embodiment, the value of Recommended Retransmission Percentage of "0" is set to indicate no retransmission percentage recommendation, while the value equal to 1, 2, 3 and 4 correspond to a recommended retransmission percentage of ¼, ⅓, ½ and ¾, respectively.

Figure 21:
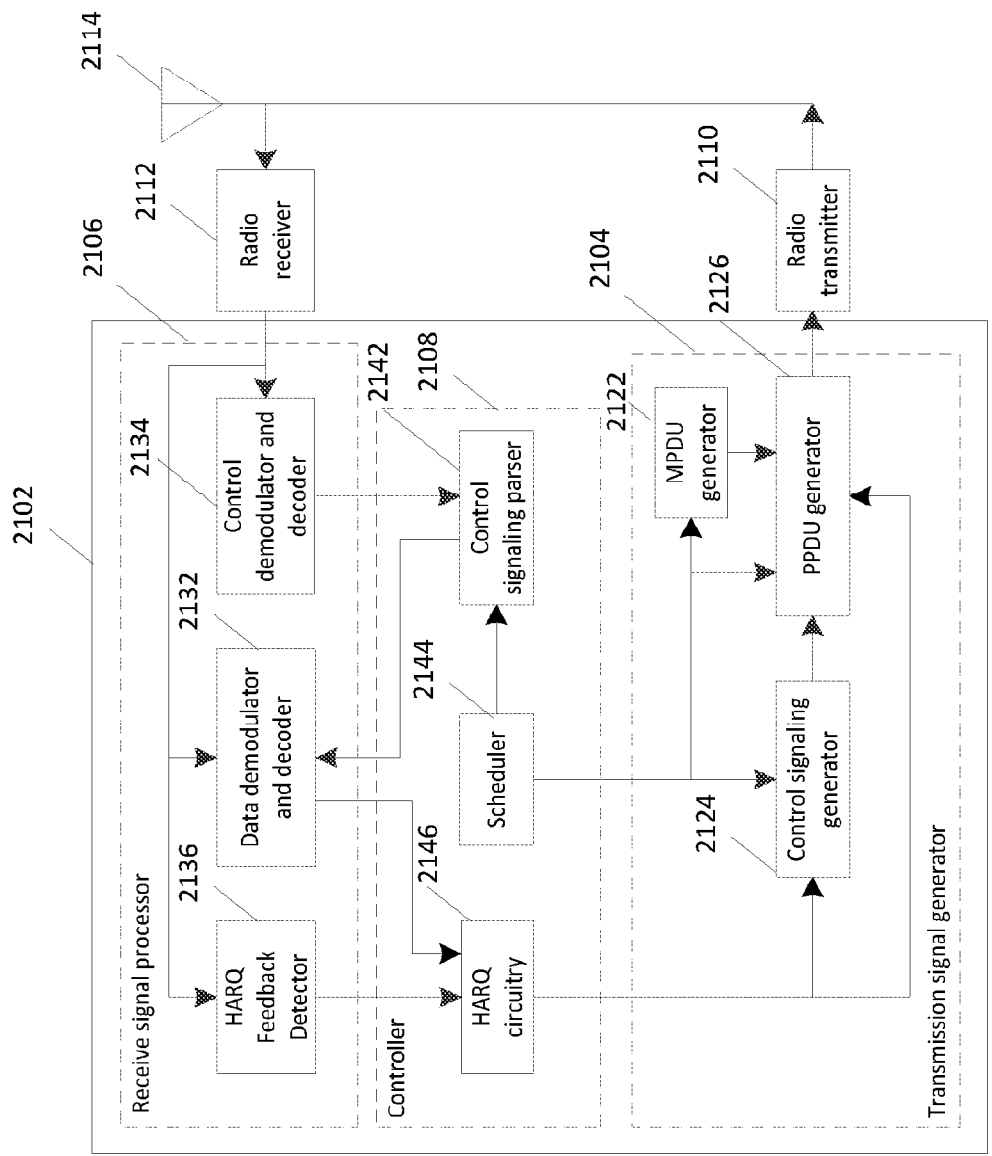
FIG. 21 shows a configuration of a communication device, for example an AP according to various embodiments.

FIG. 21 shows a configuration of a communication device 2100, for example an AP according to various embodiments. Similar to the schematic example of the communication apparatus 300 shown in FIG. 3, the communication apparatus 2100 in the schematic example of FIG. 21 includes circuitry 2102, at least one radio transmitter 2110, at least one radio receiver 2112, at least one antennas 2114 (for the sake of simplicity, only one antenna is depicted in FIG. 21). The circuitry 2102 may include at least one controller 2108 for use in software and hardware aided execution of tasks that the controller 2108 is designed to perform, including HARQ operations. The circuitry 2102 may further include a transmission signal generator 2104 and a receive signal processor 2106. The at least one controller 2108 may control the transmission signal generator 2104 and the receive signal processor 2106. The transmission signal generator 2104 may include an MPDU generator 2122, a control signalling generator 2124, and a PPDU generator 2126. The MPDU generator 2122 may generate A-MPDUs (e.g. data frames, management frames, Trigger frames, BlockAck frames, Ack frames, or Nack frames). The control signalling generator 2124 may generate control signalling fields of PPDUs to be generated (e.g. U-SIG fields, EHT-SIG fields and HARQ-SIG fields of EHT basic PPDUs; or U-SIG fields of SU HARQ Feedback NDPs). The PPDU generator 2126 may generate PPDUs (e.g. EHT basic PPDUs or SU HARQ Feedback NDPs).

The receive signal processor 2106 may include a data demodulator and decoder 2132, which may demodulate and decode data portions of the received signals (e.g. data fields of EHT basic PPDUs or EHT TB PPDUs). The receive signal processor 2106 may further include a control demodulator and decoder 2134, which may demodulate and decode control signalling portions of the received signals (e.g. U-SIG fields of SU HARQ Feedback NDPs, TB HARQ Feedback NDPs or EHT TB PPDUs; or U-SIG fields, EHT-SIG fields and HARQ-SIG fields of EHT basic PPDUs). The receive signal processor 2106 may include a HARQ Feedback Detector 2136, which may detect HARQ feedback information for code blocks of each intended STA, for example from EHT-LTFs of the received SU HARQ Feedback NDPs or TB HARQ Feedback NDPs.

The at least one controller 2108 may include a control signal parser 2142, a scheduler 2144 and a HARQ circuitry 2146. In MU communications, the scheduler 2144 may determine RU information and user-specific allocation information for allocations of downlink MU transmissions and trigger information for allocations of uplink MU transmissions. In downlink SU communications, the scheduler 2144 may determine RU information and user-specific allocation information for a single allocation. The control signal parser 2142 may analyse the control signalling portions of the received signals and the trigger information for allocations of uplink MU transmissions shared by the scheduler 2144 and assist the data demodulator and decoder 2132 in demodulating and decoding the data portions of the received signals. The HARQ circuitry 2146 control HARQ operations. For example, in downlink MU or SU communications, based on the HARQ feedback information for each intended STA provided by the HARQ Feedback Detector 2136 or the data demodulator and decoder 2132, the HARQ circuitry 2146 determines code blocks to be retransmitted for each intended STA and assists the control signalling generator 2124 and the PPDU generator 2126 in generating PPDUs (e.g. EHT basic PPDUs) for HARQ retransmission. In uplink SU communications, based on the results provided by the data demodulator and decoder 2132, the HARQ circuitry 2146 determines HARQ feedback information for code blocks of an intended STA and assists the MPDU generator 2122 in generating MAC frames carrying HARQ feedback information (e.g. BlockAck frames, Ack frames or Nack frames) or the PPDU generator 2126 in generating NDPs carrying HARQ feedback information (e.g. SU HARQ Feedback NDPs).

Figure 22:
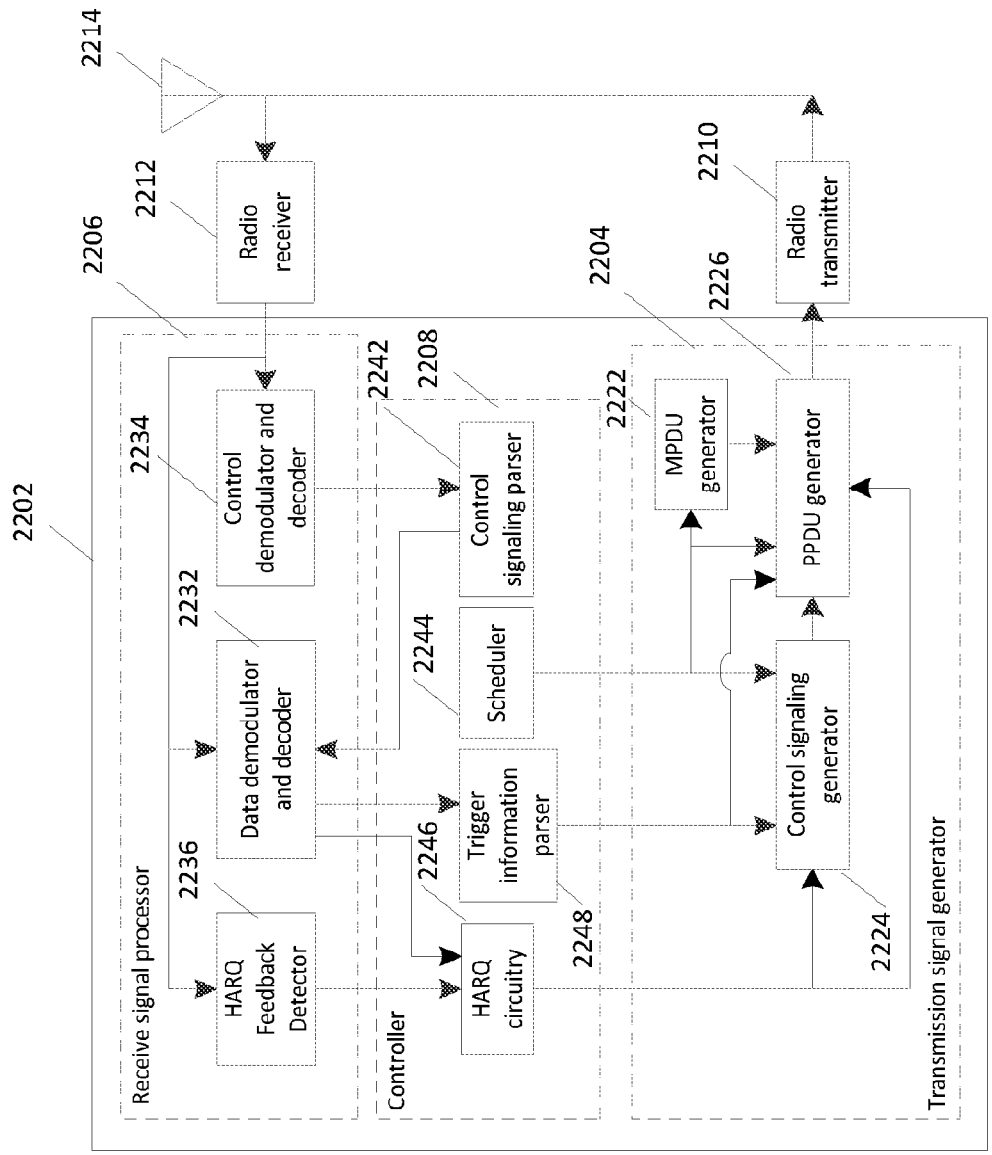
FIG. 22 shows a configuration of a communication apparatus, for example a STA according to various embodiments.

FIG. 22 shows a configuration of a communication device 2200, for example a STA according to various embodiments. Similar to the schematic example of the communication apparatus 300 shown in FIG. 3, the communication apparatus 2200 in the schematic example of FIG. 22 includes circuitry 2202, at least one radio transmitter 2210, at least one radio receiver 2212, at least one antennas 2214 (for the sake of simplicity, only one antenna is depicted in FIG. 22). The circuitry 2202 may include at least one controller 2208 for use in software and hardware aided execution of tasks that the controller 2208 is designed to perform, including HARQ operations. The circuitry 2202 may further include a transmission signal generator 2204 and a receive signal processor 2206. The at least one controller 2208 may control the transmission signal generator 2204 and the receive signal processor 2206. The transmission signal generator 2204 may include an MPDU generator 2222, a control signalling generator 2224, and a PPDU generator 2226. The MPDU generator 2222 may generate A-MPDUs (e.g. data frames, management frames, BlockAck frames, Ack frames, or Nack frames). The control signalling generator 2224 may generate control signalling fields of PPDUs to be generated (e.g. U-SIG fields, EHT-SIG fields and HARQ-SIG fields of EHT basic PPDUs; U-SIG fields of SU HARQ Feedback NDPs, TB HARQ Feedback NDPs or EHT TB PPDUs). The PPDU generator 2226 may generate PPDUs (e.g. EHT basic PPDUs, EHT TB PPDUs, SU HARQ Feedback NDPs or TB HARQ Feedback NDPs).

The receive signal processor 2206 may include a data demodulator and decoder 2232, which may demodulate and decode data portions of the received signals (e.g. data fields of EHT basic PPDUs). The receive signal processor 2206 may further include a control demodulator and decoder 2234, which may demodulate and decode control signalling portions of the received signals (e.g. U-SIG fields of SU HARQ Feedback NDPs; or U-SIG fields, EHT-SIG fields and HARQ-SIG fields of EHT basic PPDUs). The receive signal processor 2206 may include a HARQ Feedback Detector 2236, which may detect HARQ feedback information for code blocks of an AP, for example from EHT-LTFs of the received SU HARQ Feedback NDPs.

The at least one controller 2208 may include a control signal parser 2242, a scheduler 2244, a HARQ circuitry 2246 and a trigger information parser 2248. The control signal parser 2242 may analyse the control signalling portions of the received signals and assist the data demodulator and decoder 2232 in demodulating and decoding the data portions of the received signals. The trigger information parser 2248 may analyse the trigger information for its own uplink allocations from the received Trigger frames in uplink MU communications. The scheduler 2244 may determine RU information and user-specific allocation information for a single allocation in uplink SU communications. The HARQ circuitry 2246 control HARQ operations. For example, in uplink SU communications, based on the HARQ feedback information for an AP provided by the HARQ Feedback Detector 2236 or the data demodulator and decoder 2232, the HARQ circuitry 2246 determines code blocks to be retransmitted for the AP and assists the control signalling generator 2224 and the PPDU generator 2226 in generating PPDUs (e.g. EHT basic PPDUs) for HARQ retransmission. In downlink MU communications, based on the results provided by the data demodulator and decoder 2232, the HARQ circuitry 2246 determines HARQ feedback information for code blocks and assists the MPDU generator 2222 in generating MAC frames carrying HARQ feedback information (e.g. BlockAck frames, Ack frames or Nack frames) or the PPDU generator 2226 in generating NDPs carrying HARQ feedback information (e.g. SU HARQ Feedback NDPs or TB HARQ Feedback NDPs).

As described above, the embodiments of the present disclosure provide an advanced communication system, communication methods and communication apparatuses that enable HARQ operation in extremely high throughput WLAN networks.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antenna.

Some non-limiting examples of such a communication apparatus include a phone (e.g. cellular (cell) phone, smart phone), a tablet, a personal computer (PC) (e.g. laptop, desktop, netbook), a camera (e.g. digital still/video camera), a digital player (digital audio/video player), a wearable device (e.g. wearable camera, smart watch, tracking device), a game console, a digital book reader, a telehealth/telemedicine (remote health and medicine) device, and a vehicle providing communication functionality (e.g. automotive, airplane, ship), and various combinations thereof.

The communication apparatus is not limited to be portable or movable, and may also include any kind of apparatus, device or system being non-portable or stationary, such as a smart home device (e.g. an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Various statements according to the present disclosure may provide:

1. A communication apparatus comprising: circuitry, which, in operation, generates a transmission signal that include a signal field and a data field, the signal field indicating a plurality of user-specific allocations in the data field, wherein an aggregate medium access control protocol data unit (A-MPDU) transmitted in a user-specific allocation is segmented into one or more code blocks; a transmitter, which, in operation, transmits the generated transmission signal; and a receiver, which, in operation, receives a null data packet (NDP) or a medium access control (MAC) frame carrying hybrid automatic repeat request (HARQ) feedback information for the one or more code blocks.

2. The communication apparatus of statement 1, wherein the A-MPDU contains trigger information to indicate the HARQ feedback information for the one or more code blocks is carried in a NDP or in a MAC frame.

3. The communication apparatus of statement 2, wherein the trigger information is included in a trigger frame and the type of the trigger frame indicates the HARQ feedback information for the one or mode code block is carried in a NDP or in a MAC frame.

4. The communication apparatus of statement 2, wherein the trigger information is included in a control subfield of the A-MPDU and the type of the control subfield indicates the HARQ feedback information for the one or more code blocks is carried in a NDP or in a MAC frame.

5. The communication apparatus of statement 2, wherein the trigger information comprises HARQ codebook size.

6. The communication apparatus of statement 2, wherein the trigger information comprises resource unit (RU) tone set index.

7. The communication apparatus of statement 2, wherein the trigger information comprises starting space-time stream (STS) number.

8. The communication apparatus of statement 1, wherein the HARQ feedback information for each of the one or more code blocks is either "ACK" or "NACK"

9. The communication apparatus of statement 1, wherein the HARQ feedback information for each of the one or more code blocks is one of "ACK", "Type 1 NACK" and "Type 2 NACK".

10. A communication method comprising: generating a transmission signal that include a signal field and a data field, the signal field indicating a plurality of user-specific allocations in the data field, wherein an aggregate medium access control protocol data unit (A-MPDU) transmitted in a user-specific allocation is segmented into one or more code blocks; transmitting the generated transmission signal; and receiving a null data packet (NDP) or a medium access control (MAC) frame carrying hybrid automatic repeat request (HARQ) feedback information for the one or more code blocks.

11. The method of statement 10, further comprising determining a HARQ codebook size.

12. The method of statement 10, further comprising determining a resource unit (RU) tone set index.

13. The method of statement 10, further comprising determining a starting space-time stream (STS) number.

14. The method of statement 10, further comprising generating the HARQ feedback information of either "ACK" or "NACK" for each of the one or more code blocks.

15. The method of statement 10, further comprising generating the HARQ feedback information of one of "ACK", "Type 1 NACK" and "Type 2 NACK" for each of the one or more code blocks.

16. A communication apparatus comprising: a receiver, which, in operation, receive a transmission signal that include a signal field and a data field, the signal field indicating a plurality of user-specific allocations in the data field, wherein an aggregate medium access control protocol data unit (A-MPDU) transmitted in a user-specific allocation is segmented into one or more code blocks; circuitry, which in operation, generates a null data packet (NDP) or a media access control (MAC) frame carrying hybrid automatic repeat request (HARQ) feedback information for the one or more code blocks; and a transmitter, which, in operation, transmits the generated NDP or the MAC frame.

17. The communication apparatus of statement 16, wherein the A-MPDU contains trigger information to indicate the HARQ feedback information for the one or more code blocks is carried in a NDP or in a MAC frame.

18. The communication apparatus of statement 17, wherein the trigger information is included in a trigger frame and the type of the trigger frame indicates the HARQ feedback information for the one or mode code block is carried in a NDP or in a MAC frame.

19. The communication apparatus of statement 17, wherein the trigger information is included in a control subfield of the A-MPDU and the type of the control subfield indicates the HARQ feedback information for the one or more code blocks is carried in a NDP or in a MAC frame.

20. The communication apparatus of statement 17, wherein the trigger information comprises a HARQ codebook size.

21. The communication apparatus of statement 17, wherein the trigger information comprises a resource unit (RU) tone set index.

22. The communication apparatus of statement 17, wherein the trigger information comprises a starting space-time stream (STS) number.

23. The communication apparatus of statement 16, wherein the HARQ feedback information for each of the one or more code blocks is either "ACK" or "NACK"

24. The communication apparatus of statement 16, wherein the HARQ feedback information for each of the one or more code blocks is one of "ACK", "Type 1 NACK" and "Type 2 NACK".

25. A communication method comprising: receiving a transmission signal that include a signal field and a data field, the signal field indicating a plurality of user-specific allocations in the data field, wherein an aggregate medium access control protocol data unit (A-MPDU) transmitted in a user-specific allocation is segmented into one or more code blocks; generating a null data packet (NDP) or a medium access control (MAC) frame carrying hybrid automatic repeat request (HARQ) feedback information for the one or more code blocks; and transmitting the generated NDP or the MAC frame.

26. The method of statement 25, further comprising determining a HARQ codebook size.

27. The method of statement 25, further comprising determining a resource unit (RU) tone set index.

28. The method of statement 25, further comprising determining a starting space-time stream (STS) number.

29. The method of statement 25, further comprising generating the HARQ feedback information of either "ACK" or "NACK" for each of the one or more code blocks.

30. The method of statement 25, further comprising generating the HARQ feedback information of one of "ACK", "Type 1 NACK" and "Type 2 NACK" for each of the one or more code blocks.

31. A communication apparatus comprising: circuitry, which, in operation, generates a transmission signal that includes a signal field and a data field, the data field comprising an aggregate medium access control protocol data unit (A-MPDU) that is segmented into one or more code blocks; a transmitter, which, in operation, transmits the transmission signal; and a receiver, which, in operation, receives a null data packet (NDP) or a medium access control (MAC) frame carrying hybrid automatic repeat request (HARQ) feedback information for the one or more code blocks; wherein the signal field comprises a signalling to indicate whether the NDP or the MAC frame is used to carry the HARQ feedback information.

32. The communication apparatus of statement 31, wherein the HARQ feedback information for each of the one or more code blocks is either "ACK" or "NACK".

33. The communication apparatus of statement 31, wherein the HARQ feedback information for each of the one or more code blocks is one of "ACK", "Type 1 NACK" and "Type 2 NACK".

34. The communication apparatus of statement 31, wherein the NDP includes a signal field and a LTF (Long Training Field), the LTF comprising a plurality of tone sets.

35. The communication apparatus of statement 34, wherein the signal field comprises a signalling to indicate a HARQ codebook size.

36. The communication apparatus of statement 34, wherein the signal field comprises a signalling to indicate one of the plurality of tone sets carrying the HARQ feedback information.

37. The communication apparatus of statement 34, wherein a tone set in each of 20 MHz subchannels carries the same HARQ feedback information if a bandwidth of the transmission signal is 40 MHz or above.

38. A communication method comprising: generating a transmission signal that includes a signal field and a data field, the data field comprising an aggregate medium access control protocol data unit (A-MPDU) that is segmented into one or more code blocks; transmitting the transmission signal; and receiving a null data packet (NDP) or a medium access control (MAC) frame carrying hybrid automatic repeat request (HARQ) feedback information for the one or more code blocks; wherein the signal field comprises a signalling to indicate whether the NDP or the MAC frame is used to carry the HARQ feedback information.

39. The communication method of statement 38, wherein the HARQ feedback information for each of the one or more code blocks is either "ACK" or "NACK".

40. The communication method of statement 38, wherein the HARQ feedback information for each of the one or more code blocks is one of "ACK", "Type 1 NACK" and "Type 2 NACK".

41. The communication method of statement 38, wherein the NDP includes a signal field and a LTF, the LTF comprising a plurality of tone sets.

42. The communication method of statement 41, wherein the signal field comprises a signalling to indicate a HARQ codebook size.

43. The communication method of statement 41, wherein the signal field comprises a signalling to indicate one of the plurality of tone sets carrying the HARQ feedback information.

44. The communication method of statement 41, wherein a tone set in each of 20 MHz subchannels carries the same HARQ feedback information if a bandwidth of the transmission signal is 40 MHz or above.

45. A communication apparatus comprising: a receiver, which, in operation, receives a transmission signal that includes a signal field and a data field, the data field comprising an aggregate medium access control protocol data unit (A-MPDU) that is segmented into one or more code blocks; circuitry, which, in operation, generates a null data packet (NDP) or a medium access control (MAC) frame carrying hybrid automatic repeat request (HARQ) feedback information for the one or more code blocks; and a transmitter, which, in operation, transmits the generated NDP or MAC frame; wherein the signal field comprises a signalling to indicate whether the NDP or the MAC frame is used to carry the HARQ feedback information.

46. The communication apparatus of statement 45, wherein the HARQ feedback information for each of the one or more code blocks is either "ACK" or "NACK".

47. The communication apparatus of statement 45, wherein the HARQ feedback information for each of the one or more code blocks is one of "ACK", "Type 1 NACK" and "Type 2 NACK".

48. The communication apparatus of statement 45, wherein the NDP includes a signal field and a LTF, the LTF comprising a plurality of tone sets.

49. The communication apparatus of statement 48, wherein the signal field comprises a signalling to indicate a HARQ codebook size.

50. The communication apparatus of statement 48, wherein the signal field comprises a signalling to indicate one of the plurality of tone sets carrying the HARQ feedback information.

51. The communication apparatus of statement 48, wherein a tone set in each of 20 MHz subchannels carries the same HARQ feedback information if a bandwidth of the transmission signal is 40 MHz or above.

52. A communication method comprising: receiving a transmission signal that includes a signal field and a data field, the data field comprising an aggregate medium access control protocol data unit (A-MPDU) that is segmented into one or more code blocks; generating a null data packet (NDP) or a medium access control (MAC) frame carrying hybrid automatic repeat request (HARQ) feedback information for the one or more code blocks; and transmitting the generated NDP or MAC frame; wherein the signal field comprises a signalling to indicate whether the NDP or the MAC frame is used to carry the HARQ feedback information.

53. The communication method of statement 52, wherein the HARQ feedback information for each of the one or more code blocks is either "ACK" or "NACK".

54. The communication method of statement 52, wherein the HARQ feedback information for each of the one or more code blocks is one of "ACK", "Type 1 NACK" and "Type 2 NACK".

55. The communication method of statement 52, wherein the NDP includes a signal field and a LTF, the LTF comprising a plurality of tone sets.

56. The communication method of statement 55, wherein the signal field comprises a signalling to indicate a HARQ codebook size.

57. The communication method of statement 55, wherein the signal field comprises a signalling to indicate one of the plurality of tone sets carrying the HARQ feedback information.

58. The communication method of statement 55, wherein a tone set in each of 20 MHz subchannels carries the same HARQ feedback information if a bandwidth of the transmission signal is 40 MHz or above.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

TABLE 5

EHT-LTF subcarrier mapping for the TB HARQ Feedback NDP when HARQ_CODEBOOK_SIZE is 1 and Code_Block_Number is 0.

| RU_TONE_SET_INDEX | 80 MHz | | 40 MHz | | 20 MHz | |
|---|---|---|---|---|---|---|
| | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −113, −77, −41, 6, 42, 78 | −112, −76, −40, 7, 43, 79 if CODE_BLOCK_NUMBER is 0 |
| 2 | Use 20 MHz FEEDBACK_STATUS = 1 Subcarrier Indices − 128 | Use 20 MHz FEEDBACK_STATUS = 0 Subcarrier Indices − 128 | | | −111, −75, −39, 8, 44, 80 | −110, −74, −38, 9, 45, 81 |
| 3 | Use 20 MHz FEEDBACK_STATUS = 1 Subcarrier Indices + 128 | Use 20 MHz FEEDBACK_STATUS = 0 Subcarrier Indices + 128 | | | −109, −73, −37, 10, 46, 82 | −108, −72, −36, 11, 47, 83 |
| 4 | Use 20 MHz FEEDBACK_STATUS = 1 Subcarrier Indices + 384 | Use 20 MHz FEEDBACK_STATUS = 0 Subcarrier Indices + 384 | | | −107, −71, −35, 12, 48, 84 | −106, −70, −34, 13, 49, 85 |
| 5 | | | | | −105, −69, −33, 14, 50, 86 | −104, −68, −32, 15, 51, 87 |
| 6 | | | | | −103, −67, −31, 16, 52, 88 | −102, −66, −30, 17, 53, 89 |
| 7 | | | | | −101, −65, −29, 18, 54, 90 | −100, −64, −28, 19, 55, 91 |
| 8 | | | | | −99, −63, −27, 20, 56, 92 | −98, −62, −26, 21, 57, 93 |
| 9 | | | | | −97, −61, −25, 22, 58, 94 | −96, −60, −24, 23, 59, 95 |
| 10 | | | | | −95, −59, −23, 24, 60, 96 | −94, −58, −22, 25, 61, 97 |
| 11 | | | | | −93, −57, −21, 26, 62, 98 | −92, −56, −20, 27, 63, 99 |
| 12 | | | | | −91, −55, −19, 28, 64, 100 | −90, −54, −18, 29, 65, 101 |
| 13 | | | | | −89, −53, −17, 30, 66, 102 | −88, −52, −16, 31, 67, 103 |
| 14 | | | | | −87, −51, −15, 32, 68, 104 | −86, −50, −14, 33, 69, 105 |
| 15 | | | | | −85, −49, −13, 34, 70, 106 | −84, −48, −12, 35, 71, 107 |
| 16 | | | | | −83, −47, −11, 36, 72, 108 | −82, −46, −10, 37, 73, 109 |
| 17 | | | | | −81, −45, −9, 38, 74, 110 | −80, −44, −8, 39, 75, 111 |
| 18 | | | | | −79, −43, −7, 40, 76, 112 | −78, −42, −6, 41, 77, 113 |
| 19-36 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | | |
| 37-54 | Use 20 MHz FEEDBACK_STATUS = 1 Subcarrier Indices + 128 | Use 20 MHz FEEDBACK_STATUS = 0 Subcarrier Indices + 128 | | | | |
| 55-72 | Use 20 MHz FEEDBACK_STATUS = 1 Subcarrier Indices + 384 | Use 20 MHz FEEDBACK_STATUS = 0 Subcarrier Indices + 384 | | | | |

NOTE 1: The RU_TONE_SET_INDEX definition for the lower and upper 80 MHz. The RU_TONE_SET_INDEX values 1-72 are mapped to the lower 80 MHz and the RU_TONE_SET_INDEX values 73-144 are mapped to the upper 80 MHz.
NOTE 2: The RU_TONE_SET_INDEX definition for the lower, middle and upper 80 MHz. The RU_TONE_SET_INDEX values 1-72 are mapped to the lower 80 MHz, the RU_TONE_SET_INDEX values 73-144 are mapped to the middle 80 MHz; and the RU_TONE_SET_INDEX values 145-216 are mapped to the upper 80 MHz.
NOTE 3: The RU_TONE_SET_INDEX definition for 160 + 160 MHz and 320 MHz shall use the 160 MHz RU_TONE_SET_INDEX definition for the lower and upper 160 MHz. The RU_TONE_SET_INDEX values 1-144 are mapped to the lower 160 MHz and the RU_TONE_SET_INDEX values 145-288 are mapped to the upper 160 MHz.

TABLE 6

EHT-LTF subcarrier mapping for the TB HARQ Feedback NDP when HARQ_CODEBOOK_SIZE is 2 and Code_Block_Number is 0.

| RU_TONE_SET_INDEX | 80 MHz | | 40 MHz | | 20 MHz | |
|---|---|---|---|---|---|---|
| | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −113, −77, −41, 6, 42, 78 −111, −75, −39, 8, 44, 80 −109, −73, −37, 10, 46, 82 −107, −71, −35, 12, 48, 84 −105, −69, −33, 14, 50, 86 −103, −67, −31, 16, 52, 88 −101, −65, −29, 18, 54, 90 −99, −63, −27, 20, 56, 92 −97, −61, −25, 22, 58, 94 | −112, −76, −40, 7, 43, 79 −110, −74, −38, 9, 45, 81 −108, −72, −36, 11, 47, 83 −106, −70, −34, 13, 49, 85 −104, −68, −32, 15, 51, 87 −102, −66, −30, 17, 53, 89 −100, −64, −28, 19, 55, 91 −98, −62, −26, 21, 57, 93 −96, −60, −24, 23, 59, 95 if CODE_BLOCK_NUMBER is 0 |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10-18 | Use 20 MHz FEEDBACK_STATUS = 1 Subcarrier Indices + 128 | Use 20 MHz FEEDBACK_STATUS = 0 Subcarrier Indices + 128 | Use 20 MHz FEEDBACK_STATUS = 1 Subcarrier Indices − 128 | Use 20 MHz FEEDBACK_STATUS = 0 Subcarrier Indices − 128 | | |
| 19-27 | Use 20 MHz FEEDBACK_STATUS = 1 Subcarrier Indices + 128 | Use 20 MHz FEEDBACK_STATUS = 0 Subcarrier Indices + 128 | | | | |
| 28-36 | Use 20 MHz FEEDBACK_STATUS = 1 Subcarrier Indices + 384 | Use 20 MHz FEEDBACK_STATUS = 0 Subcarrier Indices + 384 | | | | |

NOTE 1: The RU_TONE_SET_INDEX definition for the lower and upper 80 MHz for 80 + 80 MHz and 160 MHz shall use the 80 MHz RU_TONE_SET_INDEX definition for the lower and upper 80 MHz. The RU_TONE_SET_INDEX values 1-36 are mapped to the lower 80 MHz and the RU_TONE_SET_INDEX values 37-72 are mapped to the upper 80 MHz.

NOTE 2: The RU_TONE_SET_INDEX definition for 80 + 160 MHz, 80 + 80 + 80 MHz and 160 + 80 MHz shall use the 80 MHz RU_TONE_SET_INDEX definition for the lower 80 MHz, the RU_TONE_SET_INDEX values 37-72 are mapped to the middle 80 MHz and the RU_TONE_SET_INDEX values 73-108 are mapped to the upper 80 MHz.

NOTE 3: The RU_TONE_SET_INDEX definition for the lower and upper 160 MHz for 160 + 160 MHz and 320 MHz shall use the 160 MHz RU_TONE_SET_INDEX definition for the lower and upper 160 MHz. The RU_TONE_SET_INDEX values 1-72 are mapped to the lower 160 MHz and the RU_TONE_SET_INDEX values 73-144 are mapped to the upper 160 MHz.

TABLE 7

EHT-LTF subcarrier mapping for the TB HARQ Feedback NDP when HARQ_CODEBOOK_SIZE is 2 and Code_Block_Number is 1.

| RU_TONE_SET_INDEX | 80 MHz | | 40 MHz | | 20 MHz | |
|---|---|---|---|---|---|---|
| | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 |
| 1 | Use 20 MHz FEEDBACK_STATUS = 1 Subcarrier Indices + 384 | Use 20 MHz FEEDBACK_STATUS = 0 Subcarrier Indices + 384 | Use 20 MHz FEEDBACK_STATUS = 1 Subcarrier Indices − 128 | Use 20 MHz FEEDBACK_STATUS = 0 Subcarrier Indices − 128 | −95, −59, −23, 24, 60, 96 −93, −57, −21, 26, 62, 98 −91, −55, −19, 28, 64, 100 −89, −53, −17, 30, 66, 102 −87, −51, −15, 32, 68, 104 −85, −49, −13, 34, 70, 106 −83, −47, −11, 36, 72, 108 −81, −45, −9, 38, 74, 110 −79, −43, −7, 40, 76, 112 | −94, −58, −22, 25, 61, 97 −92, −56, −20, 27, 63, 99 −90, −54, −18, 29, 65, 101 −88, −52, −16, 31, 67, 103 −86, −50, −14, 33, 69, 105 −84, −48, −12, 35, 71, 107 −82, −46, −10, 37, 73, 109 −80, −44, −8, 39, 75, 111 −78, −42, −6, 41, 77, 113 if CODE_BLOCK_NUMBER is 1 |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10-18 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | | |
| 19-27 | Use 20 MHz FEEDBACK_STATUS = 1 Subcarrier Indices + 128 | Use 20 MHz FEEDBACK_STATUS = 0 Subcarrier Indices + 128 | NOTE 1: The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-36 are mapped to the lower 80 MHz and the RU_TONE_SET_INDEX values 37-72 are mapped to the upper 80 MHz. NOTE 2: The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-36 are mapped to the lower 80 MHz, the RU_TONE_SET_INDEX values 37-72 are mapped to the middle 80 MHz; and the RU_TONE_SET_INDEX values 73-108 are mapped to the upper 80 MHz. NOTE 3: The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-72 are mapped to the lower 160 MHz and the RU_TONE_SET_INDEX values 73-144 are mapped to the upper 160 MHz. | | | |
| 28-36 | Use 20 MHz FEEDBACK_STATUS = 1 Subcarrier Indices + 384 | Use 20 MHz FEEDBACK_STATUS = 0 Subcarrier Indices + 384 | | | | |

TABLE 8

EHT-LTF subcarrier mapping for the TB HARQ Feedback NDP when HARQ_CODEBOOK_SIZE is 3 and Code_Block_Number is 0.

| RU_TONE_SET_INDEX | 80 MHz | | 40 MHz | | 20 MHz | |
|---|---|---|---|---|---|---|
| | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −113, −77, −41, 6, 42, 78 −111, −75, −39, 8, 44, 80 −109, −73, −37, 10, 46, 82 −107, −71, −35, 12, 48, 84 −105, −69, −33, 14, 50, 86 −103, −67, −31, 16, 52, 88 | −112, −76, −40, 7, 43, 79 −110, −74, −38, 9, 45, 81 −108, −72, −36, 11, 47, 83 −106, −70, −34, 13, 49, 85 −104, −68, −32, 15, 51, 87 −102, −66, −30, 17, 53, 89 if CODE_BLOCK_NUMBER is 0 |
| 2 | | | | | | |
| 3 | | | | | | |
| 4 | | | | | | |
| 5 | | | | | | |
| 6 | | | | | | |
| 7–12 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | | |
| 13–18 | Use 20 MHz FEEDBACK_STATUS = 1 Subcarrier Indices + 128 | Use 20 MHz FEEDBACK_STATUS = 0 Subcarrier Indices + 128 | | | | |
| 19–24 | Use 20 MHz FEEDBACK_STATUS = 1 Subcarrier Indices + 384 | Use 20 MHz FEEDBACK_STATUS = 0 Subcarrier Indices + 384 | | | | |

NOTE 1: The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-24 are mapped to the lower 80 MHz and the RU_TONE_SET_INDEX values 25-48 are mapped to the upper 80 MHz.
NOTE 2: The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-24 are mapped to the lower 80 MHz, the RU_TONE_SET_INDEX values 25-48 are mapped to the middle 80 MHz; and the RU_TONE_SET_INDEX values 49-72 are mapped to the upper 80 MHz.
NOTE 3: The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-48 are mapped to the lower 160 MHz and the RU_TONE_SET_INDEX values 49-96 are mapped to the upper 160 MHz.

TABLE 9

EHT-LTF subcarrier mapping for the TB HARQ Feedback NDP when HARQ_CODEBOOK_SIZE is 3 and Code_Block_Number is 1.

| RU_TONE_SET_INDEX | 80 MHz | | 40 MHz | | 20 MHz | |
|---|---|---|---|---|---|---|
| | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −101, −65, −29, 18, 54, 90 −99, −63, −27, 20, 56, 92 −97, −61, −25, 22, 58, 94 −95, −59, −23, 24, 60, 96 −93, −57, −21, 26, 62, 98 −91, −55, −19, 28, 64, 100 | −100, −64, −28, 19, 55, 91 −98, −62, −26, 21, 57, 93 −96, −60, −24, 23, 59, 95 −94, −58, −22, 25, 61, 97 −92, −56, −20, 27, 63, 99 −90, −54, −18, 29, 65, 101 |
| 2 | | | | | | |
| 3 | | | | | | |
| 4 | | | | | | |
| 5 | | | | | | |
| 6 | | | | | | |
| 7-12 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | | |
| 13-18 | Use 20 MHz FEEDBACK_STATUS = 1 Subcarrier Indices + 128 | Use 20 MHz FEEDBACK_STATUS = 0 Subcarrier Indices + 128 | | | | |
| 19-24 | Use 20 MHz FEEDBACK_STATUS = 1 Subcarrier Indices + 384 | Use 20 MHz FEEDBACK_STATUS = 0 Subcarrier Indices + 384 | | | | |

NOTE 1: The RU_TONE_SET_INDEX definition for the lower and upper 80 MHz. The RU_TONE_SET_INDEX values 1-24 are mapped to the lower 80 MHz and the RU_TONE_SET_INDEX values 25-48 are mapped to the upper 80 MHz.
NOTE 2: The RU_TONE_SET_INDEX for 80 + 160 MHz, 80 + 80 MHz and 160 + 80 MHz shall use the 80 MHz RU_TONE_SET_INDEX definition for the lower, middle and upper 80 MHz. The RU_TONE_SET_INDEX values 1-24 are mapped to the lower 80 MHz, the RU_TONE_SET_INDEX values 25-48 are mapped to the middle 80 MHz; and the RU_TONE_SET_INDEX values 49-72 are mapped to the upper 80 MHz.
NOTE 3: The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-48 are mapped to the lower 160 MHz and the RU_TONE_SET_INDEX values 49-96 are mapped to the upper 160 MHz.

TABLE 10

EHT-LTF subcarrier mapping for the TB HARQ Feedback NDP when HARQ_CODEBOOK_SIZE is 3 and Code_Block_Number is 2.

| RU_TONE_SET_INDEX | 80 MHz | | 40 MHz | | 20 MHz | |
|---|---|---|---|---|---|---|
| | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −89, −53, −17, 30, 66, 102 −87, −51, −15, 32, 68, 104 −85, −49, −13, 34, 70, 106 −83, −47, −11, 36, 72, 108 −81, −45, −9, 38, 74, 110 −79, −43, −7, 40, 76, 112 | −88, −52, −16, 31, 67, 103 −86, −50, −14, 33, 69, 105 −84, −48, −12, 35, 71, 107 −82, −46, −10, 37, 73, 109 −80, −44, −8, 39, 75, 111 −78, −42, −6, 41, 77, 113 if CODE_BLOCK_NUMBER is 2 |
| 2 | | | | | | |
| 3 | | | | | | |
| 4 | | | | | | |
| 5 | | | | | | |
| 6 | | | | | | |
| 7-12 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | NOTE 1: The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-24 are mapped to the lower 80 MHz and the RU_TONE_SET_INDEX values 25-48 are mapped to the upper 80 MHz. NOTE 2: The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-24 are mapped to the lower 80 MHz, the RU_TONE_SET_INDEX values 25-48 are mapped to the middle 80 MHz; and the RU_TONE_SET_INDEX values 49-72 are mapped to the upper 80 MHz. NOTE 3: The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-48 are mapped to the lower 160 MHz and the RU_TONE_SET_INDEX values 49-96 are mapped to the upper 160 MHz. | |
| 13-18 | Use 20 MHz FEEDBACK_STATUS = 1 Subcarrier Indices + 128 | Use 20 MHz FEEDBACK_STATUS = 0 Subcarrier Indices + 128 | | | | |
| 19-24 | Use 20 MHz FEEDBACK_STATUS = 1 Subcarrier Indices + 384 | Use 20 MHz FEEDBACK_STATUS = 0 Subcarrier Indices + 384 | | | | |

TABLE 11

EHT-LTF subcarrier mapping for the TB HARQ Feedback NDP when HARQ_CODEBOOK_SIZE is 4 and Code_Block_Number is 0 or 1.

| RU_TONE_SET_INDEX | 80 MHz | | | | 40 MHz | | 20 MHz | |
|---|---|---|---|---|---|---|---|---|
| | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 |
| 1 | Use 20 MHz | Use 20 MHz | Use 20 MHz | Use 20 MHz | | | | |
| 2 | FEEDBACK_STATUS = 1 Subcarrier Indices − 384 | FEEDBACK_STATUS = 0 Subcarrier Indices − 384 | FEEDBACK_STATUS = 1 Subcarrier Indices − 128 | FEEDBACK_STATUS = 0 Subcarrier Indices − 128 | | | | |
| 3 | | | | | | | | |
| 4 | | | | | | | | |
| 5-8 | Use 20 MHz | Use 20 MHz | Use 20 MHz | Use 20 MHz | | | | |
| 9-12 | FEEDBACK_STATUS = 1 Subcarrier Indices − 128 | FEEDBACK_STATUS = 0 Subcarrier Indices − 128 | FEEDBACK_STATUS = 1 Subcarrier Indices + 128 | FEEDBACK_STATUS = 0 Subcarrier Indices + 128 | | | | |
| 13-16 | FEEDBACK_STATUS = 1 Subcarrier Indices + 128 | FEEDBACK_STATUS = 0 Subcarrier Indices + 128 | | | | | | |
| | FEEDBACK_STATUS = 1 Subcarrier Indices + 384 | FEEDBACK_STATUS = 0 Subcarrier Indices + 384 | | | | | | |
| 1 | Use 20 MHz | Use 20 MHz | Use 20 MHz | Use 20 MHz | −105, −69, −33, 14, 50, 86 | −112, −76, −40, 7, 43, 79 | if CODE_BLOCK_NUMBER is 0 | |
| 2 | FEEDBACK_STATUS = 1 Subcarrier Indices − 384 | FEEDBACK_STATUS = 0 Subcarrier Indices − 384 | FEEDBACK_STATUS = 1 Subcarrier Indices − 128 | FEEDBACK_STATUS = 0 Subcarrier Indices − 128 | −103, −67, −31, 16, 52, 88 | −110, −74, −38, 9, 45, 81 | | |
| 3 | | | | | −101, −65, −29, 18, 54, 90 | −108, −72, −36, 11, 47, 83 | | |
| 4 | | | | | −99, −63, −27, 20, 56, 92 | −106, −70, −34, 13, 49, 85 | | |
| 5-8 | Use 20 MHz | Use 20 MHz | Use 20 MHz | Use 20 MHz | | | | |
| 9-12 | FEEDBACK_STATUS = 1 Subcarrier Indices − 128 | FEEDBACK_STATUS = 0 Subcarrier Indices − 128 | FEEDBACK_STATUS = 1 Subcarrier Indices + 128 | FEEDBACK_STATUS = 0 Subcarrier Indices + 128 | | | | |
| 13-16 | FEEDBACK_STATUS = 1 Subcarrier Indices + 128 | FEEDBACK_STATUS = 0 Subcarrier Indices + 128 | | | | | | |
| | FEEDBACK_STATUS = 1 Subcarrier Indices + 384 | FEEDBACK_STATUS = 0 Subcarrier Indices + 384 | | | −105, −69, −33, 14, 50, 86 −103, −67, −31, 16, 52, 88 −101, −65, −29, 18, 54, 90 −99, −63, −27, 20, 56, 92 | −104, −68, −32, 15, 51, 87 −102, −66, −30, 17, 53, 89 −100, −64, −28, 19, 55, 91 −98, −62, −26, 21, 57, 93 | if CODE_BLOCK_NUMBER is 1 | |

NOTE 1: The RU_TONE_SET_INDEX definition for 80 + 80 MHz and 160 MHz shall use the 80 MHz RU_TONE_SET_INDEX definition for the lower and upper 80 MHz. The RU_TONE_SET_INDEX values 1-16 are mapped to the lower 80 MHz and the RU_TONE_SET_INDEX values 17-32 are mapped to the upper 80 MHz.

NOTE 2: The RU_TONE_SET_INDEX definition for 80 + 160 MHz for 80 + 80 + 160 MHz, 80 + 80 + 160 MHz and 160 + 80 MHz shall use the 80 MHz RU_TONE_SET_INDEX definition for the lower, middle and upper 80 MHz. The RU_TONE_SET_INDEX values 1-16 are mapped to the lower 80 MHz, the RU_TONE_SET_INDEX values 17-32 are mapped to the middle 80 MHz; and the RU_TONE_SET_INDEX values 33-48 are mapped to the upper 80 MHz.

NOTE 3: The RU_TONE_SET_INDEX definition for 160 + 160 MHz and 320 MHz shall use the 160 MHz RU_TONE_SET_INDEX definition for the lower and upper 160 MHz. The RU_TONE_SET_INDEX values 1-32 are mapped to the lower 160 MHz and the RU_TONE_SET_INDEX values 33-64 are mapped to the upper 160 MHz.

TABLE 12

EHT-LTF subcarrier mapping for the TB HARQ Feedback NDP when HARQ_CODEBOOK_SIZE is 4 and Code_Block_Number is 2 or 3.

| RU_TONE_SET_INDEX | 80 MHz | | 40 MHz | | 20 MHz | |
|---|---|---|---|---|---|---|
| | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 |
| 1 | Use 20 MHz | Use 20 MHz | Use 20 MHz | Use 20 MHz | −97, −61, −25, 22, 58, 94 | −96, −60, −24, 23, 59, 95 |
| 2 | FEEDBACK_STATUS = 1 Subcarrier Indices − 384 | FEEDBACK_STATUS = 0 Subcarrier Indices − 384 | FEEDBACK_STATUS = 1 Subcarrier Indices − 128 | FEEDBACK_STATUS = 0 Subcarrier Indices − 128 | −95, −59, −23, 24, 60, 96 | −94, −58, −22, 25, 61, 97 if CODE_BLOCK_NUMBER is 2 |
| 3 | | | | | −93, −57, −21, 26, 62, 98 | −92, −56, −20, 27, 63, 99 |
| 4 | | | | | −91, −55, −19, 28, 64, 100 | −90, −54, −18, 29, 65, 101 |
| 5-8 | FEEDBACK_STATUS = 1 Subcarrier Indices − 128 | FEEDBACK_STATUS = 0 Subcarrier Indices − 128 | Use 20 MHz | Use 20 MHz | | |
| 9-12 | FEEDBACK_STATUS = 1 Subcarrier Indices + 128 | FEEDBACK_STATUS = 0 Subcarrier Indices + 128 | FEEDBACK_STATUS = 1 Subcarrier Indices + 128 | FEEDBACK_STATUS = 0 Subcarrier Indices + 128 | | |
| 13-16 | FEEDBACK_STATUS = 1 Subcarrier Indices + 384 | FEEDBACK_STATUS = 0 Subcarrier Indices + 384 | | | | |
| 1 | Use 20 MHz | Use 20 MHz | Use 20 MHz | Use 20 MHz | −89, −53, −17, 30, 66, 102 | −88, −52, −16, 31, 67, 103 |
| 2 | FEEDBACK_STATUS = 1 Subcarrier Indices − 384 | FEEDBACK_STATUS = 0 Subcarrier Indices − 384 | FEEDBACK_STATUS = 1 Subcarrier Indices − 128 | FEEDBACK_STATUS = 0 Subcarrier Indices − 128 | −87, −51, −15, 32, 68, 104 | −86, −50, −14, 33, 69, 105 if CODE_BLOCK_NUMBER is 3 |
| 3 | | | | | −85, −49, −13, 34, 70, 106 | −84, −48, −12, 35, 71, 107 |
| 4 | | | | | −83, −47, −11, 36, 72, 108 | −82, −46, −10, 37, 73, 109 |
| 5-8 | FEEDBACK_STATUS = 1 Subcarrier Indices − 128 | FEEDBACK_STATUS = 0 Subcarrier Indices − 128 | Use 20 MHz | Use 20 MHz | | |
| 9-12 | Use 20 MHz | Use 20 MHz | FEEDBACK_STATUS = 1 Subcarrier Indices + 128 | FEEDBACK_STATUS = 0 Subcarrier Indices + 128 | | |
| 13-16 | FEEDBACK_STATUS = 1 Subcarrier Indices + 384 | FEEDBACK_STATUS = 0 Subcarrier Indices + 384 | | | | |

NOTE 1: The RU_TONE_SET_INDEX definition for the lower and upper 80 MHz shall use the 80 MHz RU_TONE_SET_INDEX definition for the lower 80 MHz and the RU_TONE_SET_INDEX values 1-16 are mapped to the lower 80 MHz and the RU_TONE_SET_INDEX values 17-32 are mapped to the upper 80 MHz.

NOTE 2: The RU_TONE_SET_INDEX definition for 80 + 160 MHz, 80 + 80 + 160 MHz, 80 + 80 MHz and 160 + 80 MHz shall use the 80 MHz RU_TONE_SET_INDEX definition for the lower, middle and upper 80 MHz. The RU_TONE_SET_INDEX values 1-16 are mapped to the lower 80 MHz, the RU_TONE_SET_INDEX values 17-32 are mapped to the middle 80 MHz; and the RU_TONE_SET_INDEX values 33-48 are mapped to the upper 80 MHz.

NOTE 3: The RU_TONE_SET_INDEX definition for 160 + 160 MHz and 320 MHz shall use the 160 MHz RU_TONE_SET_INDEX definition for the lower and upper 160 MHz. The RU_TONE_SET_INDEX values 1-32 are mapped to the lower 160 MHz and the RU_TONE_SET_INDEX values 33-64 are mapped to the upper 160 MHz.

TABLE 13

EHT-LTF subcarrier mapping for the TB HARQ Feedback NDP when HARQ_CODEBOOK_SIZE is 6 and Code_Block_Number is 0 or 1.

| RU_TONE_SET_INDEX | 80 MHz $K_{tone\_NDPu}$ if FEEDBACK_STATUS is 1 | 80 MHz $K_{tone\_NDPu}$ if FEEDBACK_STATUS is 0 | 40 MHz $K_{tone\_NDPu}$ if FEEDBACK_STATUS is 1 | 40 MHz $K_{tone\_NDPu}$ if FEEDBACK_STATUS is 0 | 20 MHz $K_{tone\_NDPu}$ if FEEDBACK_STATUS is 1 | 20 MHz $K_{tone\_NDPu}$ if FEEDBACK_STATUS is 0 | |
|---|---|---|---|---|---|---|---|
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −113, −77, −41, 6, 42, 78 | −112, −76, −40, 7, 43, 79 | if CODE_BLOCK_NUMBER is 0 |
| 2 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | −111, −75, −39, 8, 44, 80 | −110, −74, −38, 9, 45, 81 | |
| 3 | Use 20 MHz FEEDBACK_STATUS = 1 Subcarrier Indices + 128 | Use 20 MHz FEEDBACK_STATUS = 0 Subcarrier Indices + 128 | | | −109, −73, −37, 10, 46, 82 | −108, −72, −36, 11, 47, 83 | |
| 4-6 | Use 20 MHz FEEDBACK_STATUS = 1 Subcarrier Indices + 384 | Use 20 MHz FEEDBACK_STATUS = 0 Subcarrier Indices + 384 | Use 20 MHz FEEDBACK_STATUS = 1 Subcarrier Indices + 128 | Use 20 MHz FEEDBACK_STATUS = 0 Subcarrier Indices + 128 | | | |
| 7-9 | Use 20 MHz FEEDBACK_STATUS = 1 Subcarrier Indices − 128 | Use 20 MHz FEEDBACK_STATUS = 0 Subcarrier Indices − 128 | | | | | |
| 10-12 | Use 20 MHz FEEDBACK_STATUS = 1 Subcarrier Indices + 128 | Use 20 MHz FEEDBACK_STATUS = 0 Subcarrier Indices + 128 | | | | | |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −105, −69, −33, 14, 50, 86 | −104, −68, −32, 15, 51, 87 | if CODE_BLOCK_NUMBER is 1 |
| 2 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | −103, −67, −31, 16, 52, 88 | −102, −66, −30, 17, 53, 89 | |
| 3 | Use 20 MHz FEEDBACK_STATUS = 1 Subcarrier Indices + 128 | Use 20 MHz FEEDBACK_STATUS = 0 Subcarrier Indices + 128 | | | −101, −65, −29, 18, 54, 90 | −100, −64, −28, 19, 55, 91 | |
| 4-6 | Use 20 MHz FEEDBACK_STATUS = 1 Subcarrier Indices + 384 | Use 20 MHz FEEDBACK_STATUS = 0 Subcarrier Indices + 384 | Use 20 MHz FEEDBACK_STATUS = 1 Subcarrier Indices + 128 | Use 20 MHz FEEDBACK_STATUS = 0 Subcarrier Indices + 128 | | | |
| 7-9 | Use 20 MHz FEEDBACK_STATUS = 1 Subcarrier Indices − 128 | Use 20 MHz FEEDBACK_STATUS = 0 Subcarrier Indices − 128 | NOTE 1: The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-12 are mapped to the lower 80 MHz and the RU_TONE_SET_INDEX values 13-24 are mapped to the upper 80 MHz. | | | | |
| 10-12 | Use 20 MHz FEEDBACK_STATUS = 1 Subcarrier Indices + 128 | Use 20 MHz FEEDBACK_STATUS = 0 Subcarrier Indices + 128 | NOTE 2: The RU_TONE_SET_INDEX for 80 + 160 MHz, 80 + 80 + 160 MHz, and 160 + 80 MHz shall use the 80 MHz RU_TONE_SET_INDEX definition for the lower, middle and upper 80 MHz. The RU_TONE_SET_INDEX values 1-12 are mapped to the lower 80 MHz, the RU_TONE_SET_INDEX values 13-24 are mapped to the middle 80 MHz; and the RU_TONE_SET_INDEX values 25-36 are mapped to the upper 80 MHz. NOTE 3: The RU_TONE_SET_INDEX definition for 160 + 160 MHz and 320 MHz shall use the 160 MHz RU_TONE_SET_INDEX definition for the lower and upper 160 MHz. The RU_TONE_SET_INDEX values 1-24 are mapped to the lower 160 MHz and the RU_TONE_SET_INDEX values 25-48 are mapped to the upper 160 MHz. | | | | |

TABLE 14

EHT-LTF subcarrier mapping for the TB HARQ Feedback NDP when HARQ_CODEBOOK_SIZE is 6 and Code_Block_Number is 2 or 3.

| RU_TONE_SET_INDEX | 80 MHz | | | | 40 MHz | | 20 MHz | |
|---|---|---|---|---|---|---|---|---|
| | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | | |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −101, −65, −29, 18, 54, 90 | −100, −64, −28, 19, 55, 91 | if CODE_BLOCK_NUMBER is 1 | |
| 2 | | | | | −99, −63, −27, 20, 56, 92 | −98, −62, −26, 21, 57, 93 | | |
| 3 | | | | | −97, −61, −25, 22, 58, 94 | −96, −60, −24, 23, 59, 95 | | |
| 4-6 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | | | | |
| 7-9 | Use 20 MHz FEEDBACK_STATUS = 1 Subcarrier Indices + 128 | Use 20 MHz FEEDBACK_STATUS = 0 Subcarrier Indices + 128 | | | | | | |
| 10-12 | Use 20 MHz FEEDBACK_STATUS = 1 Subcarrier Indices + 384 | Use 20 MHz FEEDBACK_STATUS = 0 Subcarrier Indices + 384 | | | | | | |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −95, −59, −23, 24, 60, 96 | −94, −58, −22, 25, 61, 97 | if CODE_BLOCK_NUMBER is 3 | |
| 2 | | | | | −93, −57, −21, 26, 62, 98 | −92, −56, −20, 27, 63, 99 | | |
| 3 | | | | | −91, −55, −19, 28, 64, 100 | −90, −54, −18, 29, 65, 101 | | |
| 4-6 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | | | | |
| 7-9 | Use 20 MHz FEEDBACK_STATUS = 1 Subcarrier Indices + 128 | Use 20 MHz FEEDBACK_STATUS = 0 Subcarrier Indices + 128 | | | NOTE 1: The RU_TONE_SET_INDEX definition for 80 + 80 MHz and 160 MHz shall use the 80 MHz RU_TONE_SET_INDEX definition for the lower and upper 80 MHz. The RU_TONE_SET_INDEX values 1-12 are mapped to the lower 80 MHz and the RU_TONE_SET_INDEX values 13-24 are mapped to the upper 80 MHz. | | | |
| 10-12 | Use 20 MHz FEEDBACK_STATUS = 1 Subcarrier Indices + 384 | Use 20 MHz FEEDBACK_STATUS = 0 Subcarrier Indices + 384 | | | NOTE 2: The RU_TONE_SET_INDEX for 80 + 160 MHz, 80 + 80 + 160 MHz and 160 + 80 MHz shall use the 80 MHz RU_TONE_SET_INDEX definition for the lower, middle and upper 80 MHz. The RU_TONE_SET_INDEX values 1-12 are mapped to the lower 80 MHz, the RU_TONE_SET_INDEX values 13-24 are mapped to the middle 80 MHz; and the RU_TONE_SET_INDEX values 25-36 are mapped to the upper 80 MHz. NOTE 3: The RU_TONE_SET_INDEX definition for 160 + 160 MHz and 320 MHz shall use the 160 MHz RU_TONE_SET_INDEX definition for the lower and upper 160 MHz. The RU_TONE_SET_INDEX values 1-24 are mapped to the lower 160 MHz and the RU_TONE_SET_INDEX values 25-48 are mapped to the upper 160 MHz. | | | |

TABLE 15

EHT-LTF subcarrier mapping for the TB HARQ Feedback NDP when HARQ_CODEBOOK_SIZE is 6 and Code_Block_Number is 4 or 5.

| RU_TONE_SET_INDEX | 80 MHz | | 40 MHz | | 20 MHz | | |
|---|---|---|---|---|---|---|---|
| | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | |
| 1 | Use 20 MHz | Use 20 MHz | Use 20 MHz | Use 20 MHz | −89, −53, −17, 30, 66, 102 | −88, −52, −16, 31, 67, 103 | if CODE_BLOCK_NUMBER is 4 |
| 2 | FEEDBACK_STATUS = 1 Subcarrier Indices − 384 | FEEDBACK_STATUS = 0 Subcarrier Indices − 384 | FEEDBACK_STATUS = 1 Subcarrier Indices − 128 | FEEDBACK_STATUS = 0 Subcarrier Indices − 128 | −87, −51, −15, 32, 68, 104 | −86, −50, −14, 33, 69, 105 | |
| 3 | FEEDBACK_STATUS = 1 Subcarrier Indices − 128 | FEEDBACK_STATUS = 0 Subcarrier Indices − 128 | Use 20 MHz | Use 20 MHz | −85, −49, −13, 34, 70, 106 | −84, −48, −12, 35, 71, 107 | |
| 4-6 | FEEDBACK_STATUS = 1 Subcarrier Indices − 128 | FEEDBACK_STATUS = 0 Subcarrier Indices − 128 | FEEDBACK_STATUS = 1 Subcarrier Indices + 128 | FEEDBACK_STATUS = 0 Subcarrier Indices + 128 | | | |
| 7-9 | Use 20 MHz | Use 20 MHz | | | | | |
| | FEEDBACK_STATUS = 1 Subcarrier Indices + 128 | FEEDBACK_STATUS = 0 Subcarrier Indices + 128 | | | | | |
| 10-12 | Use 20 MHz | Use 20 MHz | | | | | |
| | FEEDBACK_STATUS = 1 Subcarrier Indices + 384 | FEEDBACK_STATUS = 0 Subcarrier Indices + 384 | | | | | |
| 1 | Use 20 MHz | Use 20 MHz | Use 20 MHz | Use 20 MHz | −83, −47, −11, 36, 72, 108 | −82, −46, −10, 37, 73, 109 | if CODE_BLOCK_NUMBER is 5 |
| 2 | FEEDBACK_STATUS = 1 Subcarrier Indices − 384 | FEEDBACK_STATUS = 0 Subcarrier Indices − 384 | FEEDBACK_STATUS = 1 Subcarrier Indices − 128 | FEEDBACK_STATUS = 0 Subcarrier Indices − 128 | −81, −45, −9, 38, 74, 110 | −80, −44, −8, 39, 75, 111 | |
| 3 | FEEDBACK_STATUS = 1 Subcarrier Indices − 128 | FEEDBACK_STATUS = 0 Subcarrier Indices − 128 | Use 20 MHz | Use 20 MHz | −79, −43, −7, 40, 76, 112 | −78, −42, −6, 41, 77, 113 | |
| 4-6 | FEEDBACK_STATUS = 1 Subcarrier Indices − 128 | FEEDBACK_STATUS = 0 Subcarrier Indices − 128 | FEEDBACK_STATUS = 1 Subcarrier Indices + 128 | FEEDBACK_STATUS = 0 Subcarrier Indices + 128 | | | |
| 7-9 | Use 20 MHz | Use 20 MHz | NOTE 1: The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-12 are mapped to the lower 80 MHz and the RU_TONE_SET_INDEX values 13-24 are mapped to the upper 80 MHz. | | | | |
| | FEEDBACK_STATUS = 1 Subcarrier Indices + 128 | FEEDBACK_STATUS = 0 Subcarrier Indices + 128 | NOTE 2: The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-12 are mapped to the lower 80 MHz, the RU_TONE_SET_INDEX values 13-24 are mapped to the middle 80 MHz; and the RU_TONE_SET_INDEX values 25-36 are mapped to the upper 80 MHz. | | | | |
| 10-12 | Use 20 MHz | Use 20 MHz | NOTE 3: The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-24 are mapped to the lower 160 MHz and the RU_TONE_SET_INDEX values 25-48 are mapped to the upper 160 MHz. | | | | |
| | FEEDBACK_STATUS = 1 Subcarrier Indices + 384 | FEEDBACK_STATUS = 0 Subcarrier Indices + 384 | | | | | |

TABLE 16

EHT-LTF subcarrier mapping for the TB HARQ Feedback NDP when HARQ_CODEBOOK_SIZE is 9 and Code_Block_Number is 0 or 1.

| RU_TONE_SET_INDEX | 80 MHz | | 40 MHz | | 20 MHz | |
|---|---|---|---|---|---|---|
| | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 |
| 1 | Use 20 MHz FEEDBACK_STATUS = 1 Subcarrier Indices − 128 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −113, −77, −41, 6, 42, 78 −111, −75, −39, 8, 44, 80 | −112, −76, −40, 7, 43, 79 −110, −74, −38, 9, 45, 81 if CODE_BLOCK_NUMBER is 0 |
| 2 | Use 20 MHz FEEDBACK_STATUS = 1 Subcarrier Indices + 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | | |
| 3-4 | Use 20 MHz FEEDBACK_STATUS = 1 Subcarrier Indices − 128 | Use 20 MHz FEEDBACK_STATUS = 0 Subcarrier Indices + 128 | Use 20 MHz FEEDBACK_STATUS = 1 Subcarrier Indices − 128 | Use 20 MHz FEEDBACK_STATUS = 0 Subcarrier Indices − 128 | | |
| 5-6 | Use 20 MHz FEEDBACK_STATUS = 1 Subcarrier Indices + 128 | Use 20 MHz FEEDBACK_STATUS = 0 Subcarrier Indices + 384 | Use 20 MHz FEEDBACK_STATUS = 1 Subcarrier Indices + 128 | Use 20 MHz FEEDBACK_STATUS = 0 Subcarrier Indices + 128 | | |
| 7-8 | Use 20 MHz FEEDBACK_STATUS = 1 Subcarrier Indices + 384 | | | | | |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −109, −73, −37, 10, 46, 82 −107, −71, −35, 12, 48, 84 | −108, −72, −36, 11, 47, 83 −106, −70, −34, 13, 49, 85 if CODE_BLOCK_NUMBER is 1 |
| 2 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | | |
| 3-4 | Use 20 MHz FEEDBACK_STATUS = 1 Subcarrier Indices + 128 | Use 20 MHz FEEDBACK_STATUS = 0 Subcarrier Indices + 128 | Use 20 MHz FEEDBACK_STATUS = 1 Subcarrier Indices − 128 | Use 20 MHz FEEDBACK_STATUS = 0 Subcarrier Indices − 128 | | |
| 5-6 | Use 20 MHz FEEDBACK_STATUS = 1 Subcarrier Indices + 384 | Use 20 MHz FEEDBACK_STATUS = 0 Subcarrier Indices + 384 | Use 20 MHz FEEDBACK_STATUS = 1 Subcarrier Indices + 128 | Use 20 MHz FEEDBACK_STATUS = 0 Subcarrier Indices + 128 | | |
| 7-8 | | | | | | |

NOTE 1: The RU_TONE_SET_INDEX definition for the lower and upper 80 MHz for 80 + 80 MHz and 160 MHz shall use the 80 MHz RU_TONE_SET_INDEX definition for the lower 80 MHz and the RU_TONE_SET_INDEX values 1-8 are mapped to the lower 80 MHz and the RU_TONE_SET_INDEX values 9-16 are mapped to the upper 80 MHz.

NOTE 2: The RU_TONE_SET_INDEX definition for 80 + 160 MHz for 80 + 80 + 160 MHz, 80 + 80 MHz and 160 + 80 MHz shall use the 80 MHz RU_TONE_SET_INDEX definition for the lower, middle and upper 80 MHz. The RU_TONE_SET_INDEX values 1-8 are mapped to the lower 80 MHz, the RU_TONE_SET_INDEX values 9-16 are mapped to the middle 80 MHz; and the RU_TONE_SET_INDEX values 17-24 are mapped to the upper 80 MHz.

NOTE 3: The RU_TONE_SET_INDEX definition for 160 + 160 MHz and 320 MHz shall use the 160 MHz RU_TONE_SET_INDEX definition for the lower and upper 160 MHz. The RU_TONE_SET_INDEX values 1-16 are mapped to the lower 160 MHz and the RU_TONE_SET_INDEX values 17-32 are mapped to the upper 160 MHz.

TABLE 17

EHT-LTF subcarrier mapping for the TB HARQ Feedback NDP when HARQ_CODEBOOK_SIZE is 9 and Code_Block_Number is 2 or 3.

| RU_TONE_SET_INDEX | 80 MHz | | 40 MHz | | 20 MHz | |
|---|---|---|---|---|---|---|
| | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 |
| 1 | Use 20 MHz | Use 20 MHz | Use 20 MHz | Use 20 MHz | −105, −69, −33, 14, 50, 86 | −104, −68, −32, 15, 51, 87 if CODE_BLOCK_NUMBER is 2 |
| 2 | FEEDBACK_STATUS = 1 Subcarrier Indices − 384 | FEEDBACK_STATUS = 0 Subcarrier Indices − 384 | FEEDBACK_STATUS = 1 Subcarrier Indices − 128 | FEEDBACK_STATUS = 0 Subcarrier Indices − 128 | −103, −67, −31, 16, 52, 88 | −102, −66, −30, 17, 53, 89 |
| 3-4 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | | |
| 5-6 | Use 20 MHz FEEDBACK_STATUS = 1 Subcarrier Indices + 128 | Use 20 MHz FEEDBACK_STATUS = 0 Subcarrier Indices + 128 | | | | |
| 7-8 | Use 20 MHz FEEDBACK_STATUS = 1 Subcarrier Indices + 384 | Use 20 MHz FEEDBACK_STATUS = 0 Subcarrier Indices + 384 | | | | |
| 1 | Use 20 MHz | Use 20 MHz | Use 20 MHz | Use 20 MHz | −101, −65, −29, 18, 54, 90 | −100, −64, −28, 19, 55, 91 if CODE_BLOCK_NUMBER is 3 |
| 2 | FEEDBACK_STATUS = 1 Subcarrier Indices − 384 | FEEDBACK_STATUS = 0 Subcarrier Indices − 384 | FEEDBACK_STATUS = 1 Subcarrier Indices − 128 | FEEDBACK_STATUS = 0 Subcarrier Indices − 128 | −99, −63, −27, 20, 56, 92 | −98, −62, −26, 21, 57, 93 |
| 3-4 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | | |
| 5-6 | Use 20 MHz FEEDBACK_STATUS = 1 Subcarrier Indices + 128 | Use 20 MHz FEEDBACK_STATUS = 0 Subcarrier Indices + 128 | | | | |
| 7-8 | Use 20 MHz FEEDBACK_STATUS = 1 Subcarrier Indices + 384 | Use 20 MHz FEEDBACK_STATUS = 0 Subcarrier Indices + 384 | | | | |

NOTE 1: The RU_TONE_SET_INDEX definition for the lower and upper 80 MHz. The RU_TONE_SET_INDEX values 1-8 are mapped to the lower 80 MHz and the RU_TONE_SET_INDEX values 9-16 are mapped to the upper 80 MHz.

NOTE 2: The RU_TONE_SET_INDEX definition for 80 + 160 MHz, 80 + 80 MHz, 80 + 80 MHz and 160 + 80 MHz shall use the 80 MHz RU_TONE_SET_INDEX definition for the lower, middle and upper 80 MHz. The RU_TONE_SET_INDEX values 1-8 are mapped to the lower 80 MHz, the RU_TONE_SET_INDEX values 9-16 are mapped to the middle 80 MHz; and the RU_TONE_SET_INDEX values 17-24 are mapped to the upper 80 MHz.

NOTE 3: The RU_TONE_SET_INDEX definition for 160 + 160 MHz and 320 MHz shall use the 160 MHz RU_TONE_SET_INDEX definition for the lower and upper 160 MHz. The RU_TONE_SET_INDEX values 1-16 are mapped to the lower 160 MHz and the RU_TONE_SET_INDEX values 17-32 are mapped to the upper 160 MHz.

TABLE 18

EHT-LTF subcarrier mapping for the TB HARQ Feedback NDP when HARQ_CODEBOOK_SIZE is 9 and Code_Block_Number is 4 or 5.

| | 80 MHz | | 40 MHz | | 20 MHz | |
|---|---|---|---|---|---|---|
| RU_TONE_SET_INDEX | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −97, −61, −25, 22, 58, 94 | −96, −60, −24, 23, 59, 95 if CODE_BLOCK_NUMBER is 4 |
| 2 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | −95, −59, −23, 24, 60, 96 | −94, −58, −22, 25, 61, 97 |
| 3-4 | Use 20 MHz FEEDBACK_STATUS = 1 Subcarrier Indices + 128 | Use 20 MHz FEEDBACK_STATUS = 0 Subcarrier Indices + 128 | Use 20 MHz FEEDBACK_STATUS = 1 Subcarrier Indices − 128 | Use 20 MHz FEEDBACK_STATUS = 0 Subcarrier Indices − 128 | | |
| 5-6 | Use 20 MHz FEEDBACK_STATUS = 1 Subcarrier Indices + 128 | Use 20 MHz FEEDBACK_STATUS = 0 Subcarrier Indices + 128 | Use 20 MHz FEEDBACK_STATUS = 1 Subcarrier Indices + 128 | Use 20 MHz FEEDBACK_STATUS = 0 Subcarrier Indices + 128 | | |
| 7-8 | Use 20 MHz FEEDBACK_STATUS = 1 Subcarrier Indices + 384 | Use 20 MHz FEEDBACK_STATUS = 0 Subcarrier Indices + 384 | | | | |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −93, −57, −21, 26, 62, 98 | −92, −56, −20, 27, 63, 99 if CODE_BLOCK_NUMBER is 5 |
| 2 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | −91, −55, −19, 28, 64, 100 | −90, −54, −18, 29, 65, 101 |
| 3-4 | Use 20 MHz FEEDBACK_STATUS = 1 Subcarrier Indices + 128 | Use 20 MHz FEEDBACK_STATUS = 0 Subcarrier Indices + 128 | Use 20 MHz FEEDBACK_STATUS = 1 Subcarrier Indices − 128 | Use 20 MHz FEEDBACK_STATUS = 0 Subcarrier Indices − 128 | | |
| 5-6 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | | |
| 7-8 | Use 20 MHz FEEDBACK_STATUS = 1 Subcarrier Indices + 384 | Use 20 MHz FEEDBACK_STATUS = 0 Subcarrier Indices + 384 | | | | |

NOTE 1: The RU_TONE_SET_INDEX definition for the lower and upper 80 MHz. The RU_TONE_SET_INDEX values 1-8 are mapped to the lower 80 MHz and the RU_TONE_SET_INDEX values 9-16 are mapped to the upper 80 MHz.
NOTE 2: The RU_TONE_SET_INDEX definition for 80 + 160 MHz for 80 + 80 MHz, 80 + 80 MHz and 160 + 80 MHz shall use the 80 MHz RU_TONE_SET_INDEX definition for the lower, middle and upper 80 MHz. The RU_TONE_SET_INDEX values 1-8 are mapped to the lower 80 MHz, the RU_TONE_SET_INDEX values 9-16 are mapped to the middle 80 MHz; and the RU_TONE_SET_INDEX values 17-24 are mapped to the upper 80 MHz.
NOTE 3: The RU_TONE_SET_INDEX definition for 160 + 160 MHz and 320 MHz shall use the 160 MHz RU_TONE_SET_INDEX definition for the lower and upper 160 MHz. The RU_TONE_SET_INDEX values 1-16 are mapped to the lower 160 MHz and the RU_TONE_SET_INDEX values 17-32 are mapped to the upper 160 MHz.

TABLE 19

EHT-LTF subcarrier mapping for the TB HARQ Feedback NDP when HARQ_CODEBOOK_SIZE is 9 and Code_Block_Number is 6 or 7.

| RU_TONE_SET_INDEX | 80 MHz | | 40 MHz | | 20 MHz | |
|---|---|---|---|---|---|---|
| | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −89, −53, −17, 30, 66, 102 −85, −49, −13, 34, 70, 106 | −88, −52, −16, 31, 67, 103 −84, −48, −12, 35, 71, 107 if CODE_BLOCK_NUMBER is 6 |
| 2 | | | | | | |
| 3-4 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | −87, −51, −15, 32, 68, 104 −83, −47, −11, 36, 72, 108 | −86, −50, −14, 33, 69, 105 −82, −46, −10, 37, 73, 109 |
| 5-6 | Use 20 MHz FEEDBACK_STATUS = 1 Subcarrier Indices + 128 | Use 20 MHz FEEDBACK_STATUS = 0 Subcarrier Indices + 128 | | | | |
| 7-8 | Use 20 MHz FEEDBACK_STATUS = 1 Subcarrier Indices + 384 | Use 20 MHz FEEDBACK_STATUS = 0 Subcarrier Indices + 384 | | | | |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | | if CODE_BLOCK_NUMBER is 7 |
| 2 | | | | | | |
| 3-4 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | | |
| 5-6 | Use 20 MHz FEEDBACK_STATUS = 1 Subcarrier Indices + 128 | Use 20 MHz FEEDBACK_STATUS = 0 Subcarrier Indices + 128 | NOTE 1: The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-8 are mapped to the lower 80 MHz and the RU_TONE_SET_INDEX values 9-16 are mapped to the upper 80 MHz. | | | |
| 7-8 | Use 20 MHz FEEDBACK_STATUS = 1 Subcarrier Indices + 384 | Use 20 MHz FEEDBACK_STATUS = 0 Subcarrier Indices + 384 | NOTE 2: The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-8 are mapped to the lower 80 MHz, the RU_TONE_SET_INDEX values 9-16 are mapped to the middle 80 MHz; and the RU_TONE_SET_INDEX values 17-24 are mapped to the upper 80 MHz. NOTE 3: The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-16 are mapped to the lower 160 MHz and the RU_TONE_SET_INDEX values 17-32 are mapped to the upper 160 MHz. | | | |

TABLE 20

EHT-LTF subcarrier mapping for the TB HARQ Feedback NDP when HARQ_CODEBOOK_SIZE is 9 and Code_Block_Number is 8.

| RU_TONE_SET_INDEX | 80 MHz | | 40 MHz | | 20 MHz | |
|---|---|---|---|---|---|---|
| | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −81, −45, −9, 38, 74, 110 | −80, −44, −8, 39, 75, 111 if CODE_BLOCK_NUMBER is 8 |
| 2 | | | | | −79, −43, −7, 40, 76, 112 | −78, −42, −6, 41, 77, 113 |
| 3-4 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | | |
| 5-6 | Use 20 MHz FEEDBACK_STATUS = 1 Subcarrier Indices + 128 | Use 20 MHz FEEDBACK_STATUS = 0 Subcarrier Indices + 128 | NOTE 1: The RU_TONE_SET_INDEX definition for the lower and upper 80 MHz. The RU_TONE_SET_INDEX values 1-8 are mapped to the lower 80 MHz and the RU_TONE_SET_INDEX values 9-16 are mapped to the upper 80 MHz. NOTE 2: The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-8 are mapped to the lower 80 MHz, the RU_TONE_SET_INDEX values 9-16 are mapped to the middle 80 MHz; and the RU_TONE_SET_INDEX values 17-24 are mapped to the upper 80 MHz. NOTE 3: The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-16 are mapped to the lower 160 MHz and the RU_TONE_SET_INDEX values 17-32 are mapped to the upper 160 MHz. | | | |
| 7-8 | Use 20 MHz FEEDBACK_STATUS = 1 Subcarrier Indices + 384 | Use 20 MHz FEEDBACK_STATUS = 0 Subcarrier Indices + 384 | | | | |

The invention claimed is:

1. A communication apparatus comprising:
   circuitry, which, in operation, generates a transmission signal that includes a signal field and a data field, the signal field indicating one or more user-specific allocations in the data field, wherein an aggregate medium access control protocol data unit (A-MPDU) transmitted in each of the one or more user-specific allocations is segmented into one or more code blocks;
   a transmitter, which, in operation, transmits the transmission signal; and
   a receiver, which, in operation, receives a null data packet (NDP) or a medium access control (MAC) frame carrying hybrid automatic repeat request (HARQ) feedback information for the one or more code blocks,
   wherein the NDP includes a Long Training Field (LTF) comprising a plurality of tone sets, and wherein a tone set in each of 20 MHz subchannels carries the same HARQ feedback information if a bandwidth of the transmission signal is 40 MHz or above.

2. The communication apparatus of claim 1, wherein the signal field further comprises a signalling to indicate whether the NDP or the MAC frame is used to carry the HARQ feedback information.

3. The communication apparatus of claim 1, wherein the transmission signal contains trigger information to indicate the HARQ feedback information for the one or more code blocks is carried in the NDP or the MAC frame.

4. The communication apparatus of claim 3, wherein the trigger information is included in a trigger frame and a type of the trigger frame indicates the HARQ feedback information for the one or more code block is carried in the NDP or in the MAC frame.

5. The communication apparatus of claim 3, wherein the trigger information is included in a control subfield of the transmission signal, and a type of the control subfield indicates the HARQ feedback information for the one or more code blocks is carried in the NDP or in the MAC frame.

6. The communication apparatus of claim 3, wherein the trigger information comprises a HARQ codebook size.

7. The communication apparatus of claim 3, wherein the trigger information comprises a resource unit (RU) tone set index.

8. The communication apparatus of claim 3, wherein the trigger information comprises a starting space-time stream (STS) number.

9. The communication apparatus of claim 1, wherein the HARQ feedback information for each of the one or more code blocks is either "ACK" or "NACK".

10. The communication apparatus of claim 1, wherein the HARQ feedback information for each of the one or more code blocks is one of "ACK", "Type 1 NACK" and "Type 2 NACK".

11. The communication apparatus of claim 1, wherein the NDP includes a signal field.

12. The communication apparatus of claim 11, wherein the signal field of the NDP comprises a signalling to indicate a HARQ codebook size.

13. The communication apparatus of claim 11, wherein the signal field of the NDP comprises a signalling to indicate one of the plurality of tone sets carrying the HARQ feedback information.

14. A communication apparatus comprising:
   circuitry, which, in operation, generates a transmission signal that includes a signal field and a data field, the data field comprising an aggregate medium access control protocol data unit (A-MPDU) that is segmented into one or more code blocks, wherein the signal field comprises a signalling to indicate whether a null data packet (NDP) or a medium access control frame is used to carry hybrid automatic repeat request (HARQ) feedback information;
   a transmitter, which, in operation, transmits the transmission signal; and
   a receiver, which, in operation, receives the NDP or the MAC frame carrying the HARQ feedback information for the one or more code blocks,
   wherein the NDP includes a Long Training Field (LTF) comprising a plurality of tone sets, and wherein a tone set in each of 20 MHz subchannels carries the same HARQ feedback information if a bandwidth of the transmission signal is 40 MHz or above.

15. A communication apparatus comprising:
   a receiver, which, in operation, receives a transmission signal that includes a signal field and a data field, the signal field indicating one or more user-specific allocations in the data field, wherein an aggregate medium access control protocol data unit (A-MPDU) transmitted in each of the one or more user-specific allocations is segmented into one or more code blocks;
   circuitry, which, in operation, processes the transmission signal; and
   a transmitter, which, in operation, transmits a null data packet (NDP) or a medium access control (MAC) frame carrying hybrid automatic repeat request (HARQ) feedback information for the one or more code blocks,
   wherein the NDP includes a Long Training Field (LTF) comprising a plurality of tone sets, and wherein a tone set in each of 20 MHz subchannels carries the same HARQ feedback information if a bandwidth of the transmission signal is 40 MHz or above.

16. A communication method comprising:
   generating a transmission signal that includes a signal field and a data field, the signal field indicating one or more user-specific allocations in the data field, wherein an aggregate medium access control protocol data unit (A-MPDU) transmitted in each of the one or more user-specific allocations is segmented into one or more code blocks;
   transmitting the transmission signal; and
   receiving a null data packet (NDP) or a medium access control (MAC) frame carrying hybrid automatic repeat request (HARQ) feedback information for the one or more code blocks
   wherein the NDP includes a Long Training Field (LTF) comprising a plurality of tone sets, and wherein a tone set in each of 20 MHz subchannels carries the same HARQ feedback information if a bandwidth of the transmission signal is 40 MHz or above.

* * * * *